United States Patent
Sanderson

(10) Patent No.: US 7,185,578 B2
(45) Date of Patent: *Mar. 6, 2007

(54) PISTON ASSEMBLY

(75) Inventor: Robert A. Sanderson, Denton, TX (US)

(73) Assignee: R. Sanderson Management, Denton, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/912,188

(22) Filed: Aug. 6, 2004

(65) Prior Publication Data

US 2005/0005763 A1    Jan. 13, 2005

Related U.S. Application Data

(63) Continuation of application No. 09/535,133, filed on Mar. 24, 2000, now Pat. No. 7,007,589, which is a continuation-in-part of application No. 09/523,797, filed on Mar. 13, 2000, now Pat. No. 6,460,450, which is a continuation-in-part of application No. 09/369,013, filed on Aug. 5, 1999, now abandoned, and a continuation-in-part of application No. 09/276,314, filed on Mar. 25, 1999, now Pat. No. 6,446,587, which is a continuation-in-part of application No. 09/154,153, filed on Sep. 15, 1998, now abandoned, which is a continuation-in-part of application No. 08/929,042, filed on Sep. 15, 1997, now abandoned.

(51) Int. Cl.
*F01B 13/04* (2006.01)
*F01B 3/00* (2006.01)

(52) U.S. Cl. ............................................. 92/12.2

(58) Field of Classification Search .............. 91/505, 91/506; 92/12.2; 74/839
See application file for complete search history.

(56) References Cited

U.S. PATENT DOCUMENTS 748,559 A    12/1903    Peet (Continued)

FOREIGN PATENT DOCUMENTS

DE    89352    12/1895

(Continued)

OTHER PUBLICATIONS

Den Hartog, J.P. (Jacob Pieter), "Problem 144," 1956, New York.

(Continued)

*Primary Examiner*—F. Daniel Lopez
(74) *Attorney, Agent, or Firm*—Fish & Richardson P.C.

(57) ABSTRACT

A hydraulic pump includes a housing, at least two pistons mounted to the housing to rotate relative to the housing, and a transition arm coupled to each of the pistons to rotate therewith. The transition arm is set at a predetermined angle relative to a longitudinal axis of the pump. An adjustment mechanism sets the transition arm at the predetermined angle. A cylinder is mounted within the housing to rotate relative to the housing and defines pump cavities for receiving the pistons. A face valve defines inlet and outlet channels in fluid communication with the pump cavities. An apparatus for varying the output volume of a piston assembly includes at least two pistons, a transition arm coupled to each of the at least two pistons, and a rotatable member. The transition arm includes a nose pin, and the rotatable member is coupled to the transition arm nose pin. A radial position of the nose pin relative to an axis of rotation of the rotatable member is adjustable while the rotatable member remains axially stationary.

20 Claims, 45 Drawing Sheets

U.S. PATENT DOCUMENTS

| | | |
|---|---|---|
| 812,636 A | 2/1906 | Callan |
| 821,546 A | 5/1906 | Smallbone |
| 1,019,521 A | 3/1912 | Pratt |
| 1,161,152 A | 11/1915 | Nyborg |
| 1,194,258 A | 8/1916 | Walker |
| 1,210,649 A | 1/1917 | Holley et al. |
| 1,255,973 A | 2/1918 | Almen |
| RE15,442 E | 9/1922 | Almen |
| 1,577,010 A | 3/1926 | Whatley |
| 1,648,000 A | 11/1927 | Lee |
| 1,659,374 A | 2/1928 | Robson |
| 1,673,280 A | 6/1928 | Evans |
| 1,772,977 A | 8/1930 | Arrighi |
| 1,842,322 A | 1/1932 | Hulsebos |
| 1,857,656 A | 5/1932 | Oldfield |
| 1,886,770 A | 11/1932 | Wehr |
| 1,894,033 A | 1/1933 | Farwell |
| 1,968,470 A | 7/1934 | Szombathy |
| 2,042,730 A | 6/1936 | Redrup |
| 2,048,272 A | 7/1936 | Linthicum |
| 2,104,391 A | 1/1938 | Redrup |
| 2,112,934 A | 4/1938 | Stinnes et al. |
| 2,151,614 A | 3/1939 | Nevatt et al. |
| 2,247,527 A | 7/1941 | Stinnes |
| 2,256,079 A | 9/1941 | Dinzl |
| 2,263,561 A | 11/1941 | Biermann |
| 2,282,722 A | 5/1942 | Hall |
| 2,302,995 A | 11/1942 | Holmes |
| 2,303,838 A | 12/1942 | Hall |
| 2,335,048 A | 11/1943 | Feroy |
| 2,341,203 A | 2/1944 | Borer |
| 2,357,735 A | 9/1944 | Hall |
| 2,465,510 A | 3/1949 | Bonnafe |
| 2,513,083 A | 6/1950 | Eckert |
| 2,532,254 A | 11/1950 | Bouchard |
| 2,539,880 A | 1/1951 | Wildhaber |
| 2,653,484 A | 9/1953 | Zecker |
| 2,737,895 A | 3/1956 | Ferris |
| 2,827,792 A | 3/1958 | Hopkins |
| 2,910,973 A | 11/1959 | Witzky |
| 2,940,325 A | 6/1960 | Nakesch |
| 2,957,421 A | 10/1960 | Mock |
| 3,000,367 A | 9/1961 | Eagleson |
| 3,076,345 A | 2/1963 | Leciercq |
| 3,077,118 A | 2/1963 | Robbins |
| 3,176,667 A | 4/1965 | Hammer |
| 3,182,644 A | 5/1965 | Drtina |
| 3,198,022 A | 8/1965 | de Waern |
| 3,273,344 A | 9/1966 | Christenson |
| 3,292,554 A | 12/1966 | Hessler |
| 3,386,425 A | 6/1968 | Morsell |
| 3,528,317 A | 9/1970 | Cummins |
| 3,590,188 A | 6/1971 | Frink et al. |
| 3,654,906 A | 4/1972 | Airas |
| 3,847,124 A | 11/1974 | Kramer |
| 3,861,829 A | 1/1975 | Roberts et al. |
| 3,877,839 A | 4/1975 | Ifield |
| 3,939,809 A | 2/1976 | Rohs |
| 3,945,359 A | 3/1976 | Asaga |
| 3,959,983 A | 6/1976 | Roberts et al. |
| 3,968,699 A | 7/1976 | van Beukering |
| 4,011,842 A | 3/1977 | Davies et al. |
| 4,066,049 A | 1/1978 | Teodorescu et al. |
| 4,075,933 A | 2/1978 | Stephens |
| 4,077,269 A | 3/1978 | Hodgkinson |
| 4,094,202 A | 6/1978 | Kemper |
| 4,100,815 A | 7/1978 | Kemper |
| 4,112,826 A | 9/1978 | Cataldo |
| 4,144,771 A | 3/1979 | Kemper et al. |
| 4,152,944 A | 5/1979 | Kemper |
| 4,168,632 A | 9/1979 | Fokker |
| 4,174,684 A | 11/1979 | Roseby et al. |
| 4,178,135 A | 12/1979 | Roberts |
| 4,178,136 A | 12/1979 | Reid et al. |
| 4,203,396 A | 5/1980 | Berger |
| 4,208,926 A | 6/1980 | Hanson |
| 4,235,116 A | 11/1980 | Meijer et al. |
| 4,270,495 A | 6/1981 | Freudenstein et al. |
| 4,285,303 A | 8/1981 | Leach |
| 4,285,640 A | 8/1981 | Mukai |
| 4,294,139 A | 10/1981 | Bex et al. |
| 4,297,085 A | 10/1981 | Brucken |
| 4,342,544 A | 8/1982 | Pere |
| 4,345,174 A | 8/1982 | Angus |
| 4,418,586 A | 12/1983 | Maki et al. |
| 4,433,596 A | 2/1984 | Scalzo |
| 4,449,444 A | 5/1984 | Forster |
| 4,478,136 A | 10/1984 | Heiser et al. |
| 4,489,682 A | 12/1984 | Kenny |
| 4,491,057 A | 1/1985 | Ziegler |
| 4,505,187 A | 3/1985 | Burgio di Aragona |
| 4,513,630 A | 4/1985 | Pere et al. |
| 4,515,067 A | 5/1985 | Heyl |
| 4,569,314 A | 2/1986 | Milu |
| 4,708,099 A | 11/1987 | Ekker |
| 4,729,717 A | 3/1988 | Gupta |
| 4,776,259 A | 10/1988 | Takai |
| 4,780,060 A | 10/1988 | Terauchi |
| 4,852,418 A | 8/1989 | Armstrong |
| 4,869,212 A | 9/1989 | Sverdlin |
| 4,920,859 A | 5/1990 | Smart et al. |
| 4,966,042 A | 10/1990 | Brown |
| 5,002,466 A | 3/1991 | Inagaki et al. |
| 5,007,385 A | 4/1991 | Kitaguchi |
| 5,025,757 A | 6/1991 | Larsen |
| 5,027,756 A | 7/1991 | Shaffer |
| 5,049,799 A | 9/1991 | Tsai et al. |
| 5,063,829 A | 11/1991 | Takao et al. |
| 5,094,195 A | 3/1992 | Gonzalez |
| 5,102,306 A | 4/1992 | Liu |
| 5,113,809 A | 5/1992 | Ellenburg |
| 5,129,797 A | 7/1992 | Kanamaru |
| 5,136,987 A | 8/1992 | Schechter et al. |
| 5,201,261 A | 4/1993 | Kayukawa et al. |
| 5,261,358 A | 11/1993 | Rorke |
| 5,280,745 A | 1/1994 | Maruno |
| 5,329,893 A | 7/1994 | Drangel et al. |
| 5,336,056 A | 8/1994 | Kimura et al. |
| 5,351,657 A | 10/1994 | Buck |
| 5,437,251 A | 8/1995 | Anglim et al. |
| 5,535,709 A | 7/1996 | Yashizawa |
| 5,542,382 A | 8/1996 | Clarke |
| 5,553,582 A | 9/1996 | Speas |
| 5,562,069 A | 10/1996 | Gillbrand et al. |
| 5,572,904 A | 11/1996 | Minculescu |
| 5,596,920 A | 1/1997 | Umemura et al. |
| 5,605,120 A | 2/1997 | Hedelin |
| 5,630,351 A | 5/1997 | Clucas |
| 5,634,852 A | 6/1997 | Kanamaru |
| 5,699,715 A | 12/1997 | Forster |
| 5,699,716 A | 12/1997 | Ota et al. |
| 5,704,274 A | 1/1998 | Forster |
| 5,762,039 A | 6/1998 | Gonzalez |
| 5,768,974 A | 6/1998 | Ikeda et al. |
| 5,782,219 A | 7/1998 | Frey et al. |
| 5,785,503 A | 7/1998 | Ota et al. |
| 5,839,347 A | 11/1998 | Nomura et al. |
| 5,890,462 A | 4/1999 | Bassett |
| 5,894,782 A | 4/1999 | Nissen et al. |
| 5,897,298 A | 4/1999 | Umemura |
| 5,931,645 A | 8/1999 | Goto et al. |
| 6,053,091 A | 4/2000 | Tojo |
| 6,074,174 A | 6/2000 | Lynn et al. |
| 6,139,282 A | 10/2000 | Ota et al. |

| | | |
|---|---|---|
| 6,155,798 A | 12/2000 | Deininger et al. |
| 6,397,794 B1 | 6/2002 | Sanderson et al. |
| 6,422,831 B1 | 7/2002 | Ito et al. |
| 6,446,587 B1 | 9/2002 | Sanderson et al. |
| 6,460,450 B1 | 10/2002 | Sanderson et al. |
| 6,637,312 B1 | 10/2003 | Clucas et al. |
| 2002/0194987 A1 | 12/2002 | Sanderson et al. |

FOREIGN PATENT DOCUMENTS

| | | |
|---|---|---|
| DE | 345813 | 7/1917 |
| DE | 515359 | 12/1930 |
| DE | 698243 | 10/1940 |
| DE | 1037799 | 12/1958 |
| DE | 1451926 | 5/1965 |
| DE | 2030978 | 1/1971 |
| DE | 2346836 | 3/1975 |
| DE | 26 12 270 | 9/1977 |
| DE | 27 51 846 | 11/1977 |
| DE | 26 33 618 | 2/1978 |
| DE | 29 31 377 | 2/1981 |
| DE | 34 20 529 | 12/1985 |
| DE | 37 00 005 | 7/1988 |
| DE | 4303745 | 8/1993 |
| EP | 0052387 | 10/1981 |
| EP | 0 856 663 | 8/1998 |
| FR | 461343 | 12/1913 |
| FR | 815794 | 4/1937 |
| FR | 1 015 857 | 10/1952 |
| FR | 1416219 | 9/1965 |
| FR | 1450354 | 7/1966 |
| FR | 2271459 | 11/1973 |
| FR | 2 300 262 | 2/1975 |
| FR | 2453332 | 4/1979 |
| FR | 2 566 460 | 12/1985 |
| FR | 2 649 755 | 1/1991 |
| GB | 121961 | 1/1920 |
| GB | 220594 | 3/1924 |
| GB | 282125 | 12/1927 |
| GB | 499023 | 1/1939 |
| GB | 629318 | 9/1947 |
| GB | 651893 | 4/1951 |
| GB | 801952 | 9/1958 |
| GB | 2030254 | 10/1978 |
| GB | 1595600 | 8/1981 |
| JP | 55-37541 | 9/1978 |
| JP | 60-164677 | 8/1985 |
| JP | 61-212656 | 9/1986 |
| JP | 62-113938 | 4/1987 |
| JP | 4-4143463 | 5/1992 |
| JP | 09151840 | 6/1997 |
| WO | WO 91/02889 | 3/1991 |
| WO | WO 92/11449 | 7/1992 |
| WO | WO 97/10415 | 3/1997 |
| WO | WO 99/14471 | 3/1999 |
| WO | WO 00/15955 | 3/2000 |
| WO | WO 01/11214 | 2/2001 |
| WO | WO 01/11237 | 2/2001 |

OTHER PUBLICATIONS

ECyle Inc. Schematic.

Freudenstein, "Development of an Optimum Variable-Stroke Internal-Combustion Engine Mechanism from the Viewpoint . . . ," Journal of Mechanisms, Transmissions, and Automation in Design, vol. 105, pp. 259-266, 1984.

Freudenstein, "Kinematic Structure of Mechanisms for Fixed and Variable-Stroke Axial-Piston Reciprocating Machines," Journal of Mechanisms, Transmissions, and Automation in Design, Vl. 106, pp. 355-363, 1984.

D M Clucas, PhD and J K Raine, PhD, "Development of a Hermetically Sealed Stirling Engine Battery Charger," Proc Instn Mech Engrs, Part C: Journal of Mech Eng Science, vol. 208, pp. 357-366.

D M Clucas, PhD and J K Raine, PhD, "A new wobble drive with particular application in a Stirling engine," Proc Instn Mech Engrs, Part C: Journal of Mech Eng Science, vol. 208, pp. 337-346.

Olson, John R., "Speed Varying Loads Affect the Stability of Hydrostatic Transmissions", www.nfpa.com, 1970.

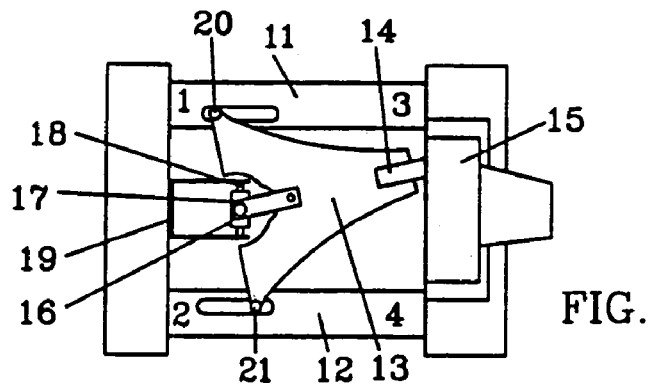
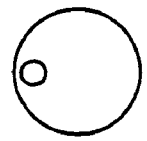
FIG. 3
FIG. 3a
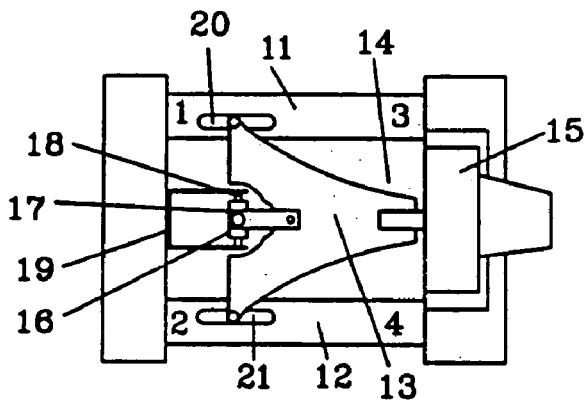
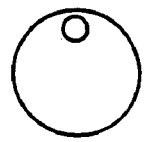
FIG. 4
FIG. 4a
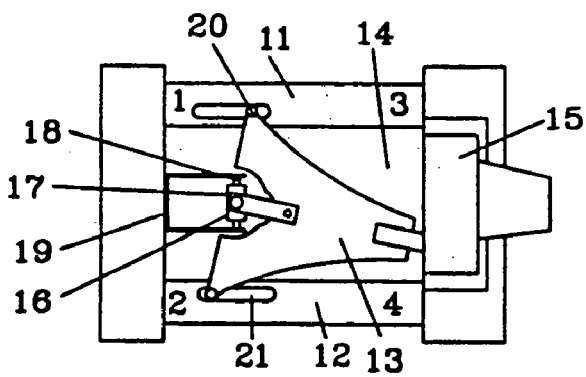
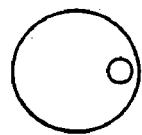
FIG. 5
FIG. 5a
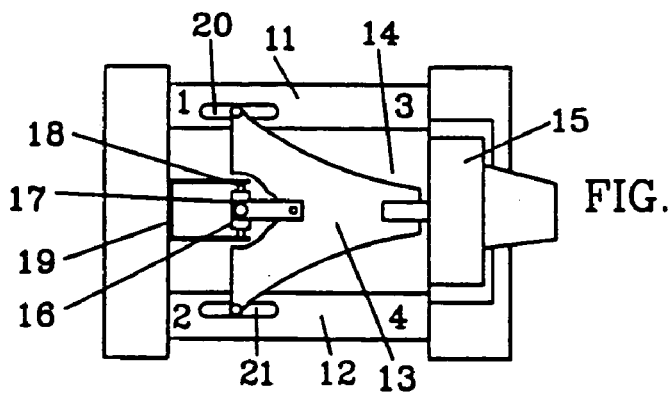
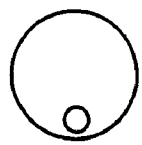
FIG. 6
FIG. 6a

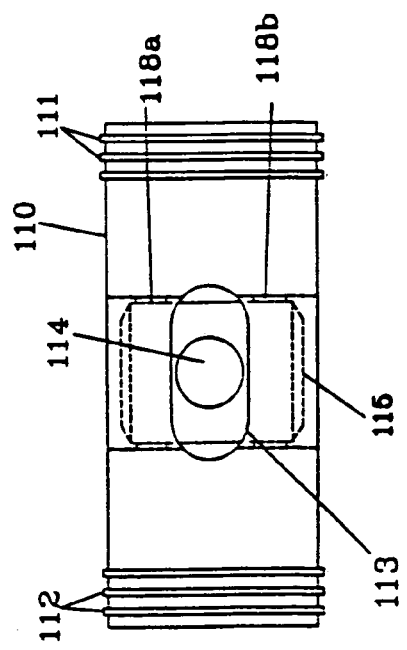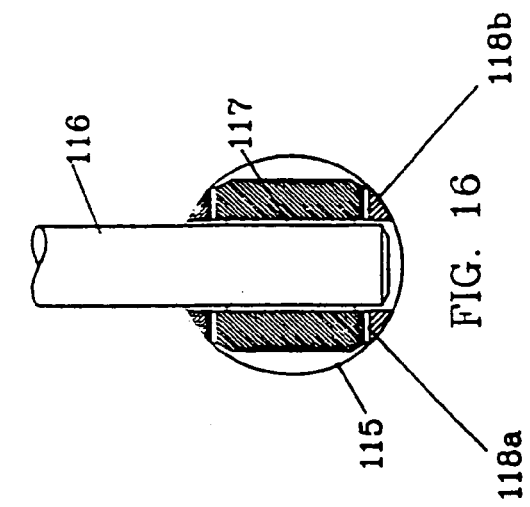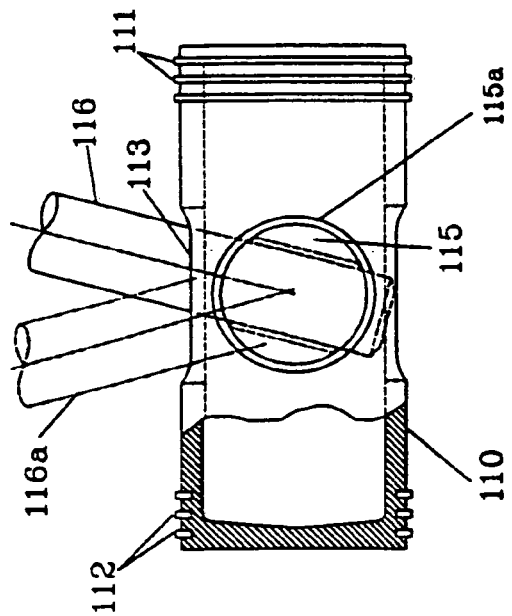

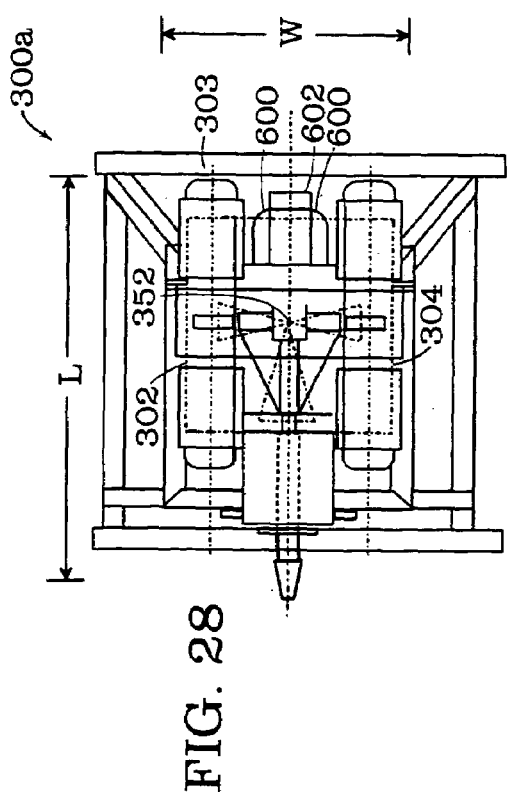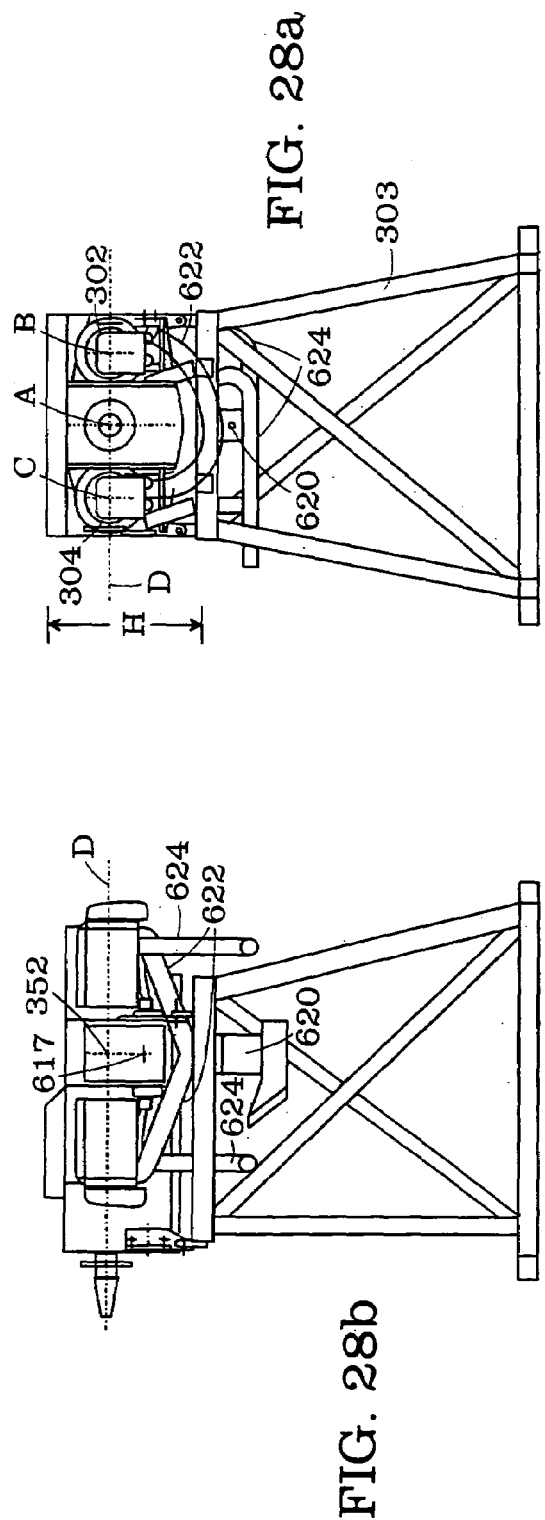
FIG. 28
FIG. 28a
FIG. 28b

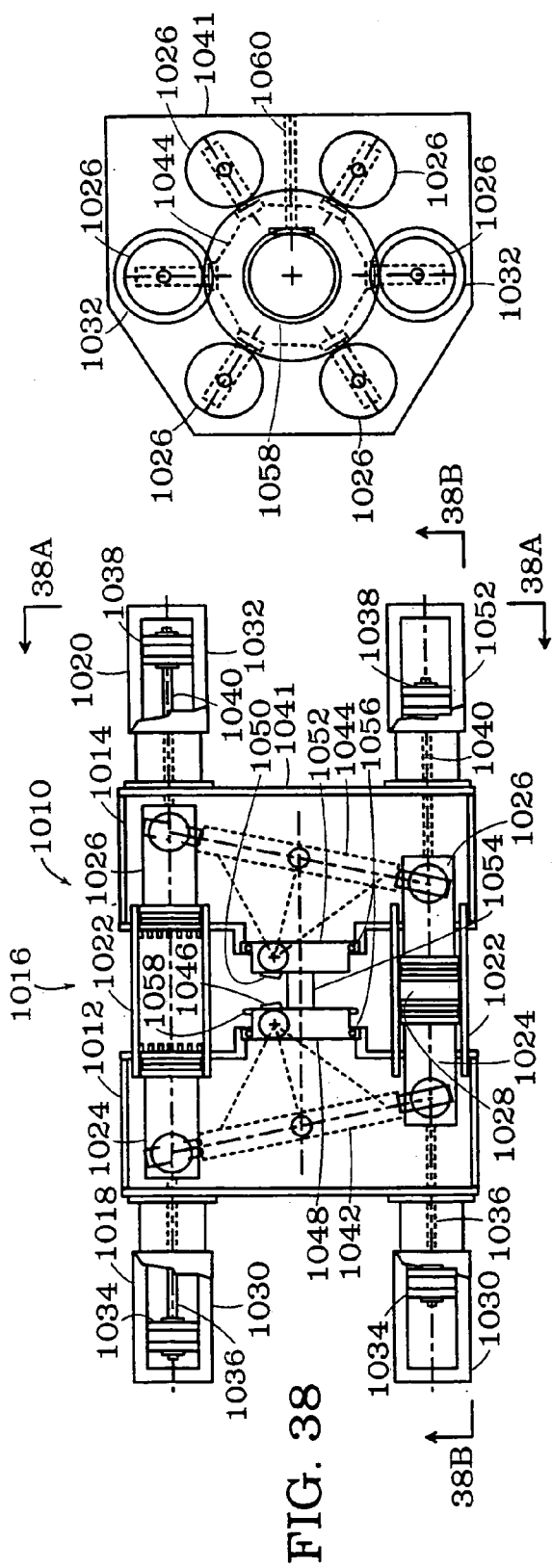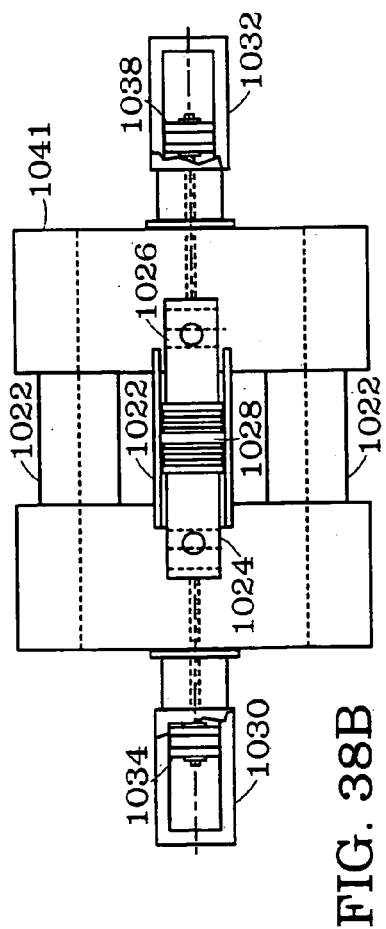

PISTON ASSEMBLY

This application is a continuation of application U.S. Ser. No. 09/535,133, filed Mar. 24, 2000, entitled PISTON ASSEMBLY now U.S. Pat. No. 7,007,589, which is a continuation-in-part of application U.S. Ser. No. 09/523,797, filed Mar. 13, 2000, now issued as U.S. Pat. No. 6,460,450 entitled PISTON ENGINE BALANCING, which is a continuation-in-part of U.S. Ser. No. 09/369,013, filed Aug. 5, 1999, entitled PISTON ENGINE BALANCING, now abandoned, and a continuation-in-part of application U.S. Ser. No. 09/276,314, filed Mar. 25, 1999, now issued as U.S. Pat. No. 6,446,587, entitled PISTON ENGINE ASSEMBLY, which is a continuation-in-part of Ser. No. 09/154,153, filed Sep. 15, 1998, entitled VARIABLE COMPRESSION PISTON ASSEMBLY, now abandoned, which is a continuation-in-part of application Ser. No. 08/929,042, filed Sep. 15, 1997, entitled DOUBLE ENDED PISTON ENGINE, now abandoned, all hereby incorporated by reference in their entirety.

BACKGROUND OF THE INVENTION

The invention relates to a piston engine assembly.

Most piston driven engines have pistons that are attached to offset portions of a crankshaft such that as the pistons are moved in a reciprocal direction transverse to the axis of the crankshaft, the crankshaft will rotate.

U.S. Pat. No. 5,535,709, defines an engine with a double ended piston that is attached to a crankshaft with an off set portion. A lever attached between the piston and the crankshaft is restrained in a fulcrum regulator to provide the rotating motion to the crankshaft.

U.S. Pat. No. 4,011,842, defines a four cylinder piston engine that utilizes two double ended pistons connected to a T-shaped connecting member that causes a crankshaft to rotate. The T-shaped connecting member is attached at each of the T-cross arm to a double ended piston. A centrally located point on the T-cross arm is rotatably attached to a fixed point, and the bottom of the T is rotatably attached to a crank pin which is connected to the crankshaft by a crankthrow which includes a counter weight.

In each of the above examples, double ended pistons are used that drive a crankshaft that has an axis transverse to the axis of the pistons.

SUMMARY OF THE INVENTION

According to one aspect of the invention, a hydraulic pump includes a housing, at least two pistons mounted to the housing to rotate relative to the housing, and a transition arm coupled to each of the pistons to rotate therewith.

Embodiments of this aspect of the invention may include one or more of the following features.

The pistons are double ended pistons. Each double ended piston has a first end and a second end and the transition arm is coupled to each of the double ended pistons between the first and second ends. The transition arm is set at a predetermined angle relative to a longitudinal axis of the pump. An adjustment mechanism sets the transition arm at the predetermined angle. The adjustment mechanism includes first and second meshing gears configured such that linear movement of the first gear causes rotary movement of the second gear. The second gear is coupled to the transition arm such that rotary movement of the second gear adjusts the predetermined angle of the transition arm.

A cylinder is mounted within the housing to rotate relative to the housing and defines pump cavities for receiving the pistons. A face valve defines inlet and outlet channels in fluid communication with the pump cavities. Each of the inlet and outlet channels includes a first section and a second section, with the first section located radially outward of the second section. A face plate is positioned between the face valve and the pistons. A first end of each of the pistons bears against the face plate. The face plate defines flow channels.

The pistons are double ended pistons each having a first end opposing the face valve and a second end spaced from the face valve. The rotating cylinder defines fluid channels providing fluid communication between the face valve and the second end of the pistons.

The transition arm has a first arm coupled to a first of the at least two pistons, and a second arm coupled to a second of the at least two pistons. A first joint couples the first arm to the first piston, and a second joint couples the second arm to the second piston. The joints are each configured to provide at least three degrees of freedom. A universal joint supports the transition arm. The universal joint is configured to rotate with the transition arm.

According to another aspect of the invention, an apparatus for varying the output volume of a piston assembly includes at least two pistons, a transition arm coupled to each of the at least two pistons, and a rotatable member. The transition arm includes a nose pin, and the rotatable member is coupled to the transition arm nose pin. A radial position of the nose pin relative to an axis of rotation of the rotatable member is adjustable while the rotatable member remains axially stationary.

Embodiments of this aspect of the invention may include one or more of the following features.

The rotatable member defines a channel for receiving the nose pin. A bearing block is configured to slide within the channel. The channel is arc shaped such that the bearing block slides along a circumference of a circle. A bearing is mounted in the bearing block to receive the nose pin. The bearing block includes gear teeth. A drive gear engages the bearing block gear teeth to actuate sliding of the bearing block within the channel. The rotatable member is configured to vary the piston stroke to a zero stroke. The pistons are single ended pistons having a piston at one end and a guide rod at an opposite end.

According to another aspect of the invention, a method of varying the output volume of a piston assembly includes providing a piston assembly having at least two pistons, a transition arm coupled to each of the pistons, and a rotatable member coupled to the transition arm nose pin. The method includes moving the nose pin relative to the rotatable member to adjust a position of the nose pin relative to an axis of rotation of the rotatable member while the rotatable member remains axially stationary.

Advantages of the invention may include one or more of the following features. A hydraulic pump is disclosed employing double ended pistons in which only one valve plate is needed to provide fluid communication to both end of the pistons. A piston assembly is disclosed having output volume adjustment down to zero stroke while maintaining the ability to handle high torque loads.

Other features and advantages of the invention will be apparent from the following description and from the claims.

BRIEF DESCRIPTION OF THE DRAWINGS

FIGS. 3, 4, 5 and 6 are a top views of the engine of FIG. 1 showing the pistons and flywheel in four different positions;

FIG. 14 is a top view of a piston;

FIG. 15 is a side view of a piston showing the drive member in two positions;

FIG. 16 shows the bearing interface of the drive member and the piston;

FIG. 23a is a side view of the double ended piston of FIG. 23, taken along lines 23A, 23A;

FIG. 24a is a side view of the transition arm and universal joint of FIG. 24, taken along lines 24a, 24a;

FIG. 25b is a side view of the rotatable member, taken along lines 25b, 25b of FIG. 25a;

FIG. 27 is an end view of the transition arm, taken along lines 27, 27 of FIG. 24;

FIGS. 28–28b are top, rear, and side views, respectively, of the piston assembly of FIG. 22;

FIG. 38 is a top view of an engine/compressor assembly;

FIG. 38A is an end view and FIG. 38B is a side view of the engine/compressor assembly, taken along lines 38A, 38A and 38B, 38B, respectively, of FIG. 38;

DESCRIPTION OF THE PREFERRED EMBODIMENTS

Figure 1:
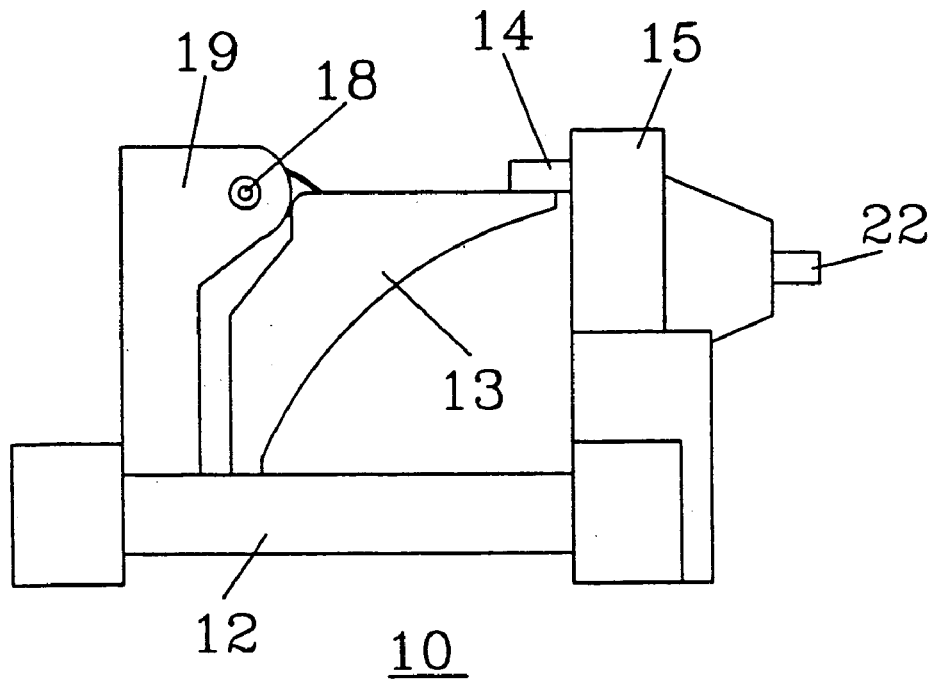
FIGS. 1 and 2 are side view of a simplified illustration of a four cylinder engine of the present invention.

FIG. 1 is a pictorial representation of a four piston engine 10 of the present invention. Engine 10 has two cylinders 11 (FIG. 3) and 12. Each cylinder 11 and 12 house a double ended piston. Each double ended piston is connected to transition arm 13 which is connected to flywheel 15 by shaft 14. Transition arm 13 is connected to support 19 by a universal joint mechanism, including shaft 18, which allows transition arm 13 to move up an down and shaft 17 which allows transition arm 13 to move side to side. FIG. 1 shows flywheel 15 in a position shaft 14 at the top of wheel 15.

Figure 2:
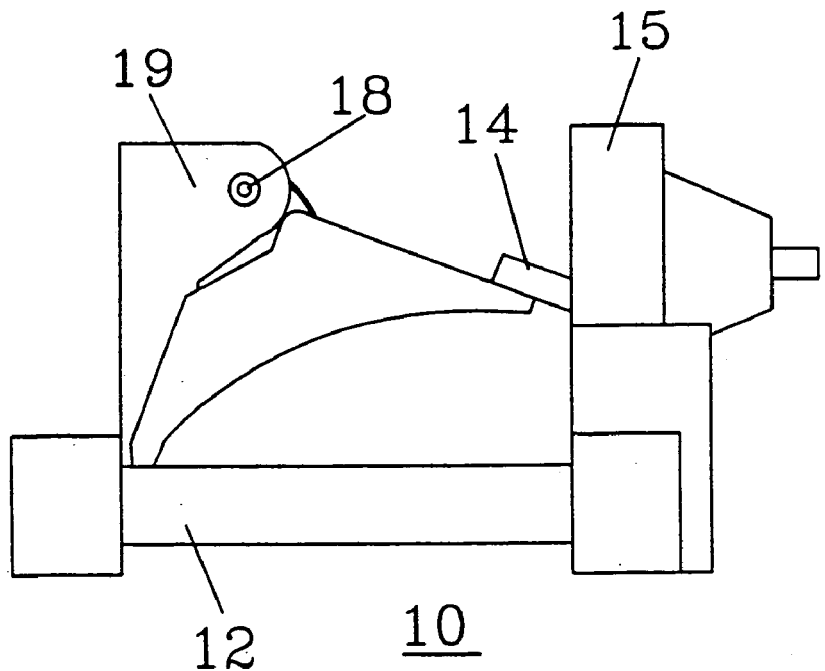

FIG. 2 shows engine 10 with flywheel 15 rotated so that shaft 14 is at the bottom of flywheel 15. Transition arm 13 has pivoted downward on shaft 18.

FIGS. 3–6 show a top view of the pictorial representation, showing the transition arm 13 in four positions and shaft moving flywheel 15 in 90° increments. FIG. 3 shows flywheel 15 with shaft 14 in the position as illustrated in FIG. 3a. When piston 1 fires and moves toward the middle of cylinder 11, transition arm 13 will pivot on universal joint 16 rotating flywheel 15 to the position shown in FIG. 2. Shaft 14 will be in the position shown in FIG. 4a. When piston 4 is fired, transition arm 13 will move to the position shown in FIG. 5. Flywheel 15 and shaft 14 will be in the position shown in FIG. 5a. Next piston 2 will fire and transition arm 13 will be moved to the position shown in FIG. 6. Flywheel 15 and shaft 14 will be in the position shown in FIG. 6a. When piston 3 is fired, transition arm 13 and flywheel 15 will return to the original position that shown in FIGS. 3 and 3a.

When the pistons fire, transition arm will be moved back and forth with the movement of the pistons. Since transition arm 13 is connected to universal joint 16 and to flywheel 15 through shaft 14, flywheel 15 rotates translating the linear motion of the pistons to a rotational motion.

Figure 7:
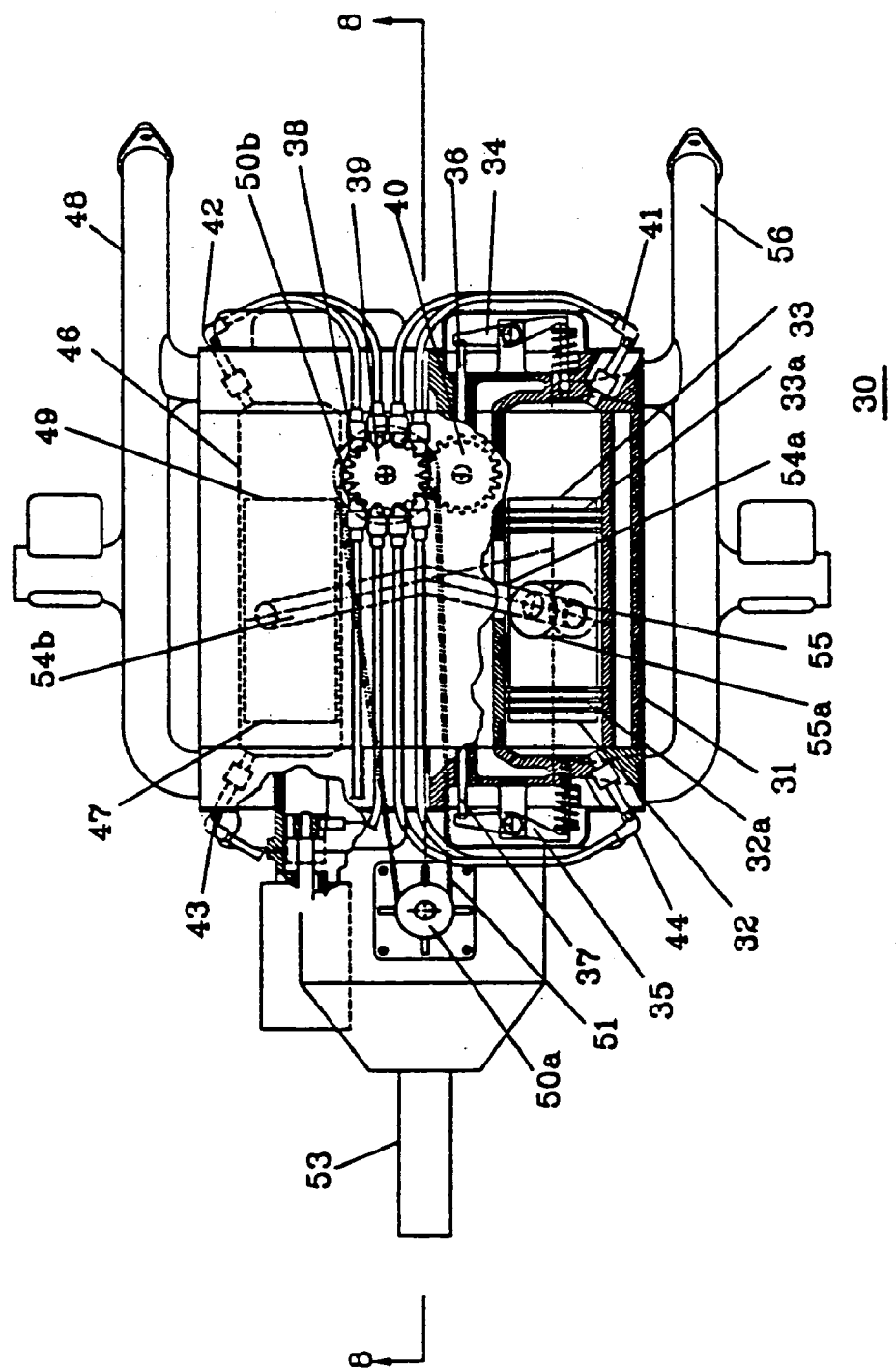
FIG. 7 is a top view, partially in cross-section of an eight cylinder engine of the present invention.

FIG. 7 shows (in partial cross-section) a top view of an embodiment of a four double piston, eight cylinder engine 30 according to the present invention. There are actually only four cylinders, but with a double piston in each cylinder, the engine is equivalent to a eight cylinder engine. Two cylinders 31 and 46 are shown. Cylinder 31 has double ended piston 32, 33 with piston rings 32a and 33a, respectively. Pistons 32, 33 are connected to a transition arm 60 (FIG. 8) by piston arm 54a extending into opening 55a in piston 32, 33 and sleeve bearing 55. Similarly piston 47, 49, in cylinder 46 is connected by piston arm 54b to transition arm 60.

Each end of cylinder 31 has inlet and outlet valves controlled by a rocker arms and a spark plug. Piston end 32 has rocker arms 35a and 35b and spark plug 44, and piston end 33 has rocker arms 34a and 34b, and spark plug 41. Each piston has associated with it a set of valves, rocker arms and a spark plug. Timing for firing the spark plugs and opening and closing the inlet and exhaust values is controlled by a timing belt 51 which is connected to pulley 50a. Pulley 50a is attached to a gear 64 by shaft 63 (FIG. 8) turned by output shaft 53 powered by flywheel 69. Belt 50a also turns pulley 50b and gear 39 connected to distributor 38. Gear 39 also turns gear 40. Gears 39 and 40 are attached to cam shaft 75 (FIG. 8) which in turn activate push rods that are attached to the rocker arms 34, 35 and other rocker arms not illustrated.

Exhaust manifolds 48 and 56 as shown attached to cylinders 46 and 31 respectively. Each exhaust manifold is attached to four exhaust ports.

Figure 8:
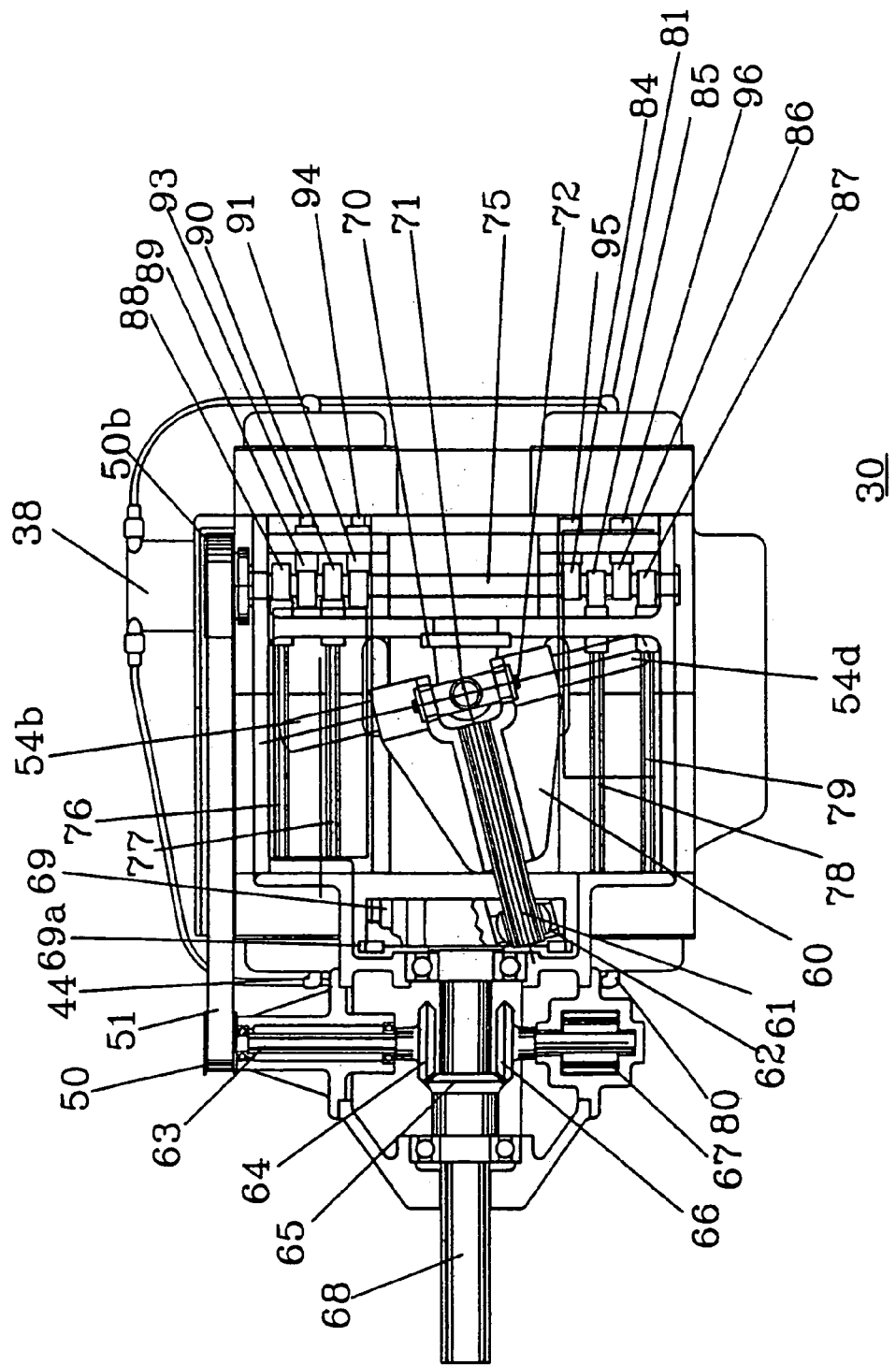
FIG. 8 is a side view in cross-section of the engine of FIG. 7.

FIG. 8 is a side view of engine 30, with one side removed, and taken through section 8—8 of FIG. 7. Transitions arm 60 is mounted on support 70 by pin 72 which allows transition arm to move up and down (as viewed in FIG. 8) and pin 71 which allows transition arm 60 to move from side to side. Since transition arm 60 can move up and down while moving side to side, then shaft 61 can drive flywheel 69 in a circular path. The four connecting piston arms (piston arms 54b and 54d shown in FIG. 8) are driven by the four double end pistons in an oscillator motion around pin 71. The end of shaft 61 in flywheel 69 causes transition arm to move up and down as the connection arms move back and forth. Flywheel 69 has gear teeth 69a around one side which may be used for turning the flywheel with a starter motor 100 (FIG. 11) to start the engine.

The rotation of flywheel 69 and drive shaft 68 connected thereto, turns gear 65 which in turn turns gears 64 and 66. Gear 64 is attached to shaft 63 which turns pulley 50a. Pulley 50a is attached to belt 51. Belt 51 turns pulley 50b and gears 39 and 40 (FIG. 7). Cam shaft 75 has cams 88–91 on one end and cams 84–87 on the other end. Cams 88 and 90 actuate push rods 76 and 77, respectively. Cams 89 and 91 actuate push rods 93 and 94, respectively. Cams 84 and 86 actuate push rods 95 and 96, respectively, and cams 85 and 87 actuate push rods 78 and 79, respectively. Push rods 77, 76, 93, 94, 95, 96 and 78, 79 are for opening and closing the intake and exhaust valves of the cylinders above the pistons. The left side of the engine, which has been cutaway, contains an identical, but opposite valve drive mechanism.

Gear 66 turned by gear 65 on drive shaft 68 turns pump 67, which may be, for example, a water pump used in the engine cooling system (not illustrated), or an oil pump.

Figure 9:
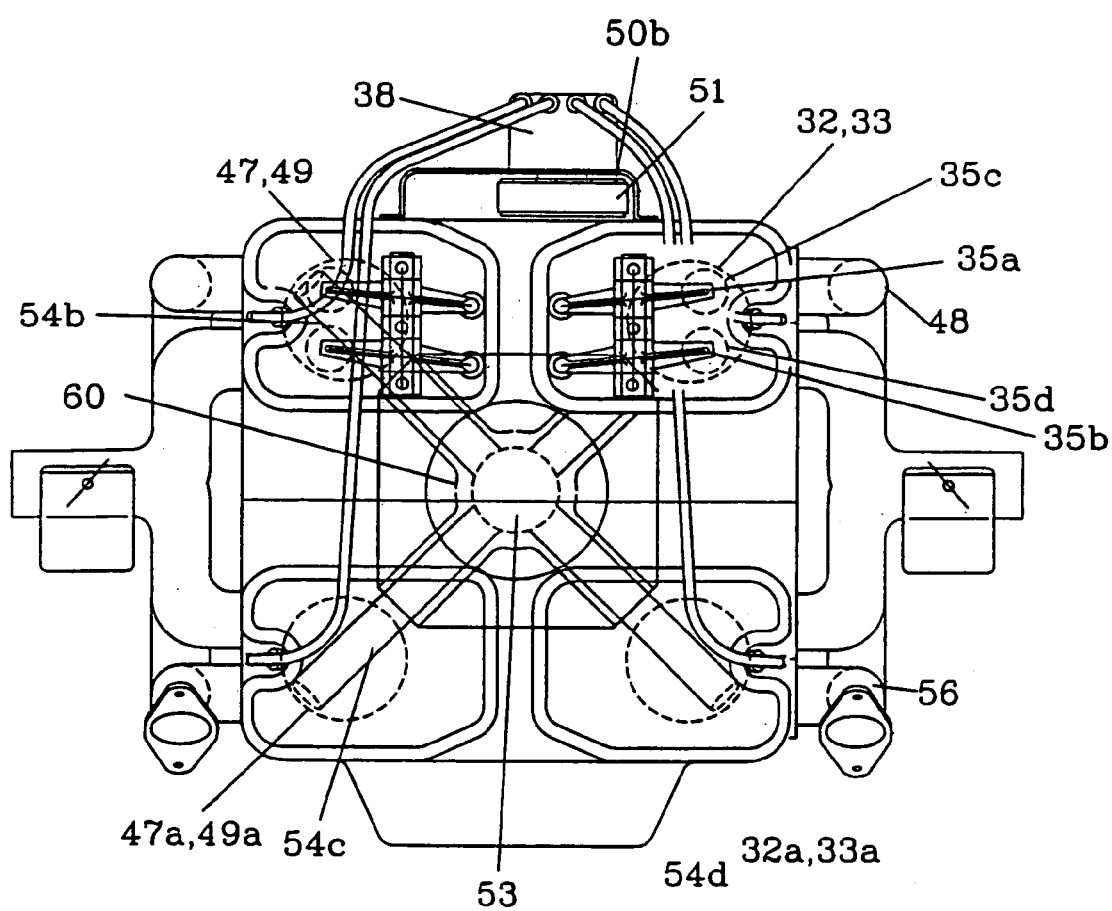
FIG. 9 is a right end view of FIG. 7.

FIG. 9 is a rear view of engine 30 showing the relative positions of the cylinders and double ended pistons. Piston 32, 33 is shown in dashed lines with valves 35c and 35d located under lifter arms 35a and 35b, respectively. Belt 51 and pulley 50b are shown under distributor 38. Transition arm 60 and two, 54c and 54d, of the four piston arms 54a, 54b, 54c and 54d are shown in the pistons 32–33, 32a–33a, 47–49 and 47a–49a.

Figure 10:
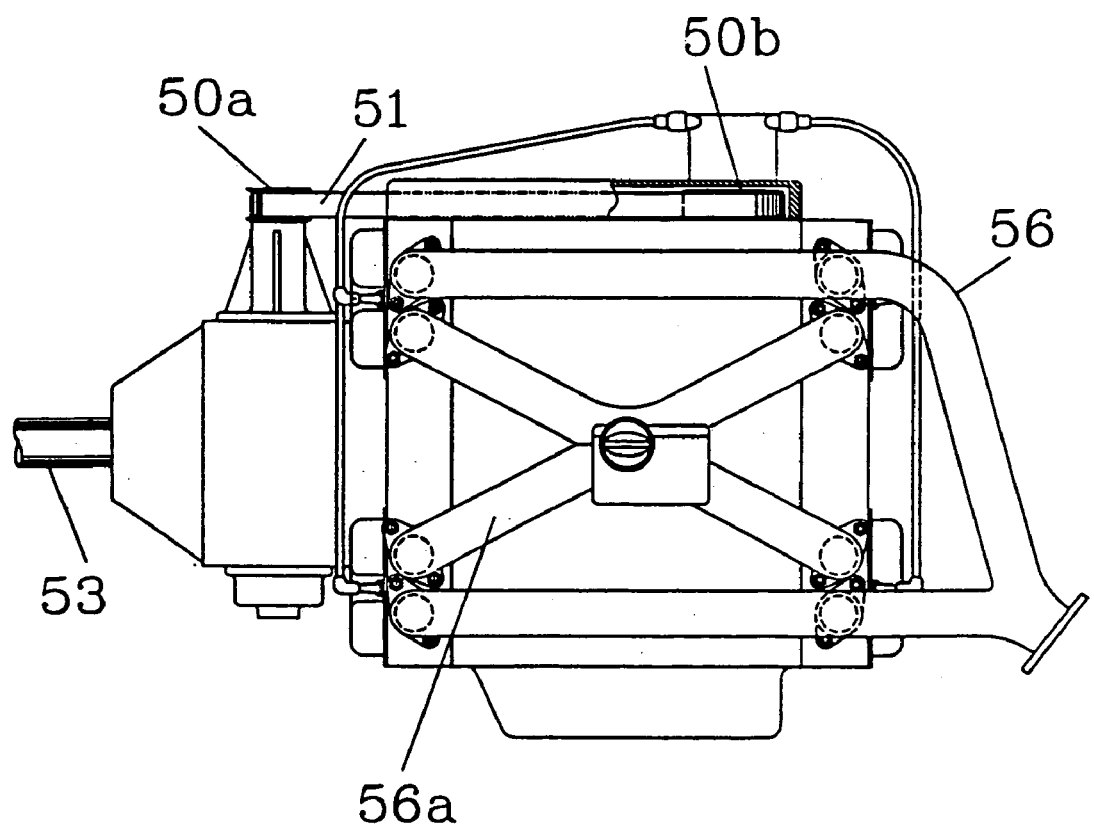
FIG. 10 is a side view of FIG. 7.

FIG. 10 is a side view of engine 30 showing the exhaust manifold 56, intake manifold 56a and carburetor 56c. Pulleys 50a and 50b with timing belt 51 are also shown.

Figure 11:
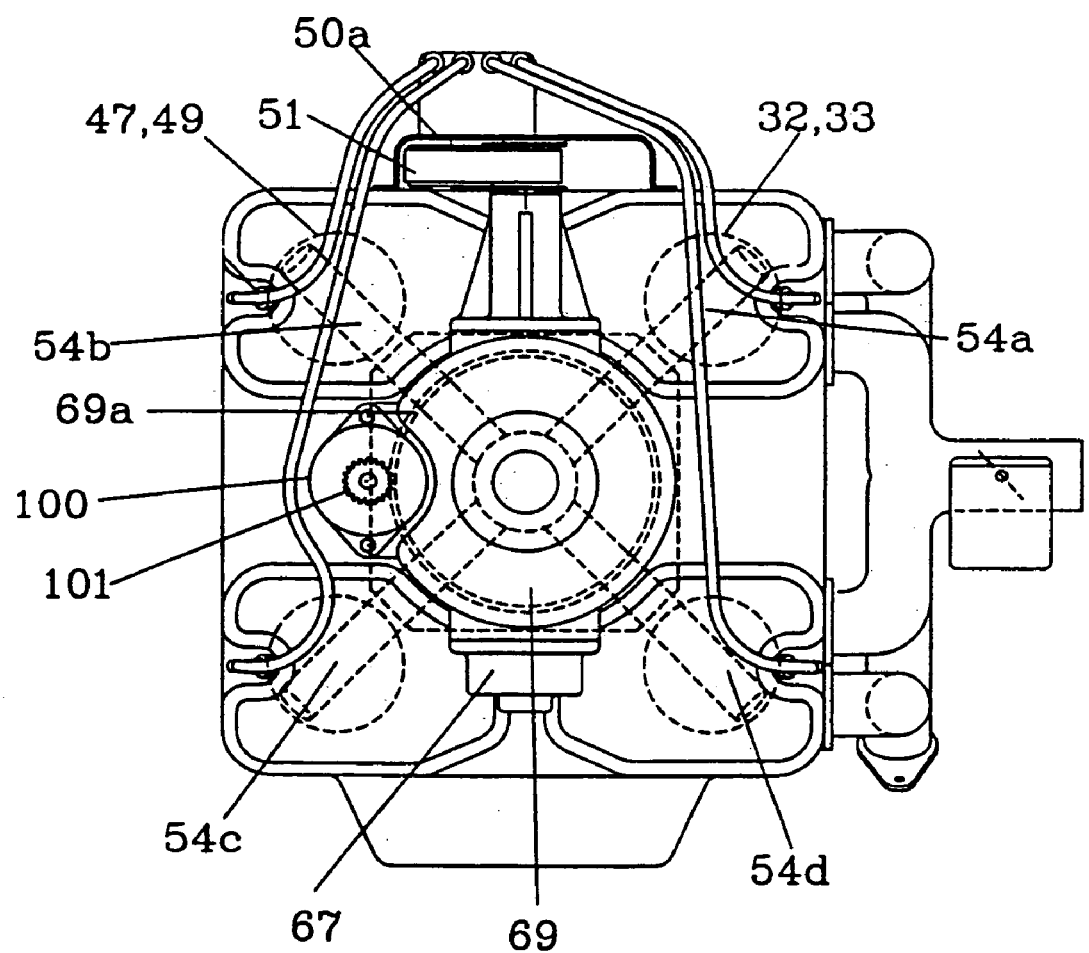
FIG. 11 is a left end view of FIG. 7.

FIG. 11 is a front end view of engine 30 showing the relative positions of the cylinders and double ended pistons 32–33, 32a–33a, 47–49 and 47a–49a with the four piston arms 54a, 54b, 54c and 54d positioned in the pistons. Pump 67 is shown below s shaft 53, and pulley 50a and timing belt 51 are shown at the top of engine 30. Starter 100 is shown with gear 101 engaging the gear teeth 69a on flywheel 69.

A feature of the invention is that the compression ratio for the engine can be changed while the engine is running. The end of arm 61 mounted in flywheel 69 travels in a circle at the point where arm 61 enters flywheel 69. Referring to FIG. 13, the end of arm 61 is in a sleeve bearing ball bushing assembly 81. The stroke of the pistons is controlled by arm 61. Arm 61 forms an angle, for example about 15°, with shaft 53. By moving flywheel 69 on shaft 53 to the right or left, as viewed in FIG. 13, the angle of arm 61 can be changed, changing the stroke of the pistons, changing the compression ratio. The position of flywheel 69 is changed by turning nut 104 on threads 105. Nut 104 is keyed to shaft 53 by thrust bearing 106a held in place by ring 106b. In the position shown in FIG. 12, flywheel 69 has been moved to the right, extending the stroke of the pistons.

Figure 12:
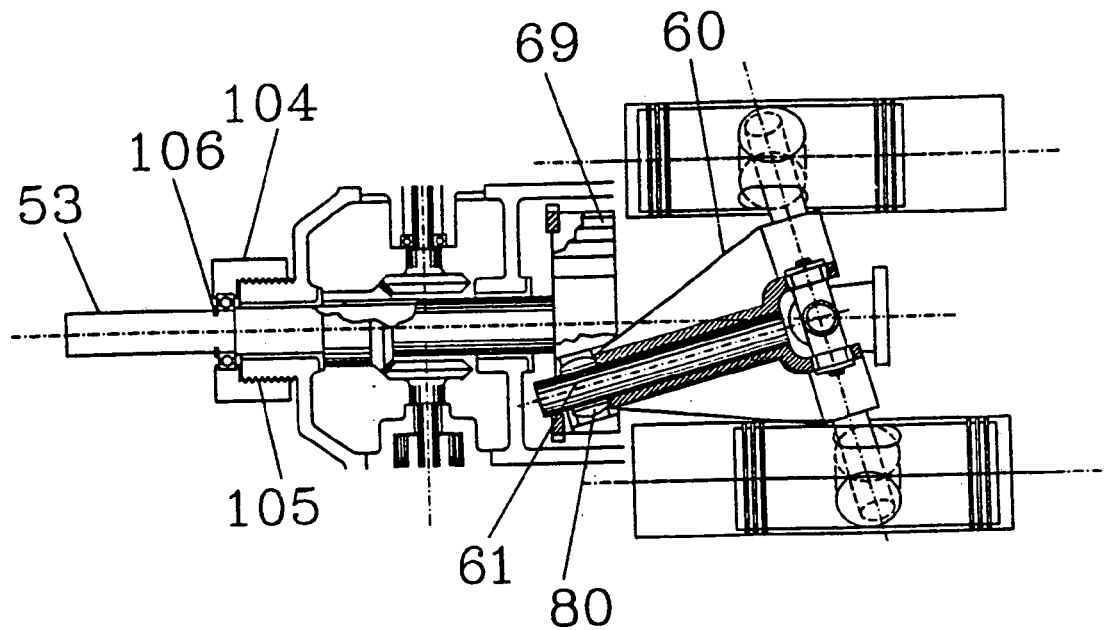
FIG. 12 is a partial top view of the engine of FIG. 7 showing the pistons, drive member and flywheel in a high compression position.
Figure 13:
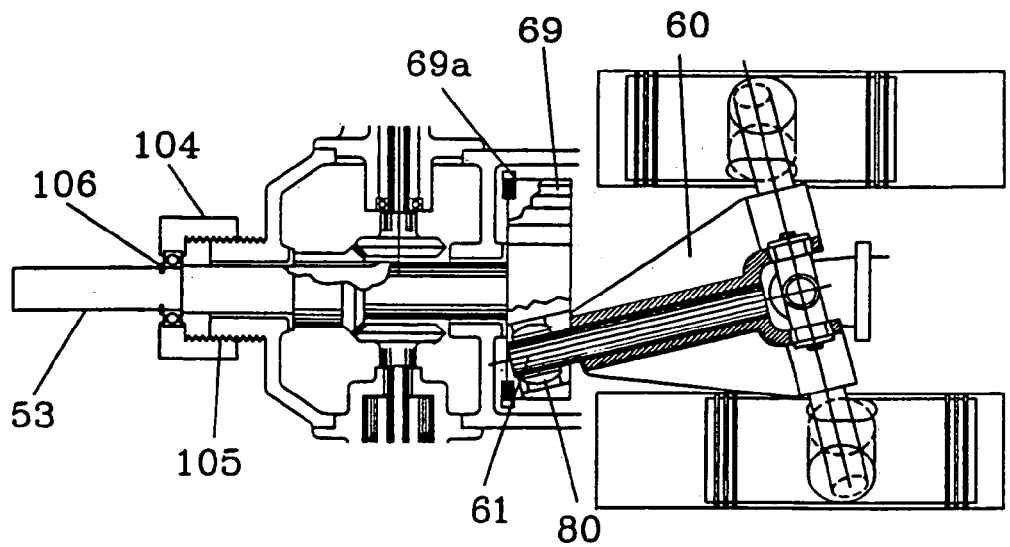
FIG. 13 is a partial top view of the engine in FIG. 7 showing the pistons, drive member and flywheel in a low compression position.

FIG. 12 shows flywheel moved to the right increasing the stroke of the pistons, providing a higher compression ratio.

Nut 105 has been screwed to the right, moving shaft 53 and flywheel 69 to the right. Arm 61 extends further into bushing assembly 80 and out the back of flywheel 69.

FIG. 13 shows flywheel moved to the left reducing the stroke of the pistons, providing a lower compression ratio. Nut 105 has been screwed to the left, moving shaft 53 and flywheel 69 to the left. Arm 61 extends less into bushing assembly 80.

The piston arms on the transition arm are inserted into sleeve bearings in a bushing in piston. FIG. 14 shows a double piston 110 having piston rings 111 on one end of the double piston and piston rings 112 on the other end of the double piston. A slot 113 is in the side of the piston. The location the sleeve bearing is shown at 114.

FIG. 15 shows a piston arm 116 extending into piston 110 through slot 116 into sleeve bearing 117 in bushing 115. Piston arm 116 is shown in a second position at 116a. The two pistons arms 116 and 116a show the movement limits of piston arm 116 during operation of the engine.

FIG. 16 shows piston arm 116 in sleeve bearing 117. Sleeve bearing 117 is in pivot pin 115. Piston arm 116 can freely rotate in sleeve bearing 117 and the assembly of piston arm 116. Sleeve bearing 117 and pivot pin 115 and sleeve bearings 118a and 118b rotate in piston 110, and piston arm 116 can be moved axially with the axis of sleeve bearing 117 to allow for the linear motion of double ended piston 110, and the motion of a transition arm to which piston arm 116 is attached.

Figure 17:
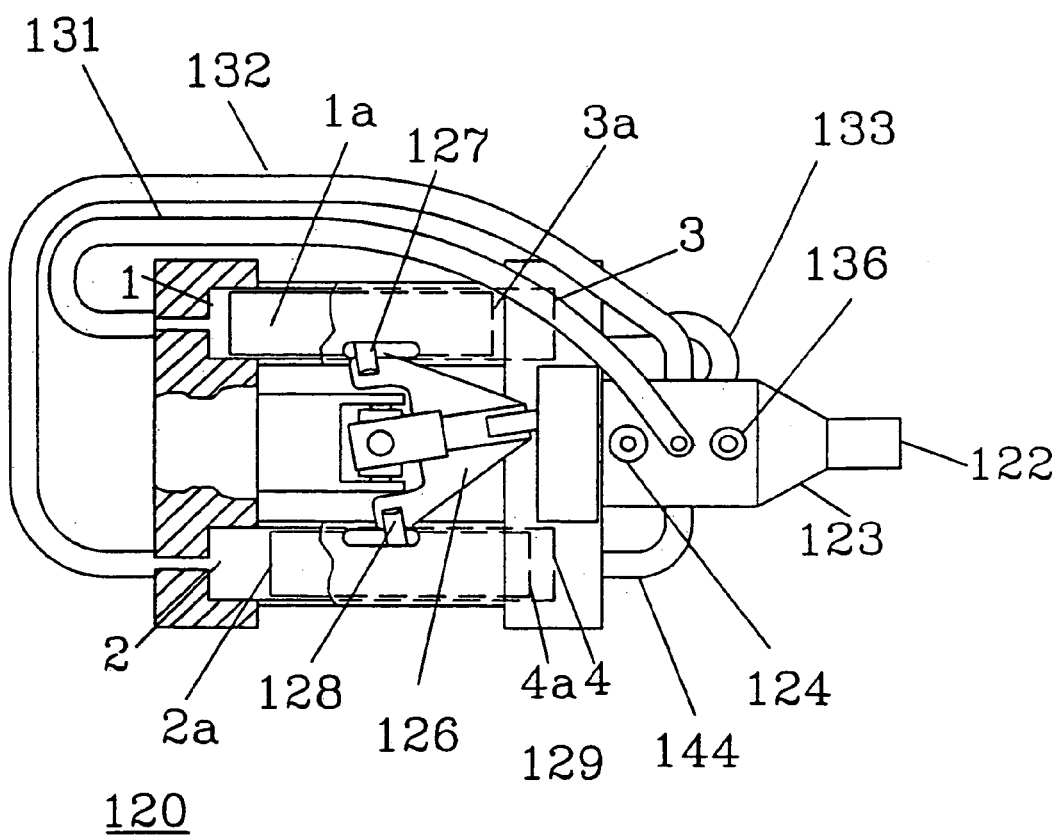
FIG. 17 is an air driven engine/pump embodiment.

FIG. 17 shows how the four cylinder engine 10 in FIG. 1 may be configured as an air motor using a four way rotary valve 123 on the output shaft 122. Each of cylinders 1, 2, 3 and 4 are connected by hoses 131. 132, 133, and 144, respectively, to rotary valve 123. Air inlet port 124 is used to supply air to run engine 120. Air is sequentially supplied to each of the pistons 1a, 2a, 3a and 4a, to move the pistons back and forth in the cylinders. Air is exhausted from the cylinders out exhaust port 136. Transition arm 126, attached to the pistons by connecting pins 127 and 128 are moved as described with references to FIGS. 1–6 to turn flywheel 129 and output shaft 22.

Figure 18:
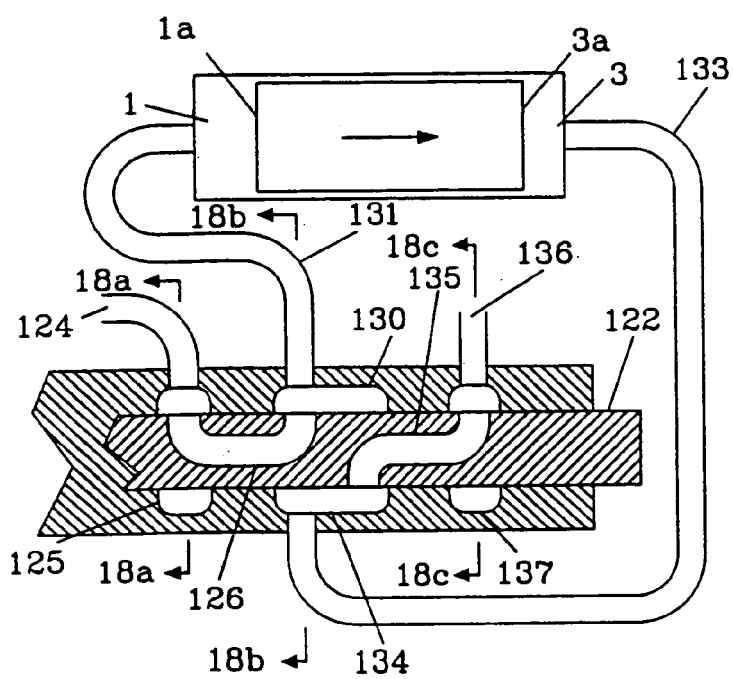
FIG. 18 illustrates the air valve in a first position.

FIG. 18 is a cross-sectional view of rotary valve 123 in the position when pressurized air or gas is being applied to cylinder 1 through inlet port 124, annular channel 125, channel 126, channel 130, and air hose 131. Rotary valve 123 is made up of a plurality of channels in housing 123 and output shaft 122. The pressurized air entering cylinder 1 causes piston 1a, 3a to move to the right (as viewed in FIG. 18). Exhaust air is forced out of cylinder 3 through line 133 into chamber 134, through passageway 135 and out exhaust outlet 136.

Figure 18A:
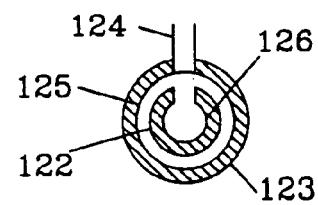
FIGS. 18a, 18b and 18c are cross-sectional view of three cross-sections of the air valve shown in FIG. 18.
Figure 18B:
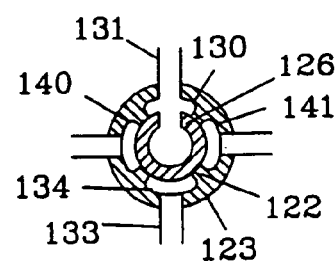
Figure 18C:
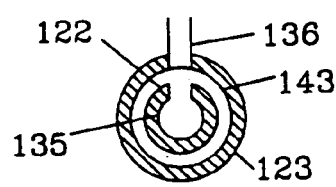

FIGS. 18a, 18b and 18c are cross-sectional view of valve 23 showing the air passages of the valves at three positions along valve 23 when positioned as shown in FIG. 18.

Figure 19:
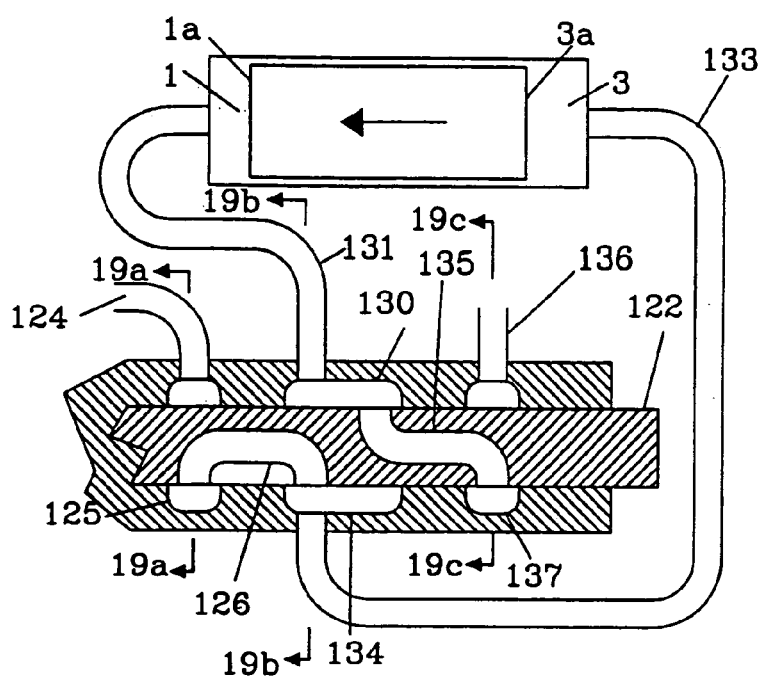
FIG. 19 illustrates the air valve in a second position.

FIG. 19 shows rotary valve 123 rotated 180° when pressurized air is applied to cylinder 3, reversing the direction of piston 1a, 3a. Pressurized air is applied to inlet port 124, through annular chamber 125, passage way 126, chamber 134 and air line 133 to cylinder 3. This in turn causes air in cylinder 1 to be exhausted through line 131, chamber 130, line 135, annular chamber 137 and out exhaust port 136. Shaft 122 will have rotated 360° turning counter clockwise when piston 1a, 3a complete it stroke to the left.

Only piston 1a,3a have been illustrated to show the operation of the air engine and valve 123 relative to the piston motion. The operation of piston 2a,4a is identical in function except that its 360° cycle starts at 90° shaft rotation and reverses at 270° and completes its cycle back at 90°. A power stroke occurs at every 90° of rotation.

Figure 19A:
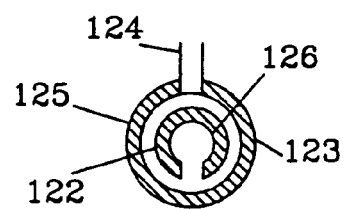
FIGS. 19a, 19b and 19c are cross-sectional view of three cross-sections for the air valve shown in FIG. 19.
Figure 19B:
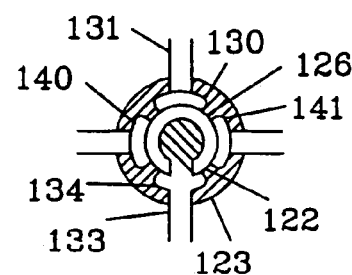
Figure 19C:
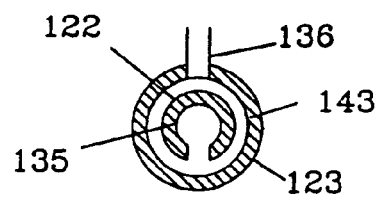

FIGS. 19a, 19b and 19c are cross-sectional views of valve 123 showing the air passages of the valves at three positions along valve 123 when positioned as shown in FIG. 19.

The principle of operation which operates the air engine of FIG. 17 can be reversed, and engine 120 of FIG. 17 can be used as an air or gas compressor or pump. By rotating engine 10 clockwise by applying rotary power to shaft 122, exhaust port 136 will draw in air into the cylinders and port 124 will supply air which may be used to drive, for example air tool, or be stored in an air tank.

Figure 20:
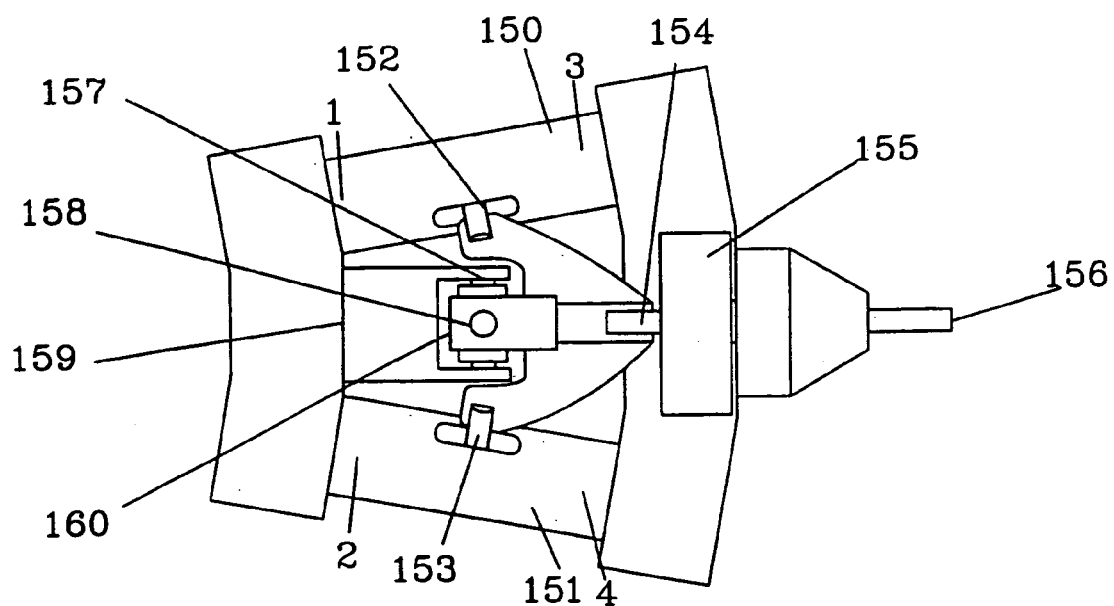
FIG. 20 shows an embodiment with slanted cylinders.

In the above embodiments, the cylinders have been illustrated as being parallel to each other. However, the cylinders need not be parallel. FIG. 20 shows an embodiment similar to the embodiment of FIGS. 1–6, with cylinders 150 and 151 not parallel to each other. Universal joint 160 permits the piston arms 152 and 153 to be at an angle other than 90° to the drive arm 154. Even with the cylinders not parallel to each other the engines are functionally the same.

Figure 21:
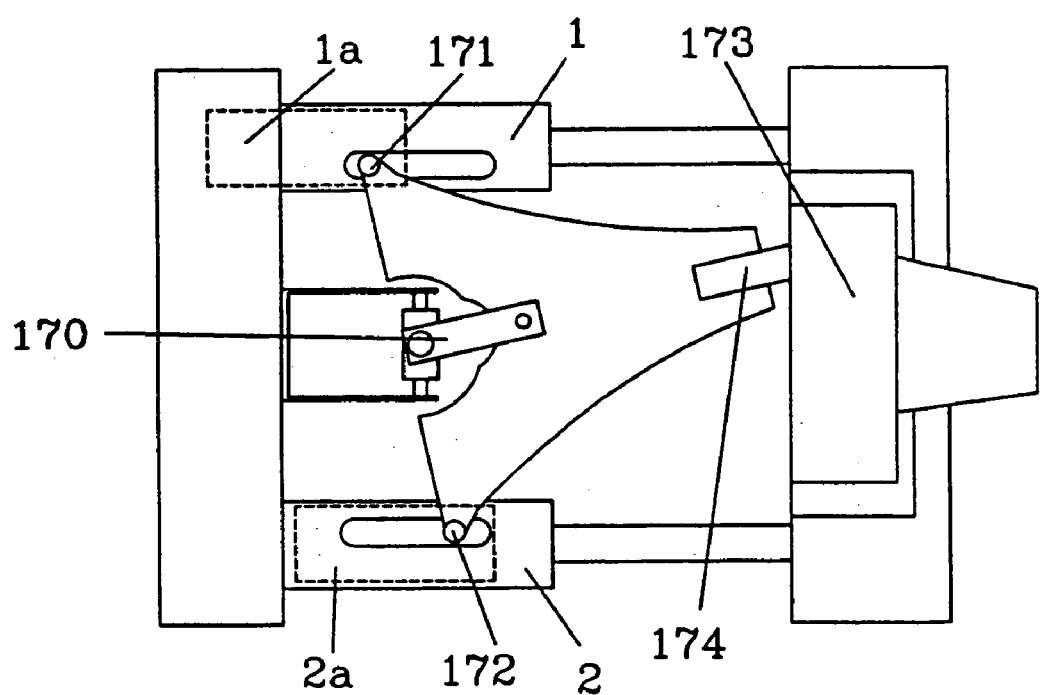
FIG. 21 shows an embodiment with single ended pistons.

Still another modification may be made to the engine 10 of FIGS. 1–6. This embodiment, pictorially shown in FIG. 21, may have single ended pistons. Piston 1a and 2a are connected to universal joint 170 by drive arms 171 and 172, and to flywheel 173 by drive arm 174. The basic difference is the number of strokes of pistons 1a and 2a to rotate flywheel 173 360°.

Figure 22:
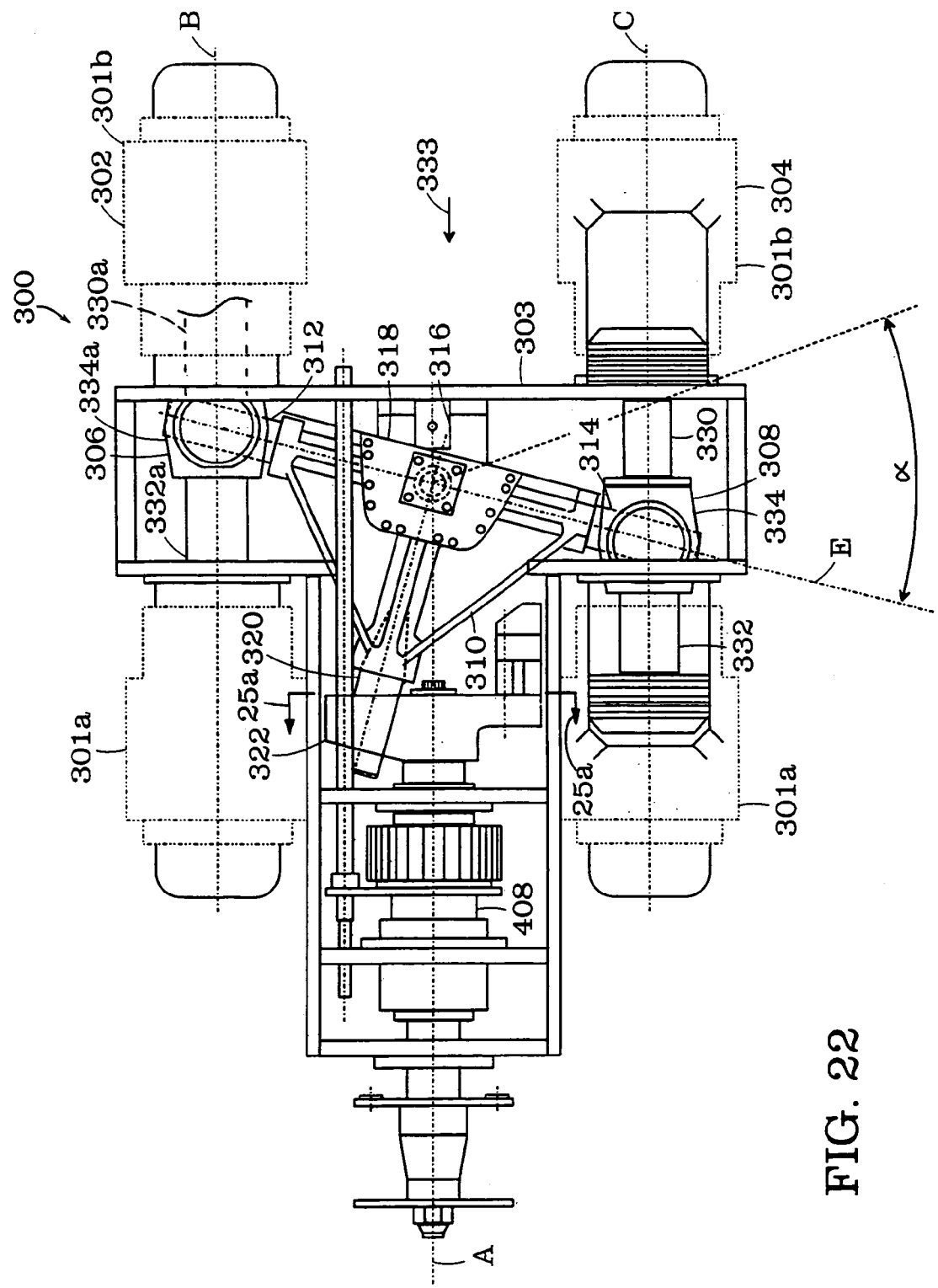
FIG. 22 is a top view of a two cylinder, double ended piston assembly.

Referring to FIG. 22, a two cylinder piston assembly 300 includes cylinders 302, 304, each housing a variable stroke, double ended piston 306, 308, respectively. Piston assembly 300 provides the same number of power strokes per revolution as a conventional four cylinder engine. Each double ended piston 306, 308 is connected to a transition arm 310 by a drive pin 312, 314, respectively. Transition arm 310 is mounted to a support 316 by, e.g., a universal joint 318 (U-joint), constant velocity joint, or spherical bearing. A drive arm 320 extending from transition arm 310 is connected to a rotatable member, e.g., flywheel 322.

Transition arm 310 transmits linear motion of pistons 306, 308 to rotary motion of flywheel 322. The axis, A, of flywheel 322 is parallel to the axes, B and C, of pistons 306, 308 (though axis, A, could be off-axis as shown in FIG. 20) to form an axial or barrel type engine, pump, or compressor. U-joint 318 is centered on axis, A. As shown in FIG. 28a, pistons 306, 308 are 180° apart with axes A, B and C lying along a common plane, D, to form a flat piston assembly.

Figure 23:
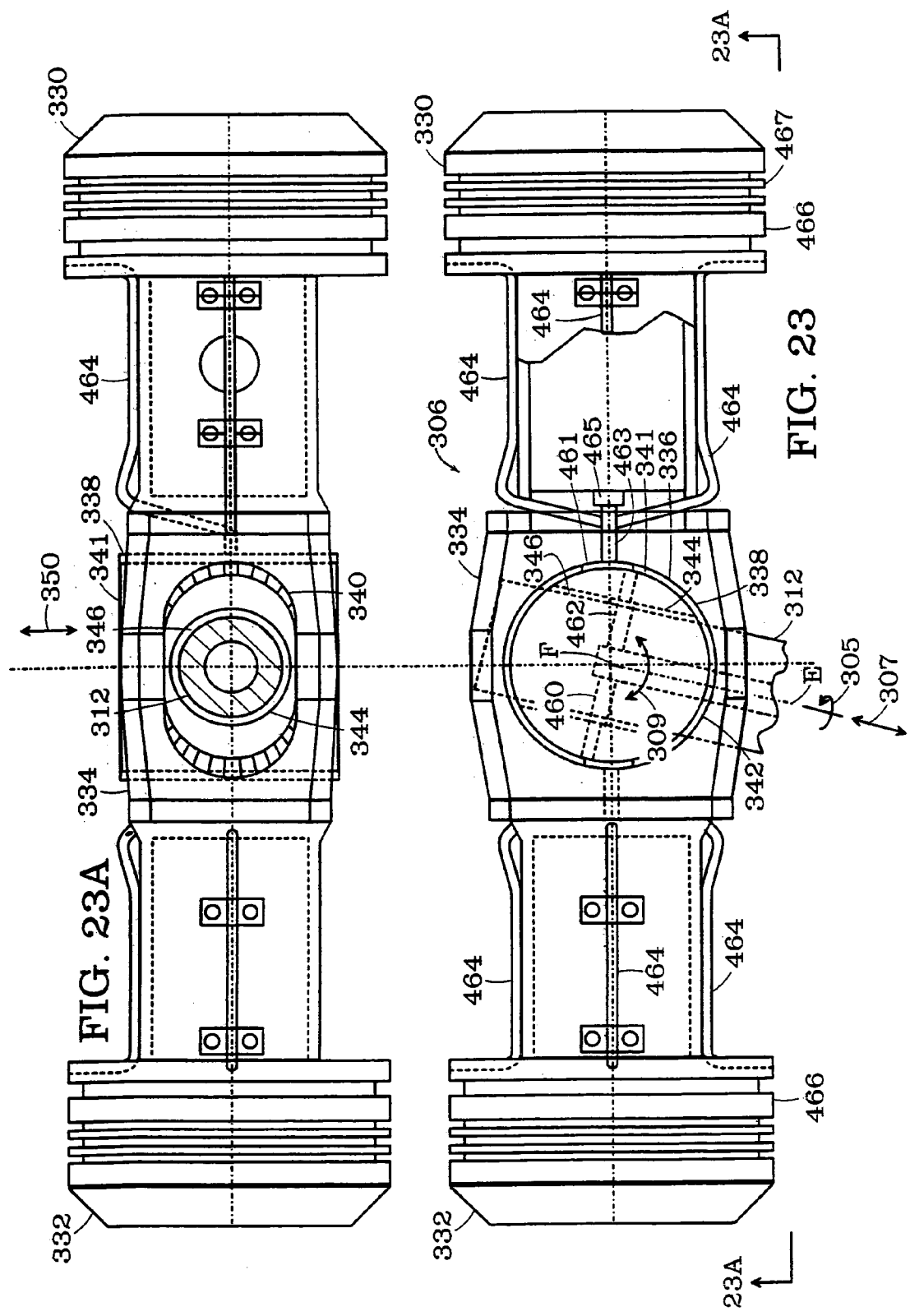
FIG. 23 is a top view of one of the double ended pistons of the assembly of FIG. 22.

Referring to FIGS. 22 and 23, cylinders 302, 304 each include left and right cylinder halves 301a, 301b mounted to the assembly case structure 303. Double ended pistons 306, 308 each include two pistons 330 and 332, 330a and 332a, respectively, joined by a central joint 334, 334a, respectively. The pistons are shown having equal length, though other lengths are contemplated. For example, joint 334 can be off-center such that piston 330 is longer than piston 332. As the pistons are fired in sequence 330a, 332, 330, 332a, from the position shown in FIG. 22, flywheel 322 is rotated in a clockwise direction, as viewed in the direction of arrow 333. Piston assembly 300 is a four stroke cycle engine, i.e., each piston fires once in two revolutions of flywheel 322.

As the pistons move back and forth, drive pins 312, 314 must be free to rotate about their common axis, E, (arrow 305), slide along axis, E, (arrow 307) as the radial distance to the center line, B, of the piston changes with the angle of swing, α, of transition arm 310 (approximately ±15° swing), and pivot about centers, F, (arrow 309). Joint 334 is constructed to provide this freedom of motion.

Joint 334 defines a slot 340 (FIG. 23a) for receiving drive pin 312, and a hole 336 perpendicular to slot 340 housing a sleeve bearing 338. A cylinder 341 is positioned within sleeve bearing 338 for rotation within the sleeve bearing. Sleeve bearing 338 defines a side slot 342 shaped like slot 340 and aligned with slot 340. Cylinder 341 defines a through hole 344. Drive pin 312 is received within slot 342 and hole 344. An additional sleeve bearing 346 is located in through hole 344 of cylinder 341. The combination of slots 340 and 342 and sleeve bearing 338 permit drive pin 312 to move along arrow 309. Sleeve bearing 346 permits drive pin 312 to rotate about its axis, E, and slide along its axis, E.

If the two cylinders of the piston assembly are configured other than 180° apart, or more than two cylinders are employed, movement of cylinder 341 in sleeve bearing 338 along the direction of arrow 350 allows for the additional freedom of motion required to prevent binding of the pistons as they undergo a FIG. 8 motion, discussed below. Slot 340 must also be sized to provide enough clearance to allow the FIG. 8 motion of the pin.

Figure 35:
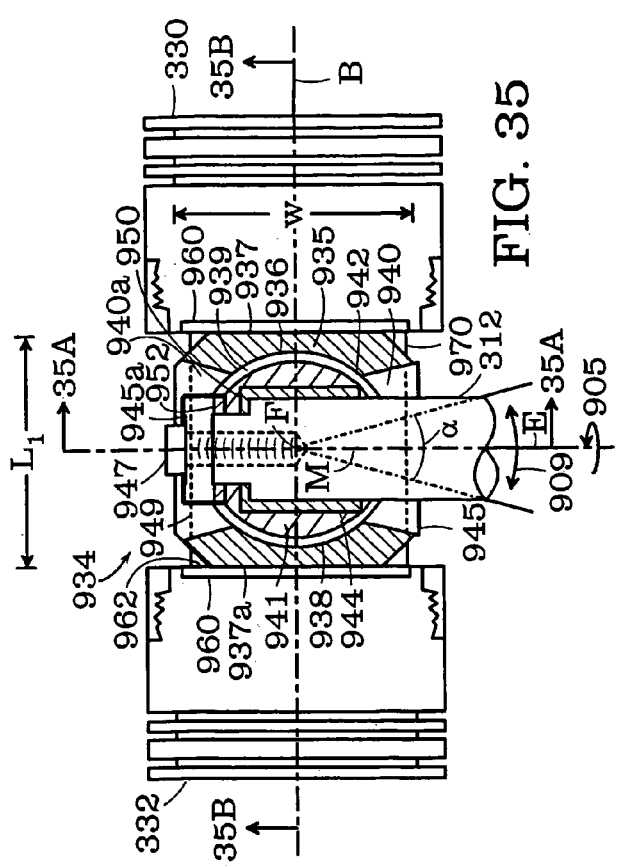
FIG. 35 is a partial, cross-sectional top view of an alternative embodiment of a double-ended piston joint.
Figure 35B:
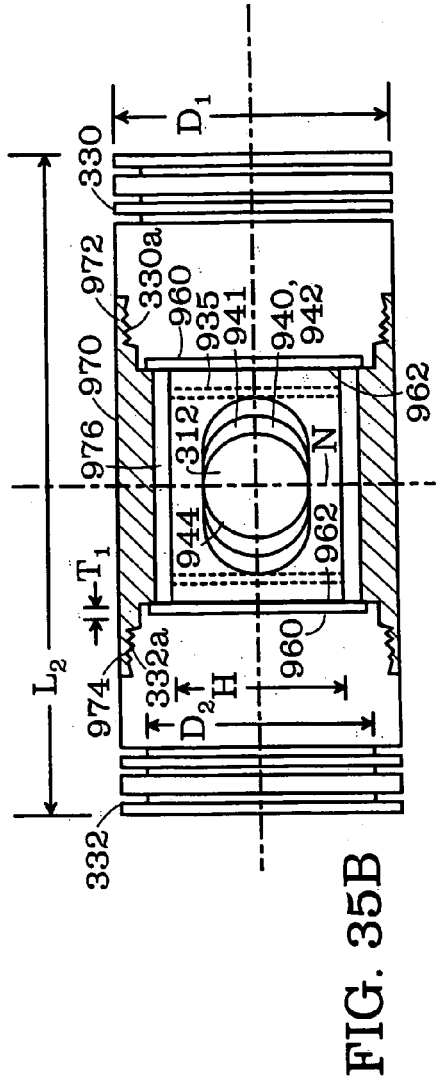
FIG. 35A is an end view and FIG. 35B is a side view of the double-ended piston joint, taken along lines 35A, 35A and 35B, 35B, respectively, of FIG. 35.
Figure 35A:
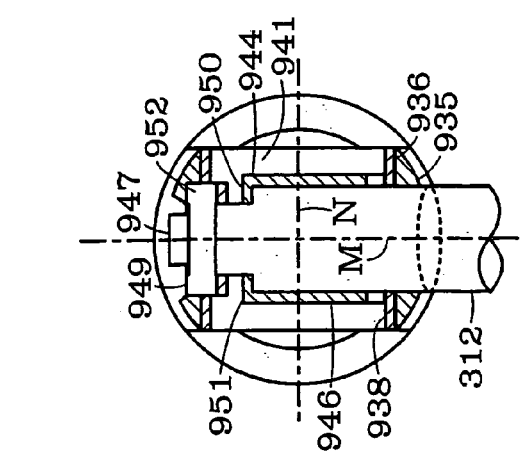

Referring to FIGS. 35–35B, an alternative embodiment of a central joint 934 for joining pistons 330 and 332 is configured to produce zero side load on pistons 330 and 332. Joint 934 permits the four degrees of freedom necessary to prevent binding of drive pin 312 as the pistons move back and forth, i.e., rotation about axis, E, (arrow 905), pivoting about center, F, (arrow 909), and sliding movement along orthogonal axes, M (up and down in the plane of the paper in FIG. 35) and N (in and out of the plane of the paper in FIG. 35), while the load transmitted between joint 934 and pistons 330, 332 only produces a force vector which is parallel to piston axis, B (which is orthogonal to axes M and N).

Sliding movement along axis, M, accommodates the change in the radial distance of transition arm 310 to the center line, B, of the piston with the angle of swing, α, of transition arm 310. Sliding movement along axis, N, allows for the additional freedom of motion required to prevent binding of the pistons as they undergo the figure eight motion, discussed below. Joint 934 defines two opposed flat faces 937, 937a which slide in the directions of axes M and N relative to pistons 330, 332. Faces 937, 937a define parallel planes which remain perpendicular to piston axis, B, during the back and forth movement of the pistons.

Joint 934 includes an outer slider member 935 which defines faces 937, 937a for receiving the driving force from pistons 330, 332. Slider member 935 defines a slot 940 in a third face 945 of the slider for receiving drive pin 312, and a slot 940a in a fourth face 945a. Slider member 935 has an inner wall 936 defining a hole 939 perpendicular to slot 940 and housing a slider sleeve bearing 938. A cross shaft 941 is positioned within sleeve bearing 938 for rotation within the sleeve bearing in the direction of arrow 909. Sleeve bearing 938 defines a side slot 942 shaped like slot 940 and aligned with slot 940. Cross shaft 941 defines a through hole 944. Drive pin 312 is received within slot 942 and hole 944. A sleeve bearing 946 is located in through hole 944 of cross shaft 941.

The combination of slots 940 and 942 and sleeve bearing 938 permit drive pin 312 to move in the direction of arrow 909. Positioned within slot 940a is a cap screw 947 and washer 949 which attach to drive pin 312 retaining drive pin 312 against a step 951 defined by cross shaft 941 while permitting drive pin 312 to rotate about its axis, E, and preventing drive pin 312 from sliding along axis, E. As discussed above, the two addition freedoms of motion are provided by sliding of slider faces 937, 937a relative to pistons 330, 332 along axis, M and N. A plate 960 is placed between each of face 937 and piston 330 and face 937a and piston 332. Each plate 960 is formed of a low friction bearing material with a bearing surface 962 in contact with faces 937, 937a, respectively. Faces 937, 937a are polished.

Figure 36:
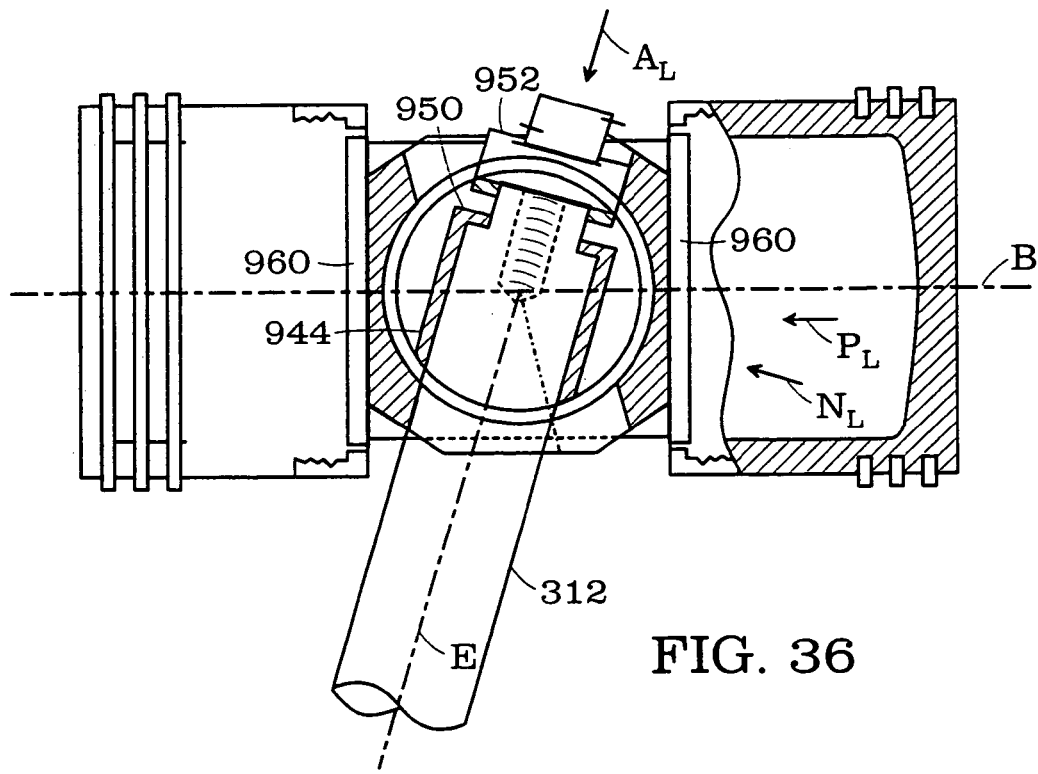
FIG. 36 is a partial, cross-sectional top view of the double-ended piston joint of FIG. 35 shown in a rotated position.

As shown in FIG. 36, the load, $P_L$, applied to joint 934 by piston 330 in the direction of piston axis, B, is resolved into two perpendicular loads acting on pin 312: axial load, $A_L$, along the axis, E, of drive pin 312, and normal load, $N_L$, perpendicular to drive pin axis, E. The axial load is applied to thrust bearings 950, 952, and the normal load is applied to sleeve bearing 946. The net direction of the forces transmitted between pistons 330, 332 and joint 934 remains along piston axis, B, preventing side loads being applied to pistons 330, 332. This is advantageous because side loads on pistons 330, 332 can cause the pistons to contact the cylinder wall creating frictional losses proportional to the side load values.

Pistons 330, 332 are mounted to joint 934 by a center piece connector 970. Center piece 970 includes threaded ends 972, 974 for receiving threaded ends 330a and 332a of the pistons, respectively. Center piece 970 defines a cavity 975 for receiving joint 934. A gap 976 is provided between joint 934 and center piece 970 to permit motion along axis, N.

For an engine capable of producing, e.g., about 100 horsepower, joint 934 has a width, W, of, e.g., about 3 5/16 inches, a length, $L_1$, of, e.g., 3 5/16 inches, and a height, H, of, e.g., about 3 1/2 inches. The joint and piston ends together have an overall length, $L_2$, of, e.g., about 9 5/16 inches, and a diameter, $D_1$, of, e.g., about 4 inches. Plates 960 have a diameter, $D_2$, of, e.g., about 3 1/4 inch, and a thickness, T, of, e.g., about 1/8 inch. Plates 960 are press fit into the pistons. Plates 960 are preferably bronze, and slider 935 is preferably steel or aluminum with a steel surface defining faces 937, 937a.

Figure 37:
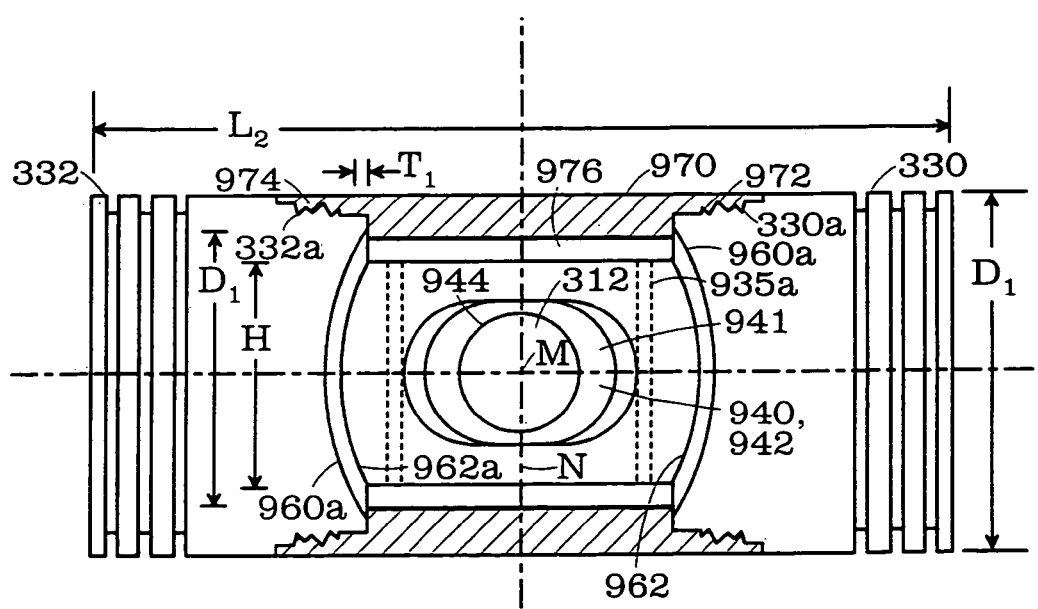
FIG. 37 is a side view of an alternative embodiment of the joint of FIG. 35.

Joint 934 need not be used to join two pistons. One of pistons 330, 332 can be replaced by a rod guided in a bushing.

Where figure eight motion is not required or is allowed by motion of drive pin 312 within cross shaft 941, joint 934 need not slide in the direction of axis, N. Referring to FIG. 37, slider member 935a and plates 960a have curved surfaces permitting slider member 935a to slide in the direction of axis, M, (in and out of the paper in FIG. 37) while preventing slider member 935a to move along axis, N.

Figure 24:
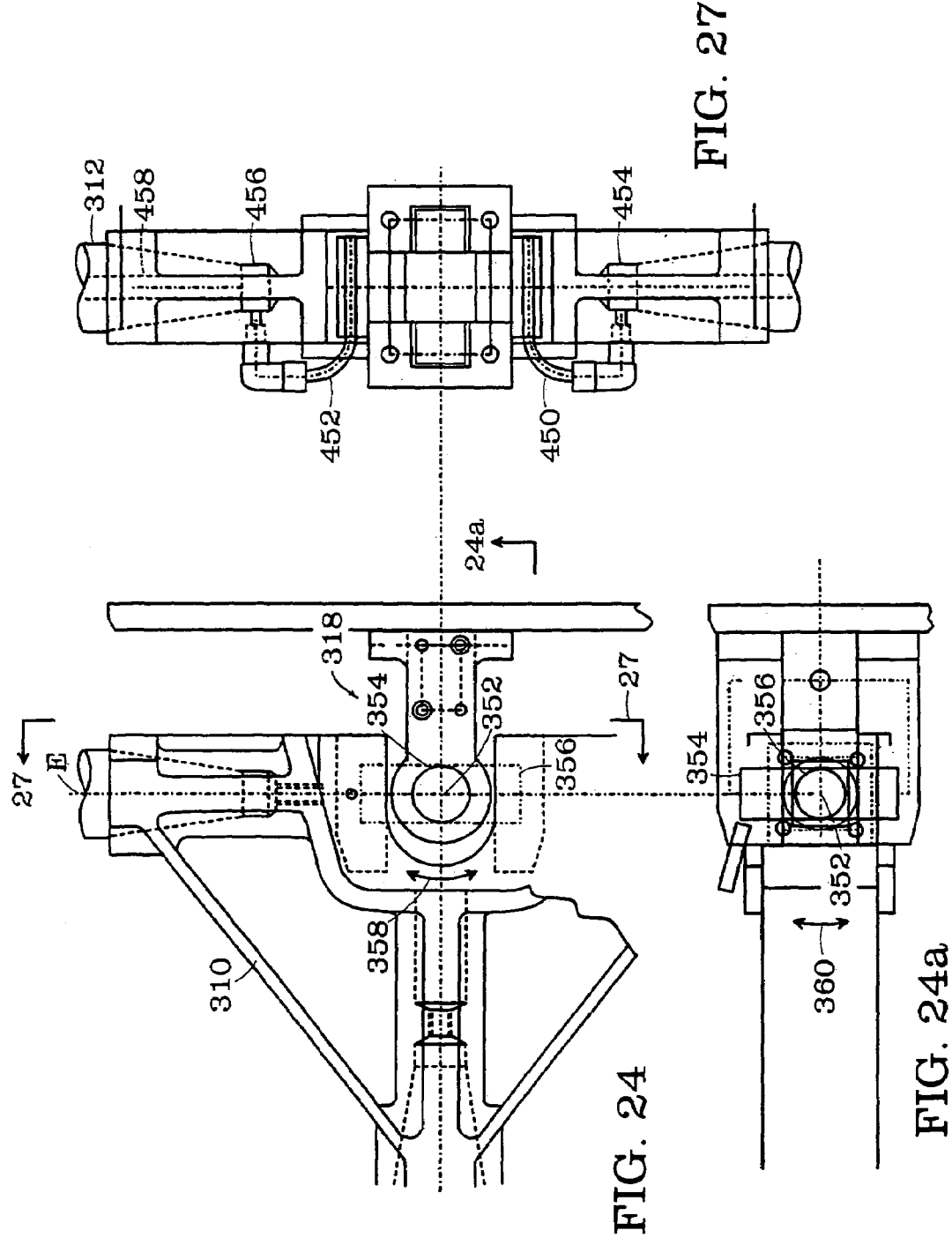
FIG. 24 is a top view of a transition arm and universal joint of the piston assembly of FIG. 22.

Referring to FIGS. 24 and 24a, U-joint 318 defines a central pivot 352 (drive pin axis, E, passes through center 352), and includes a vertical pin 354 and a horizontal pin 356. Transition arm 310 is capable of pivoting about pin 354 along arrow 358, and about pin 356 along arrow 360.

Figure 25:
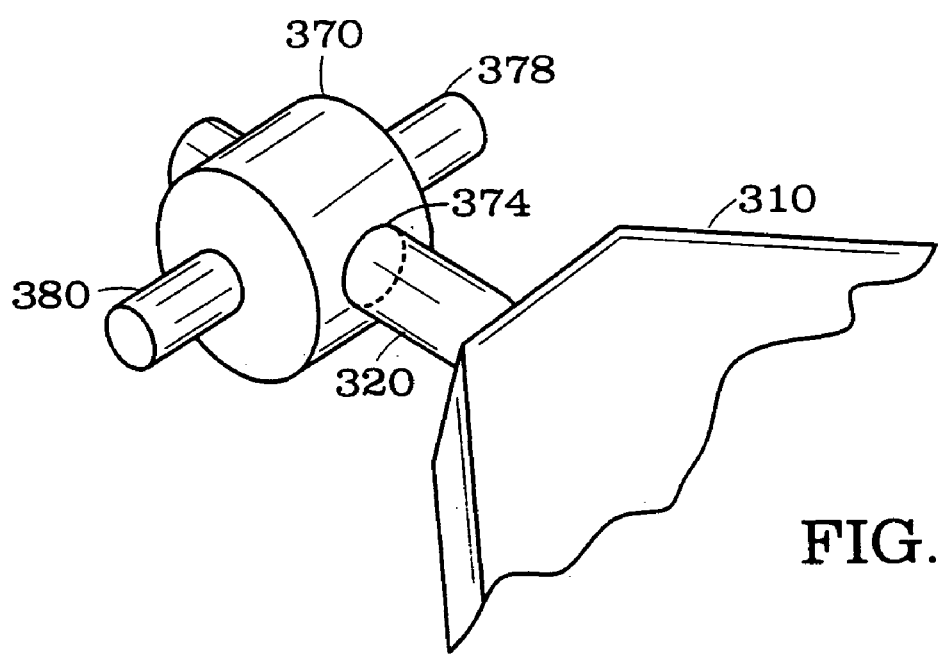
FIG. 25 is a perspective view of a drive arm connected to the transition arm of the piston assembly of FIG. 22.
Figure 25B:
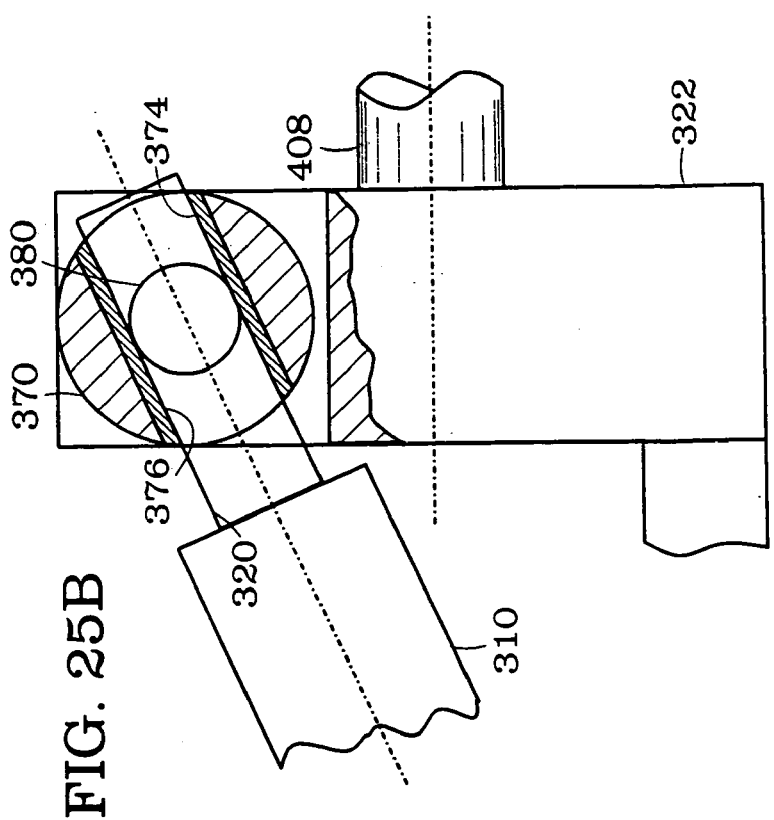
Figure 25A:
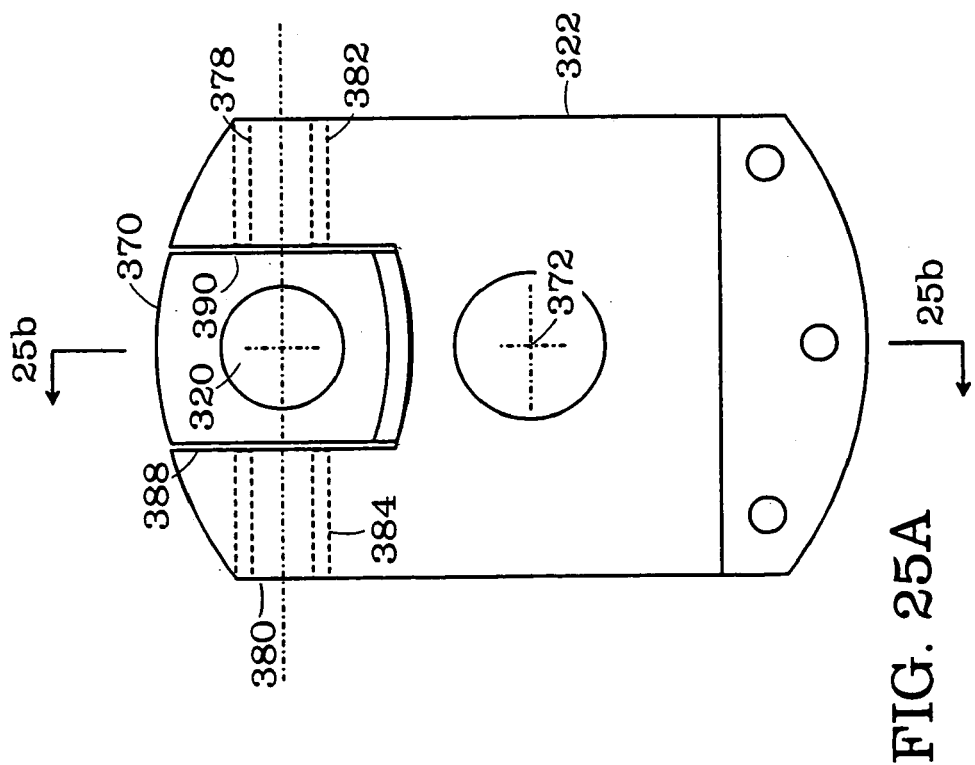
FIG. 25a is an end view of a rotatable member of the piston assembly of FIG. 22, taken along lines 25a, 25a of FIG. 22, and showing the connection of the drive arm to the rotatable member.

Referring to FIGS. 25, 25a and 25b, as an alternative to a spherical bearing, to couple transition arm 310 to flywheel 322, drive arm 320 is received within a cylindrical pivot pin 370 mounted to the flywheel offset radially from the center 372 of the flywheel by an amount, e.g., 2.125 inches, required to produce the desired swing angle, α (FIG. 22), in the transition arm.

Pivot pin 370 has a through hole 374 for receiving drive arm 320. There is a sleeve bearing 376 in hole 374 to provide a bearing surface for drive arm 320. Pivot pin 370 has cylindrical extensions 378, 380 positioned within sleeve bearings 382, 384, respectively. As the flywheel is moved axially along drive arm 320 to vary the swing angle, α, and thus the compression ratio of the assembly, as described further below, pivot pin 370 rotates within sleeve bearings 382, 384 to remain aligned with drive arm 320. Torsional forces are transmitted through thrust bearings 388, 390, with one or the other of the thrust bearings carrying the load depending on the direction of the rotation of the flywheel along arrow 386.

Figure 26:
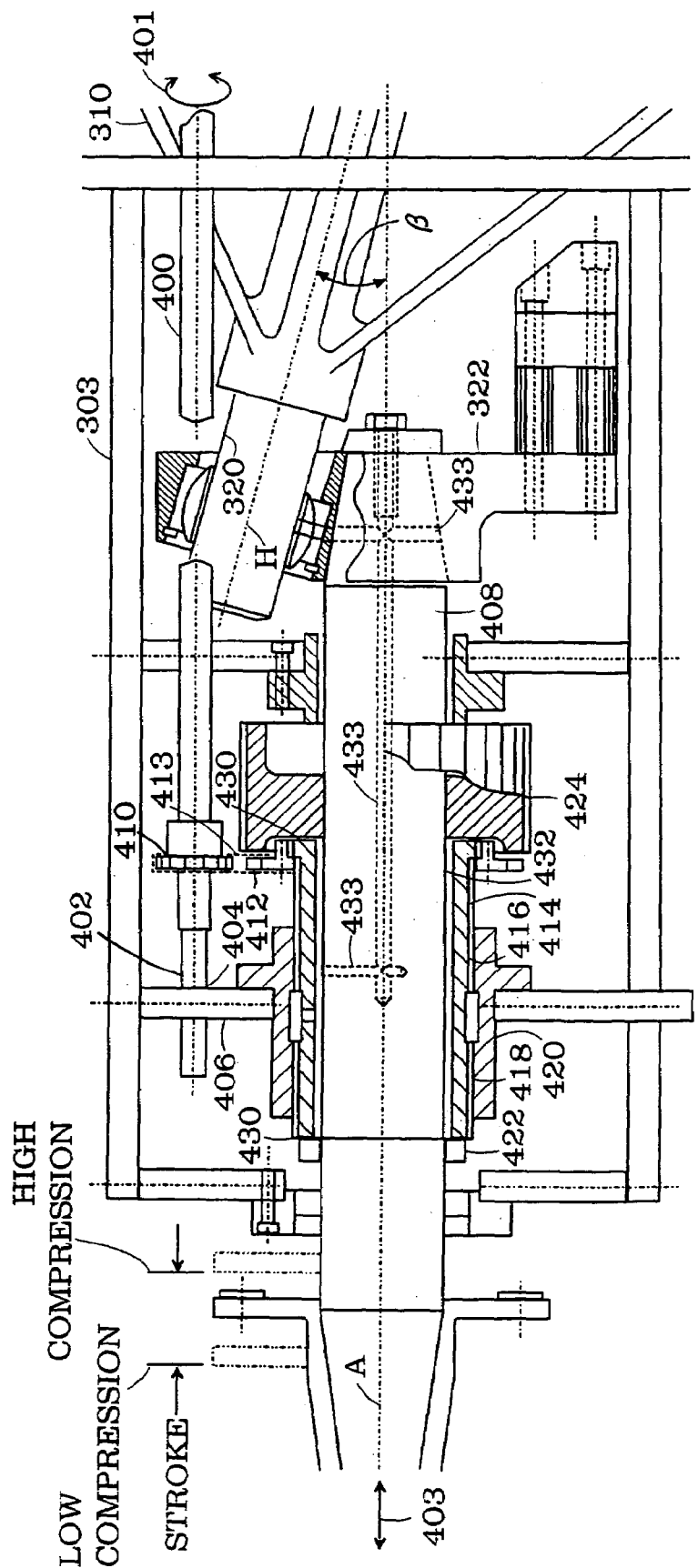
FIG. 26 is a cross-sectional, top view of the piston assembly of FIG. 22.

Referring to FIG. 26, to vary the compression and displacement of piston assembly 300, the axial position of flywheel 322 along axis, A, is varied by rotating a shaft 400. A sprocket 410 is mounted to shaft 400 to rotate with shaft 400. A second sprocket 412 is connected to sprocket 410 by a roller chain 413. Sprocket 412 is mounted to a threaded rotating barrel 414. Threads 416 of barrel 414 contact threads 418 of a stationary outer barrel 420.

Rotation of shaft 400, arrow 401, and thus sprockets 410 and 412, causes rotation of barrel 414. Because outer barrel 420 is fixed, the rotation of barrel 414 causes barrel 414 to move linearly along axis, A, arrow 403. Barrel 414 is positioned between a collar 422 and a gear 424, both fixed to a main drive shaft 408. Drive shaft 408 is in turn fixed to flywheel 322. Thus, movement of barrel 414 along axis, A, is translated to linear movement of flywheel 322 along axis, A. This results in flywheel 322 sliding along axis, H, of drive arm 320 of transition arm 310, changing angle, β, and thus the stroke of the pistons. Thrust bearings 430 are located at both ends of barrel 414, and a sleeve bearing 432 is located between barrel 414 and shaft 408.

To maintain the alignment of sprockets 410 and 412, shaft 400 is threaded at region 402 and is received within a threaded hole 404 of a cross bar 406 of assembly case structure 303. The ratio of the number of teeth of sprocket 412 to sprocket 410 is, e.g., 4:1. Therefore, shaft 400 must turn four revolutions for a single revolution of barrel 414. To maintain alignment, threaded region 402 must have four times the threads per inch of barrel threads 416, e.g., threaded region 402 has thirty-two threads per inch, and barrel threads 416 have eight threads per inch.

As the flywheel moves to the right, as viewed in FIG. 26, the stroke of the pistons, and thus the compression ratio, is increased. Moving the flywheel to the left decreases the stroke and the compression ratio. A further benefit of the change in stroke is a change in the displacement of each piston and therefore the displacement of the engine. The horsepower of an internal combustion engine closely relates to the displacement of the engine. For example, in the two cylinder, flat engine, the displacement increases by about 20% when the compression ratio is raised from 6:1 to 12:1. This produces approximately 20% more horsepower due alone to the increase in displacement. The increase in compression ratio also increases the horsepower at the rate of about 5% per point or approximately 25% in horsepower. If the horsepower were maintained constant and the compression ratio increased from 6:1 to 12:1, there would be a reduction in fuel consumption of approximately 25%.

The flywheel has sufficient strength to withstand the large centrifugal forces seen when assembly 300 is functioning as an engine. The flywheel position, and thus the compression ratio of the piston assembly, can be varied while the piston assembly is running.

Piston assembly 300 includes a pressure lubrication system. The pressure is provided by an engine driven positive displacement pump (not shown) having a pressure relief valve to prevent overpressures. Bearings 430 and 432 of drive shaft 408 and the interface of drive arm 320 with flywheel 322 are lubricated via ports 433 (FIG. 26).

Figure 27A:
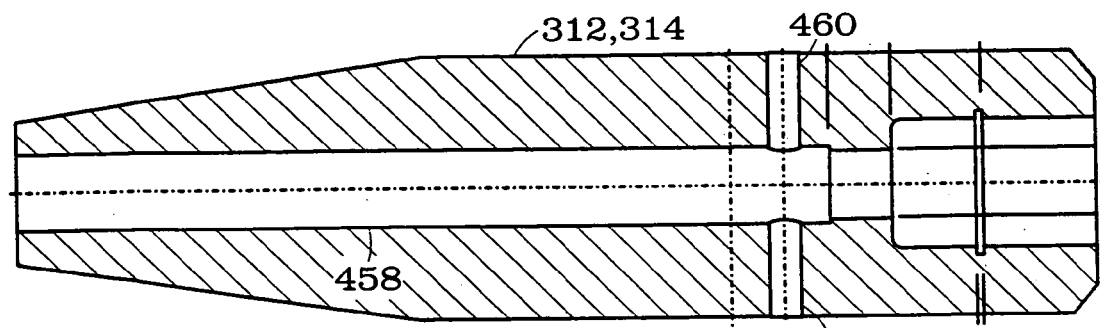
FIG. 27a is a cross-sectional view of a drive pin of the piston assembly of FIG. 22.

Referring to FIG. 27, to lubricate U-joint 318, piston pin joints 306, 308, and the cylinder walls, oil under pressure from the oil pump is ported through the fixed U-joint bracket to the top and bottom ends of the vertical pivot pin 354. Oil ports 450, 452 lead from the vertical pin to openings 454, 456, respectively, in the transition arm. As shown in FIG. 27A, pins 312, 314 each define a through bore 458. Each through bore 458 is in fluid communication with a respective one of openings 454, 456. As shown in FIG. 23, holes 460, 462 in each pin connect through slots 461 and ports 463 through sleeve bearing 338 to a chamber 465 in each piston. Several oil lines 464 feed out from these chambers and are connected to the skirt 466 of each piston to provide lubrication to the cylinders walls and the piston rings 467. Also leading from chamber 465 is an orifice to squirt oil directly onto the inside of the top of each piston for cooling.

Figure 28C:
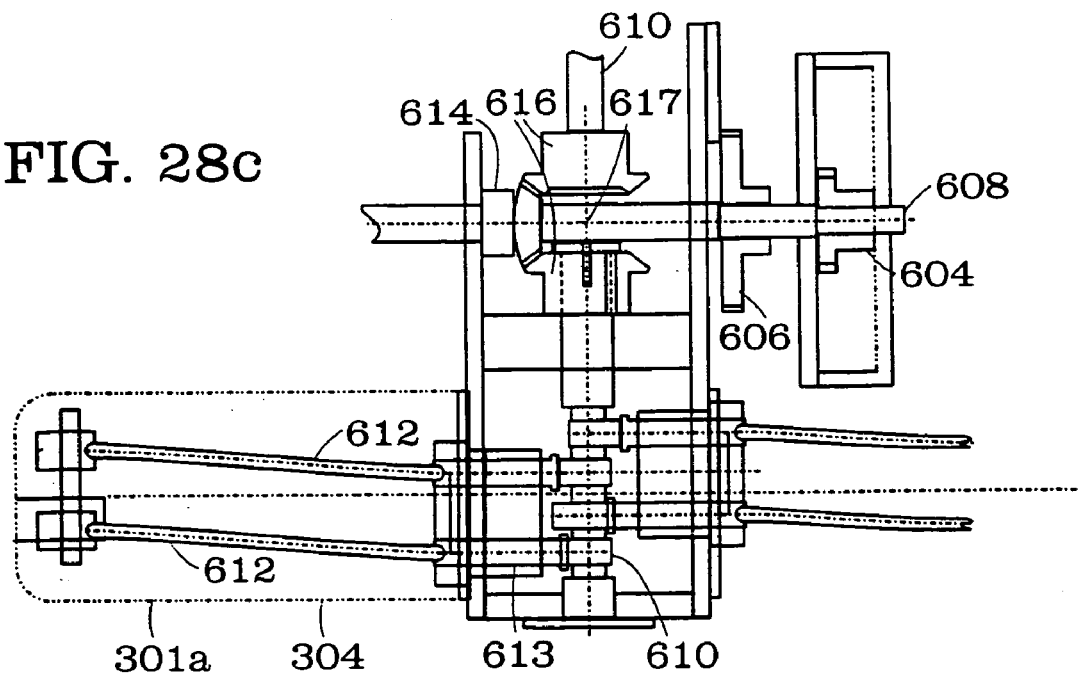
FIG. 28c is a top view of an auxiliary shaft of the piston assembly of FIG. 22.

Referring to FIGS. 28–28c, in which assembly 300 is shown configured for use as an aircraft engine 300a, the engine ignition includes two magnetos 600 to fire the piston spark plugs (not shown). Magnetos 600 and a starter 602 are driven by drive gears 604 and 606 (FIG. 28c), respectively, located on a lower shaft 608 mounted parallel and below the main drive shaft 408. Shaft 608 extends the full length of the engine and is driven by gear 424 (FIG. 26) of drive shaft 408 and is geared with a one to one ratio to drive shaft 408. The gearing for the magnetos reduces their speed to half the speed of shaft 608. Starter 602 is geared to provide sufficient torque to start the engine.

Camshafts 610 operate piston push rods 612 through lifters 613. Camshafts 610 are geared down 2 to 1 through bevel gears 614, 616 also driven from shaft 608. Center 617 of gears 614, 616 is preferably aligned with U-joint center 352 such that the camshafts are centered in the piston cylinders, though other configurations are contemplated. A single carburetor 620 is located under the center of the engine with four induction pipes 622 routed to each of the four cylinder intake valves (not shown). The cylinder exhaust valves (not shown) exhaust into two manifolds 624.

Engine 300a has a length, L, e.g., of about forty inches, a width, W, e.g., of about twenty-one inches, and a height, H, e.g., of about twenty inches, (excluding support 303).

Figure 29:
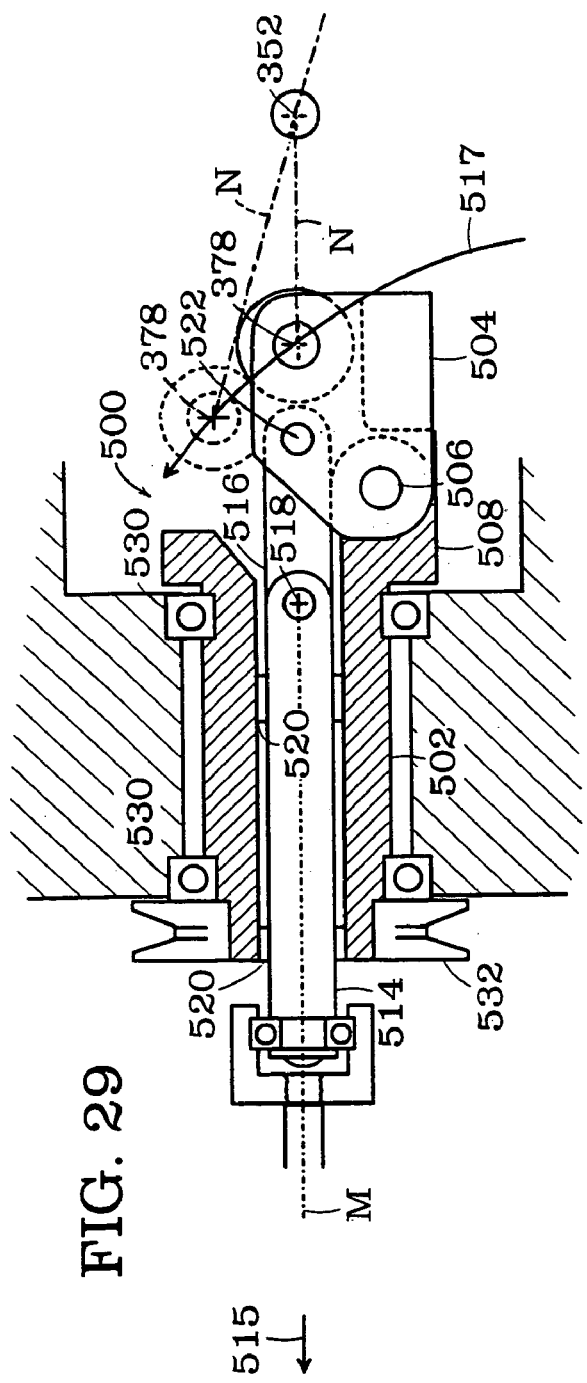
FIG. 29 is a cross-sectional side view of a zero-stroke coupling.
Figure 29A:
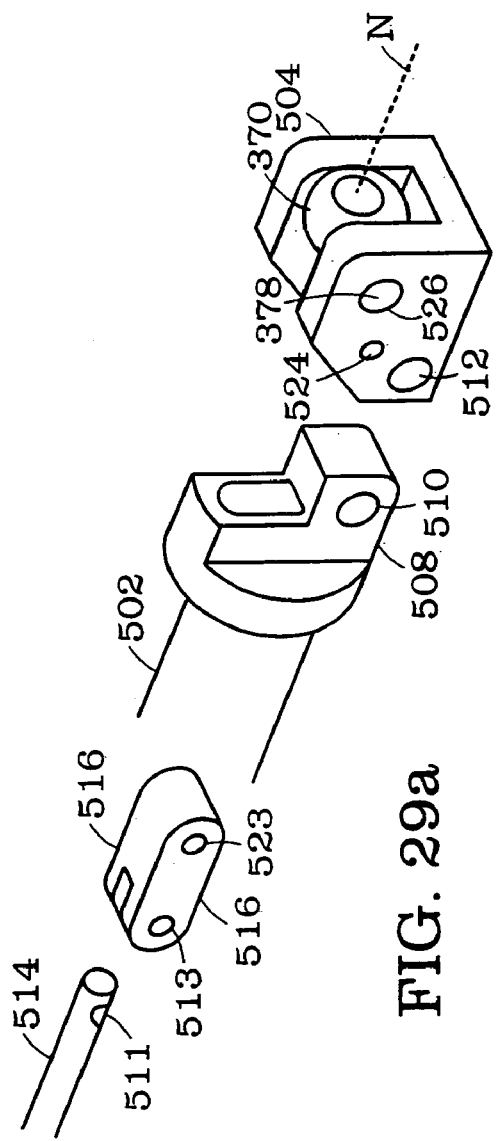
FIG. 29a is an exploded view of the zero-stroke coupling of FIG. 29.

Referring to FIGS. 29 and 29a, a variable compression compressor or pump having zero stroke capability is illustrated. Here, flywheel 322 is replaced by a rotating assembly 500. Assembly 500 includes a hollow shaft 502 and a pivot arm 504 pivotally connected by a pin 506 to a hub 508 of shaft 502. Hub 508 defines a hole 510 and pivot arm 504 defines a hole 512 for receiving pin 506. A control rod 514 is located within shaft 502. Control rod 514 includes a link 516 pivotally connected to the remainder of rod 514 by a pin 518. Rod 514 defines a hole 511 and link 516 defines a hole 513 for receiving pin 518. Control rod 514 is supported for movement along its axis, M, by two sleeve bearings 520. Link 516 and pivot arm 504 are connected by a pin 522. Link 516 defines a hole 523 and pivot arm 504 defines a hole 524 for receiving pin 522.

Cylindrical pivot pin 370 of FIG. 25 which receives drive arm 320 is positioned within pivot arm 504. Pivot arm 504 defines holes 526 for receiving cylindrical extensions 378, 380. Shaft 502 is supported for rotation by bearings 530, e.g., ball, sleeve, or roller bearings. A drive, e.g., pulley 532 or gears, mounted to shaft 502 drives the compressor or pump.

In operation, to set the desired stroke of the pistons, control rod 514 is moved along its axis, M, in the direction of arrow 515, causing pivot arm 504 to pivot about pin 506, along arrow 517, such that pivot pin 370 axis, N, is moved out of alignment with axis, M, (as shown in dashed lines) as pivot arm 504 slides along the axis, H, (FIG. 26) of the transition arm drive arm 320. When zero stroke of the pistons is desired, axes M and N are aligned such that rotation of shaft 514 does not cause movement of the pistons. This configuration works for both double ended and single sided pistons.

The ability to vary the piston stroke permits shaft 514 to be run at a single speed by drive 532 while the output of the pump or compressor can be continually varied as needed. When no output is needed, pivot arm 504 simply spins around drive arm 320 of transition arm 310 with zero swing of the drive arm. When output is needed, shaft 514 is already running at full speed so that when pivot arm 504 is pulled off-axis by control rod 514, an immediate stroke is produced with no lag coming up to speed. There are therefore much lower stress loads on the drive system as there are no start/stop actions. The ability to quickly reduce the stroke to zero provides protection from damage especially in liquid pumping when a downstream blockage occurs.

Figure 33:
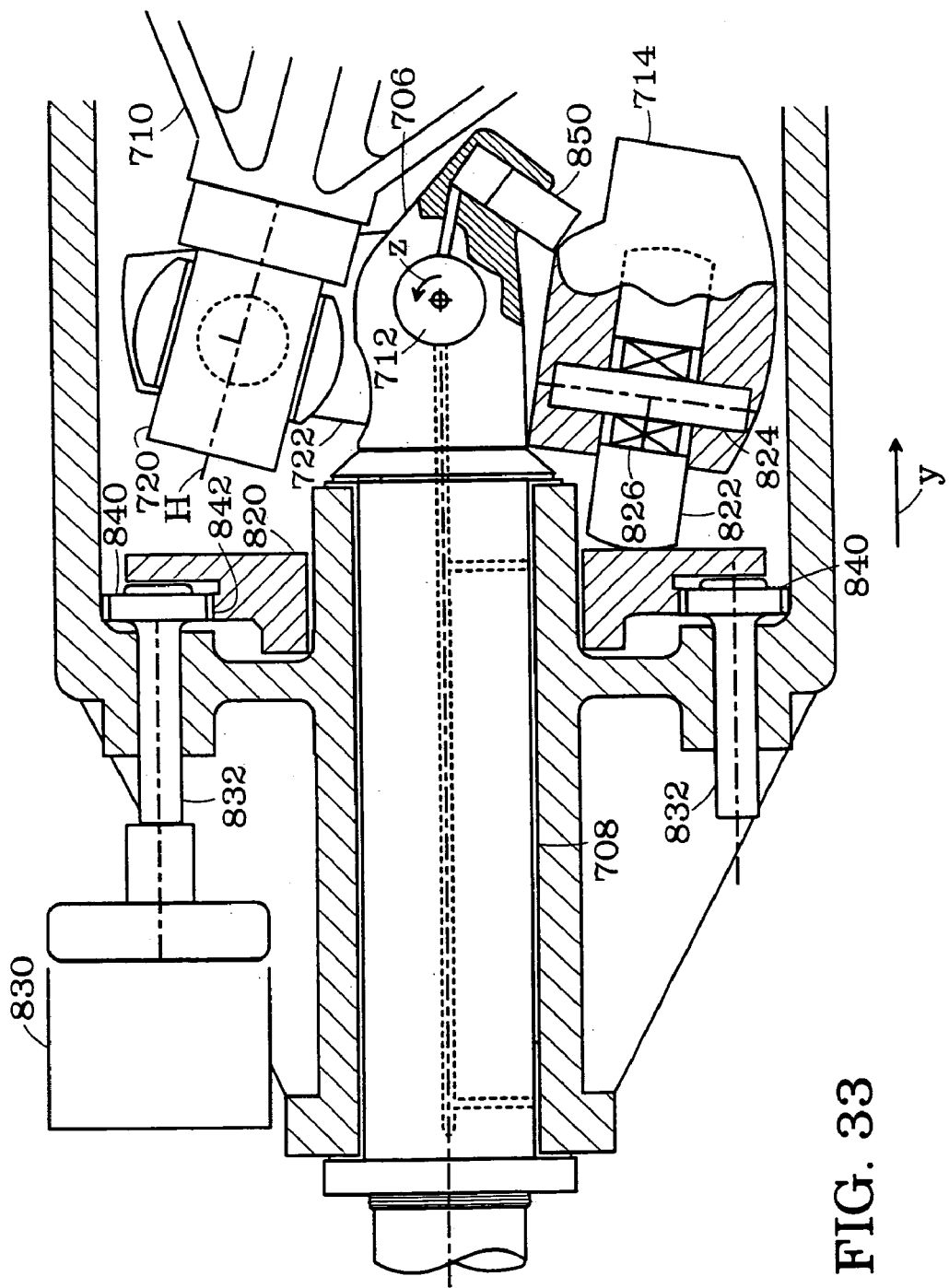
FIG. 33 is a cross-sectional top view of an alternative embodiment of a variable stroke assembly shown in a maximum stroke position.

An alternative method of varying the compression and displacement of the pistons is shown in FIG. 33. The mechanism provides for varying of the position of a counterweight attached to the flywheel to maintain system balance as the stroke of the pistons is varied.

A flywheel 722 is pivotally mounted to an extension 706 of a main drive shaft 708 by a pin 712. By pivoting flywheel 722 in the direction of arrow, Z, flywheel 722 slides along axis, H, of a drive arm 720 of transition arm 710, changing angle, β (FIG. 26), and thus the stroke of the pistons. Pivoting flywheel 722 also causes a counterweight 714 to move closer to or further from axis, A, thus maintaining near rotational balance.

Figure 34:
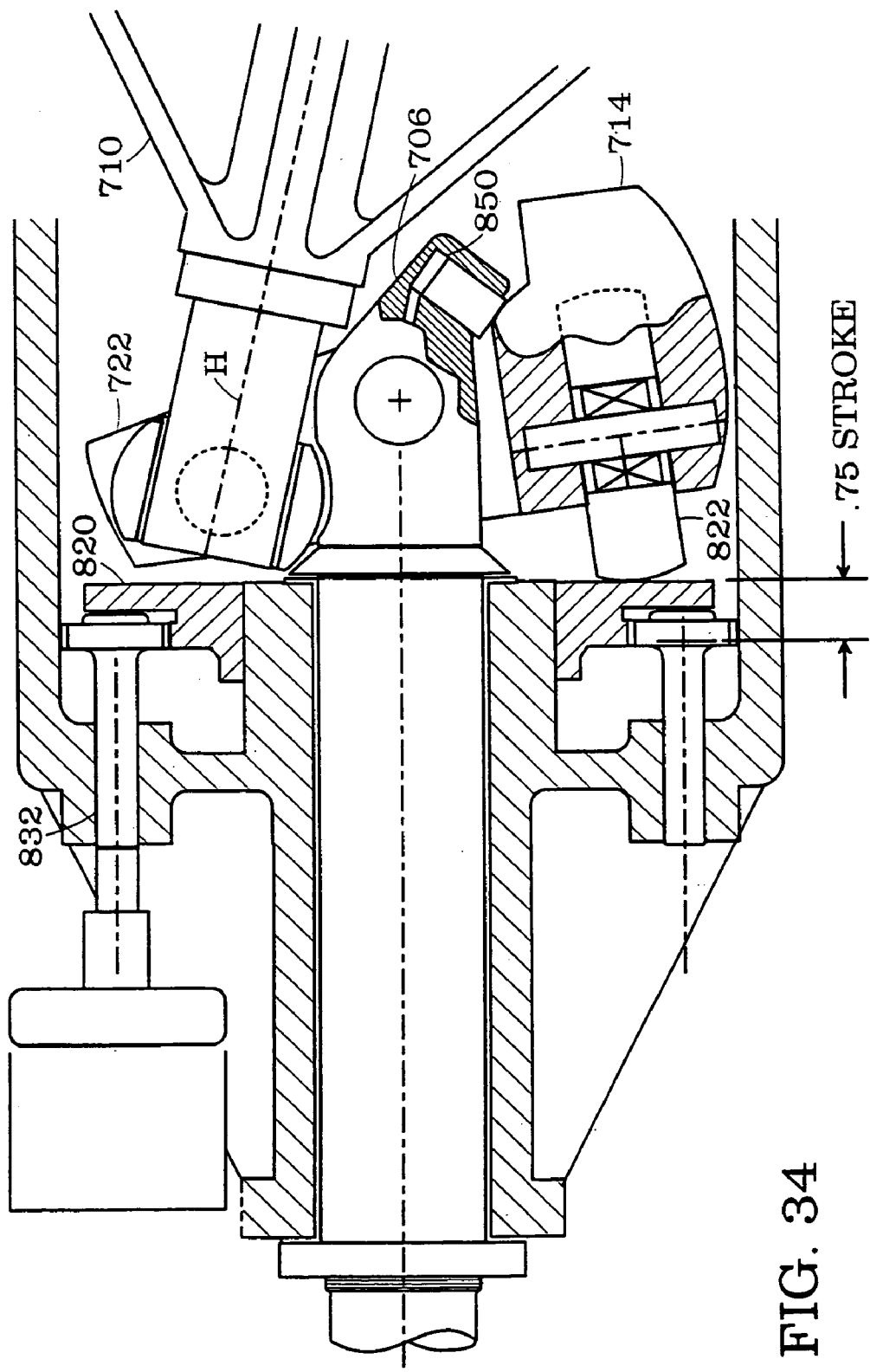
FIG. 34 is a cross-sectional top view of the embodiment of FIG. 33 shown in a minimum stroke position.

To pivot flywheel 722, an axially and rotationally movable pressure plate 820 is provided. Pressure plate 820 is in contact with a roller 822 rotationally mounted to counterweight 714 through a pin 824 and bearing 826. From the position shown in FIG. 33, a servo motor or hand knob 830 turns a screw 832 which advances to move pressure plate 820 in the direction of arrow, Y. This motion of pressure plate 820 causes flywheel 722 to pivot in the direction of arrow, Z, as shown in the FIG. 34, to decrease the stroke of the pistons. Moving pressure plate 820 by 0.75" decreases the compression ratio from about 12:1 to about 6:1.

Pressure plate 820 is supported by three or more screws 832. Each screw has a gear head 840 which interfaces with a gear 842 on pressure plate 820 such that rotation of screw 832 causes rotation of pressure plate 820 and thus rotation of the remaining screws to insure that the pressure plate is adequately supported. To ensure contact between roller 822 and pressure plate 820, a piston 850 is provided which biases flywheel 722 in the direction opposite to arrow, Z.

Figure 30:
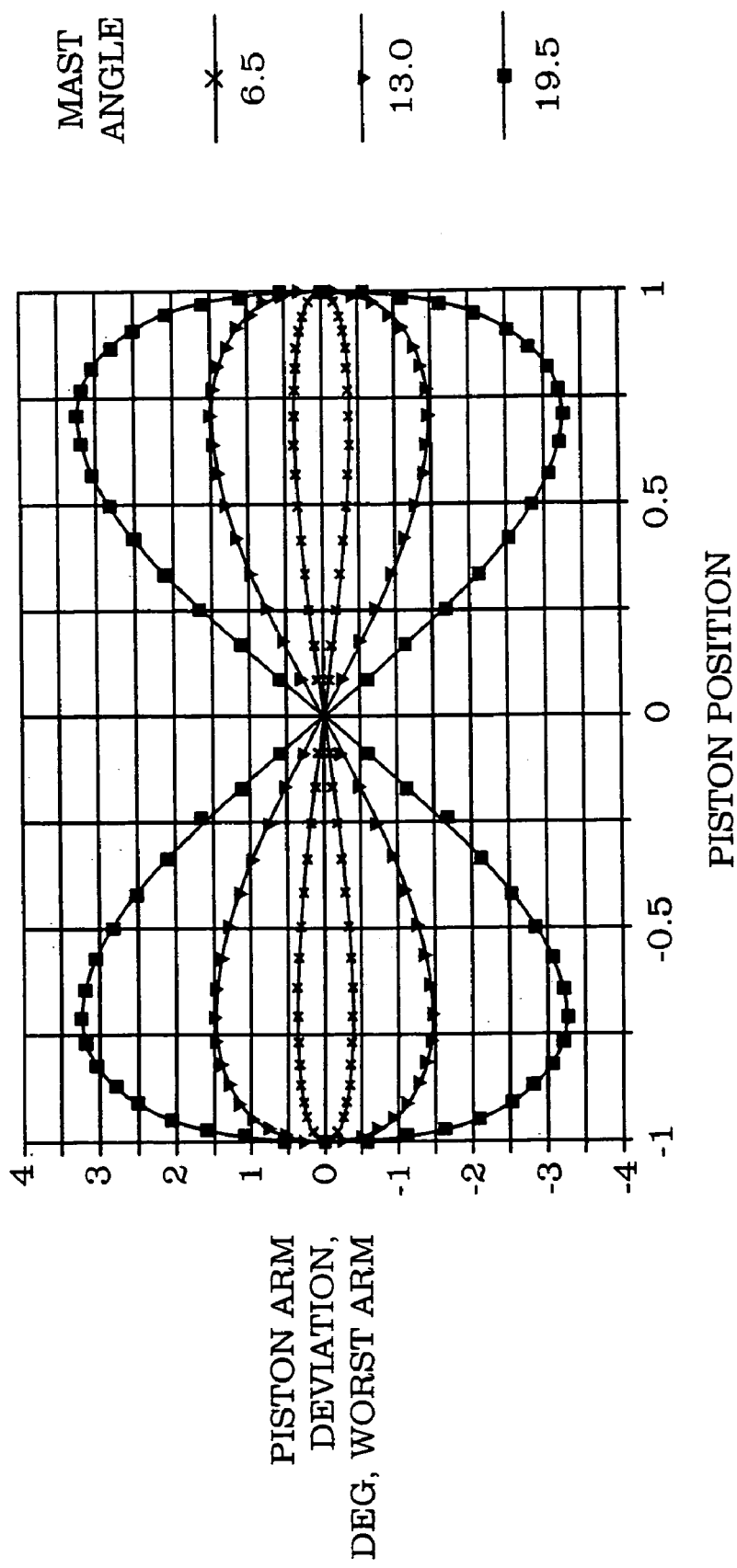
FIG. 30 is a graph showing the FIG. 8 motion of a non-flat piston assembly.

Referring to FIG. 30, if two cylinders not spaced 180° apart (as viewed from the end) or more than two cylinders are employed in piston assembly 300, the ends of pins 312, 314 coupled to joints 306, 308 will undergo a FIG. 8 motion. FIG. 30 shows the FIG. 8 motion of a piston assembly having four double ended pistons. Two of the pistons are arranged flat as shown in FIG. 22 (and do not undergo the FIG. 8 motion), and the other two pistons are arranged equally spaced between the flat pistons (and are thus positioned to undergo the largest FIG. 8 deviation possible). The amount that the pins connected to the second set of pistons deviate from a straight line (y axis of FIG. 30) is determined by the swing angle (mast angle) of the drive arm and the distance the pin is from the central pivot point 352 (x axis of FIG. 30).

In a four cylinder version where the pins through the piston pivot assembly of each of the four double ended pistons are set at 45° from the axis of the central pivot, the figure eight motion is equal at each piston pin. Movement in the piston pivot bushing is provided where the figure eight motion occurs to prevent binding.

Figure 31:
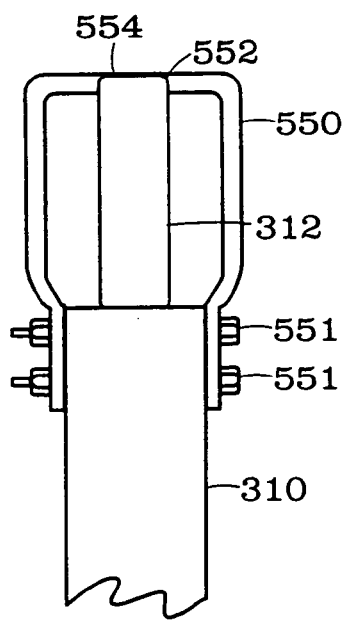
FIG. 31 shows a reinforced drive pin.

When piston assembly 300 is configured for use, e.g., as a diesel engines, extra support can be provided at the attachment of pins 312, 314 to transition arm 310 to account for the higher compression of diesel engines as compared to spark ignition engines. Referring to FIG. 31, support 550 is bolted to transition arm 310 with bolts 551 and includes an opening 552 for receiving end 554 of the pin.

Figure 32A:
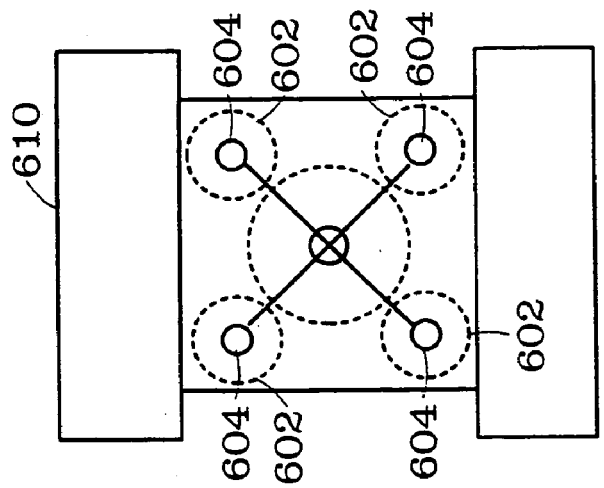
FIG. 32a is an end view of the four cylinder engine, taken along lines 32a, 32a of FIG. 32.
Figure 32:
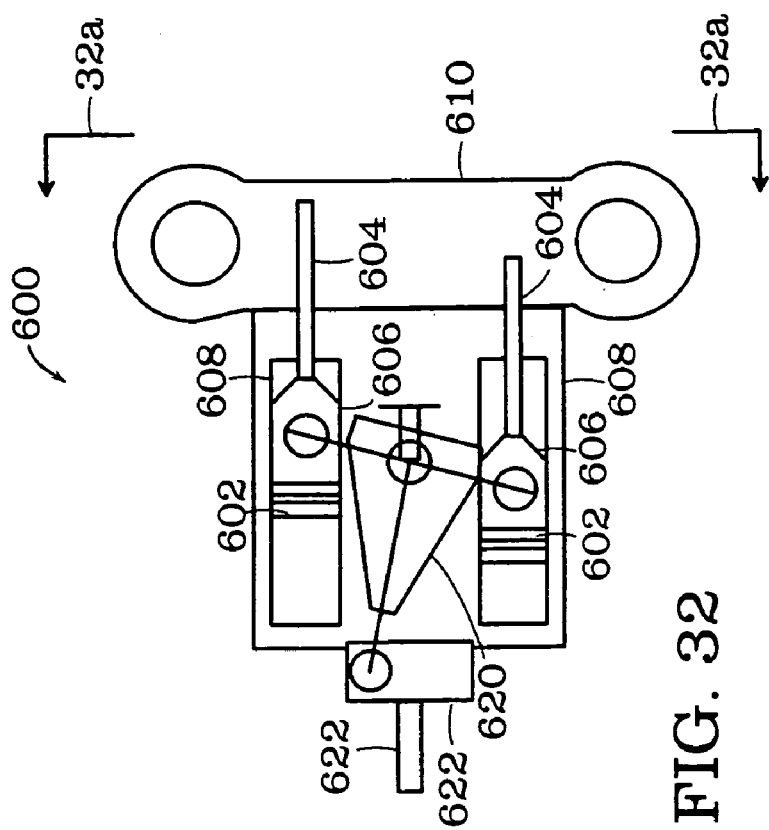
FIG. 32 is a top view of a four cylinder engine for directly applying combustion pressures to pump pistons.

Engines according to the invention can be used to directly apply combustion pressures to pump pistons. Referring to FIGS. 32 and 32a, a four cylinder, two stroke cycle engine 600 (each of the four pistons 602 fires once in one revolution) applies combustion pressure to each of four pump pistons 604. Each pump piston 604 is attached to the output side 606 of a corresponding piston cylinder 608. Pump pistons 604 extend into a pump head 610.

A transition arm 620 is connected to each cylinder 608 and to a flywheel 622, as described above. An auxiliary output shaft 624 is connected to flywheel 622 to rotate with the flywheel, also as described above.

The engine is a two stroke cycle engine because every stroke of a piston 602 (as piston 602 travels to the right as viewed in FIG. 32) must be a power stroke. The number of engine cylinders is selected as required by the pump. The pump can be a fluid or gas pump. In use as a multi-stage air compressor, each pump piston 606 can be a different diameter. No bearing loads are generated by the pumping function (for single acting pump compressor cylinders), and therefore, no friction is introduced other than that generated by the pump pistons themselves.

Referring to FIGS. 38–38B, an engine 1010 having vibration canceling characteristics and being particularly suited for use in gas compression includes two assemblies 1012, 1014 mounted back-to-back and 180° out of phase. Engine 1010 includes a central engine section 1016 and outer compressor sections 1018, 1020. Engine section 1016 includes, e.g., six double acting cylinders 1022, each housing a pair of piston 1024, 1026. A power stroke occurs when a center section 1028 of cylinder 1022 is fired, moving pistons 1024, 1026 away from each other. The opposed movement of the pistons results in vibration canceling.

Outer compression section 1018 includes two compressor cylinders 1030 and outer compression section 1020 includes two compressor cylinders 1032, though there could be up to six compressor cylinders in each compression section. Compression cylinders 1030 each house a compression piston 1034 mounted to one of pistons 1024 by a rod 1036, and compression cylinders 1032 each house a compression piston 1038 mounted to one of pistons 1026 by a rod 1040. Compression cylinders 1030, 1032 are mounted to opposite piston pairs such that the forces cancel minimizing vibration forces which would otherwise be transmitted into mounting 1041.

Pistons 1024 are coupled by a transition arm 1042, and pistons 1026 are coupled by a transition arm 1044, as described above. Transition arm 1042 includes a drive arm 1046 extending into a flywheel 1048, and transition arm 1044 includes a drive arm 1050 extending into a flywheel 1052, as described above. Flywheel 1048 is joined to flywheel 1052 by a coupling arm 1054 to rotate in synchronization therewith. Flywheels 1048, 1052 are mounted on bearings 1056. Flywheel 1048 includes a bevel gear 1058 which drives a shaft 1060 for the engine starter, oil pump and distributor for ignition, not shown.

Engine 1010 is, e.g., a two stroke natural gas engine having ports (not shown) in central section 1028 of cylinders 1022 and a turbocharger (not shown) which provides intake air under pressure for purging cylinders 1022. Alternatively, engine 1010 is gasoline or diesel powered.

The stroke of pistons 1024, 1026 can be varied by moving both flywheels 1048, 1052 such that the stroke of the engine pistons and the compressor pistons are adjusted equally reducing or increasing the engine power as the pumping power requirement reduces or increases, respectively.

The vibration canceling characteristics of the back-to-back relationship of assemblies 1012, 1014 can be advantageously employed in a compressor only system and an engine only system.

Figure 39:
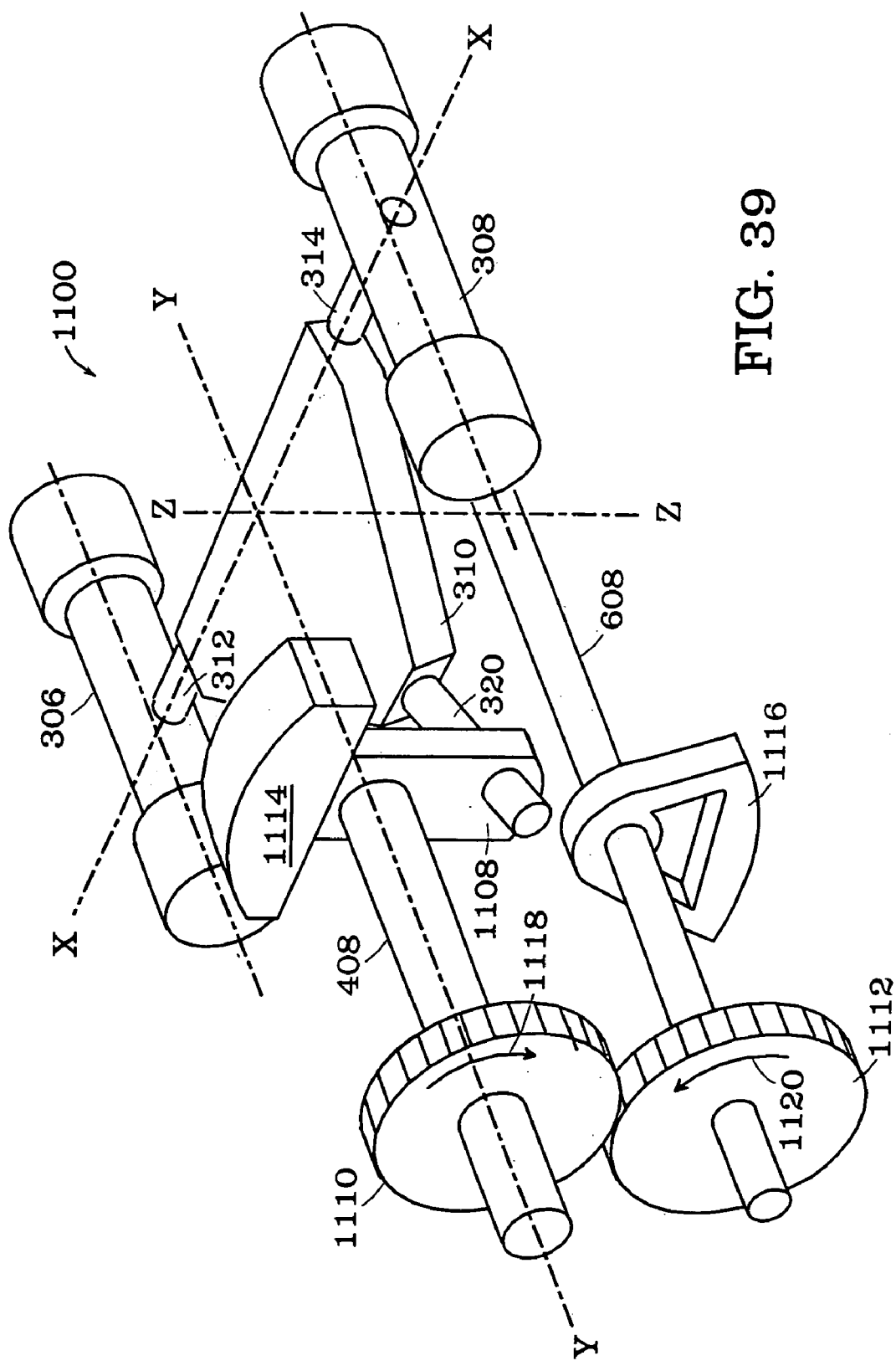
FIG. 39 is a perspective view of a piston engine assembly including counterbalancing.

Counterweights can be employed to limit vibration of the piston assembly. Referring to FIG. 39, an engine 1100 includes counterweights 1114 and 1116. Counterweight 1114 is mounted to rotate with a rotatable member 1108, e.g., a flywheel, connected to drive arm 320 extending from transition arm 310. Counterweight 1116 is mounted to lower shaft 608 to rotate with shaft 608.

Movement of the double ended pistons 306, 308 is translated by transition arm 310 into rotary motion of member 1108 and counterweight 1114. The rotation of member 1108 causes main drive shaft 408 to rotate. Mounted to shaft 408 is a first gear 1110 which rotates with shaft 408. Mounted to lower shaft 608 is a second gear 1112 driven by gear 1110 to rotate at the same speed as gear 1110 and in the opposite direction to the direction of rotation of gear 1110. The rotation of gear 1112 causes rotation of shaft 608 and thus rotation of counterweight 1116.

As viewed from the left in FIG. 39, counterweight 1114 rotates clockwise (arrow 1118) and counterweight 1116 rotates counterclockwise (arrow 1120).

Counterweights 1114 and 1116 are mounted 180 degrees out of phase such that when counterweight 1114 is above shaft 408, counterweight 1116 is below shaft 608. A quarter turn results in both counterweights 1114, 1116 being to the right of their respective shafts (see FIG. 40). After another quarter turn, counterweight 1114 is below shaft 408 and counterweight 1116 is above shaft 608. Another quarter turn and both counterweights are to the left of their respective shafts.

Figure 40:
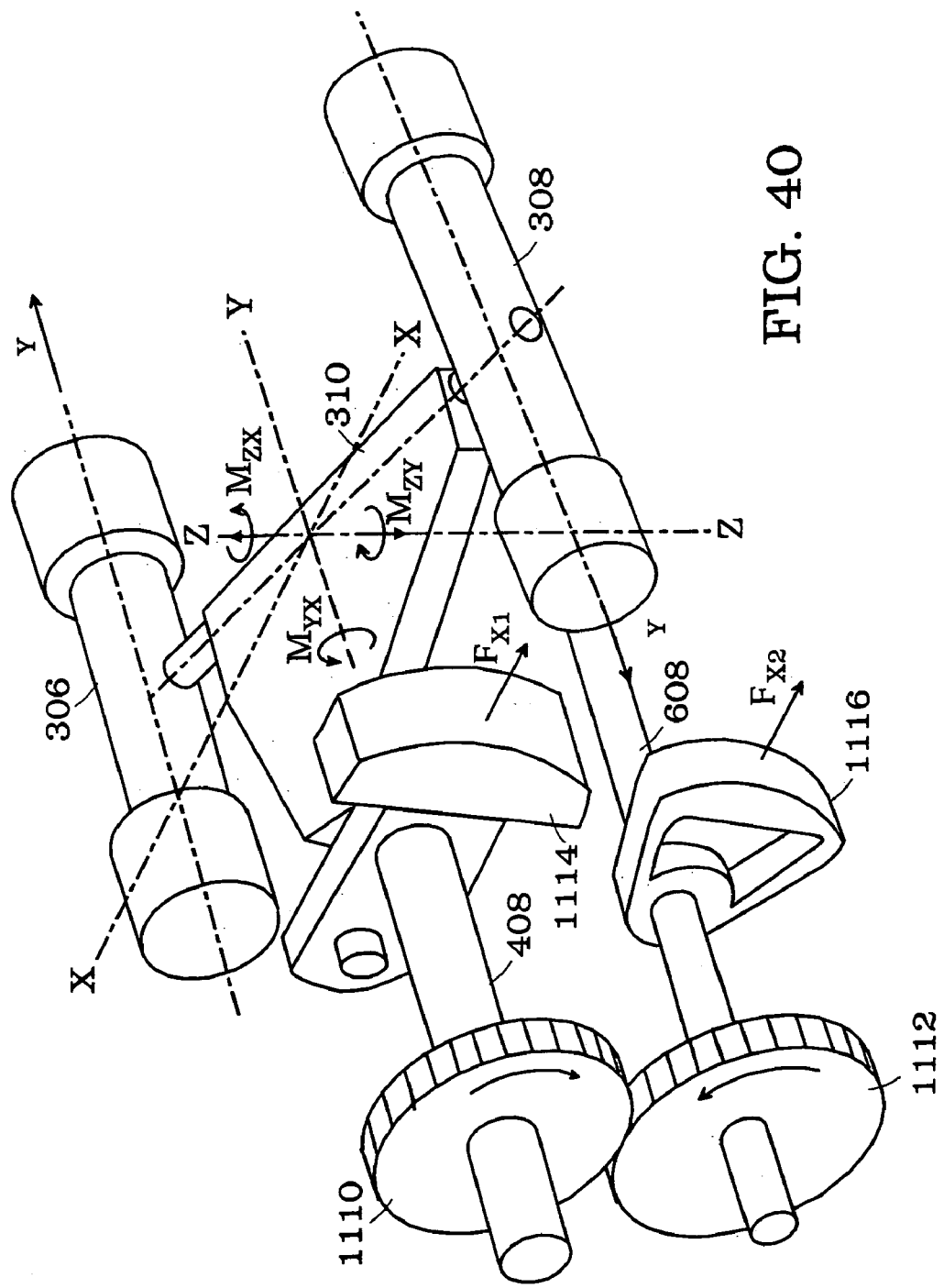
FIG. 40 is a perspective view of the piston engine assembly of FIG. 39 in a second position.

Referring to FIG. 40, movement of pistons 306, 308 along the Y axis, in the plane of the XY axes, creates a moment about the Z axis, $M_{zy}$. When counterweights 1114, 1116 are positioned as shown in FIG. 40, the centrifugal forces due to their rotation creates forces, $F_{x1}$ and $F_{x2}$, respectively, parallel to the X axis. These forces act together to create a moment about the Z axis, $M_{zx}$. The weight of counterweights 1114, 1116 is selected such that $M_{zx}$ substantially cancels $M_{zy}$.

When pistons 306, 308 are centered on the X axis (FIG. 39) there are no forces acting on pistons 306, 308, and thus no moment about the Z axis. In this position, counterweights 1114, 1116 are in opposite positions as shown in FIG. 39 and the moments created about the X axis by the centrifugal forces on the counterweights cancel. The same is true after 180 degrees of rotation of shafts 408 and 608, when the pistons are again centered on the X axis and the counterweight 1114 is below shaft 408 and counterweight 1116 is above shaft 608.

Between the quarter positions, the moments about the X axis due to rotation of counterweights 1114 and 1116 cancel, and the moments about the Z axis due to rotation of counterweights 1114 and 1116 add.

Counterweight 1114 also accounts for moments produced by drive arm 320.

In other piston configurations, for example where pistons 306, 308 do not lie on a common plane or where there are more than two pistons, counterweight 1116 is not necessary because at no time is there no moment about the Z axis requiring the moment created by counterweight 1114 to be cancelled.

Figure 41:
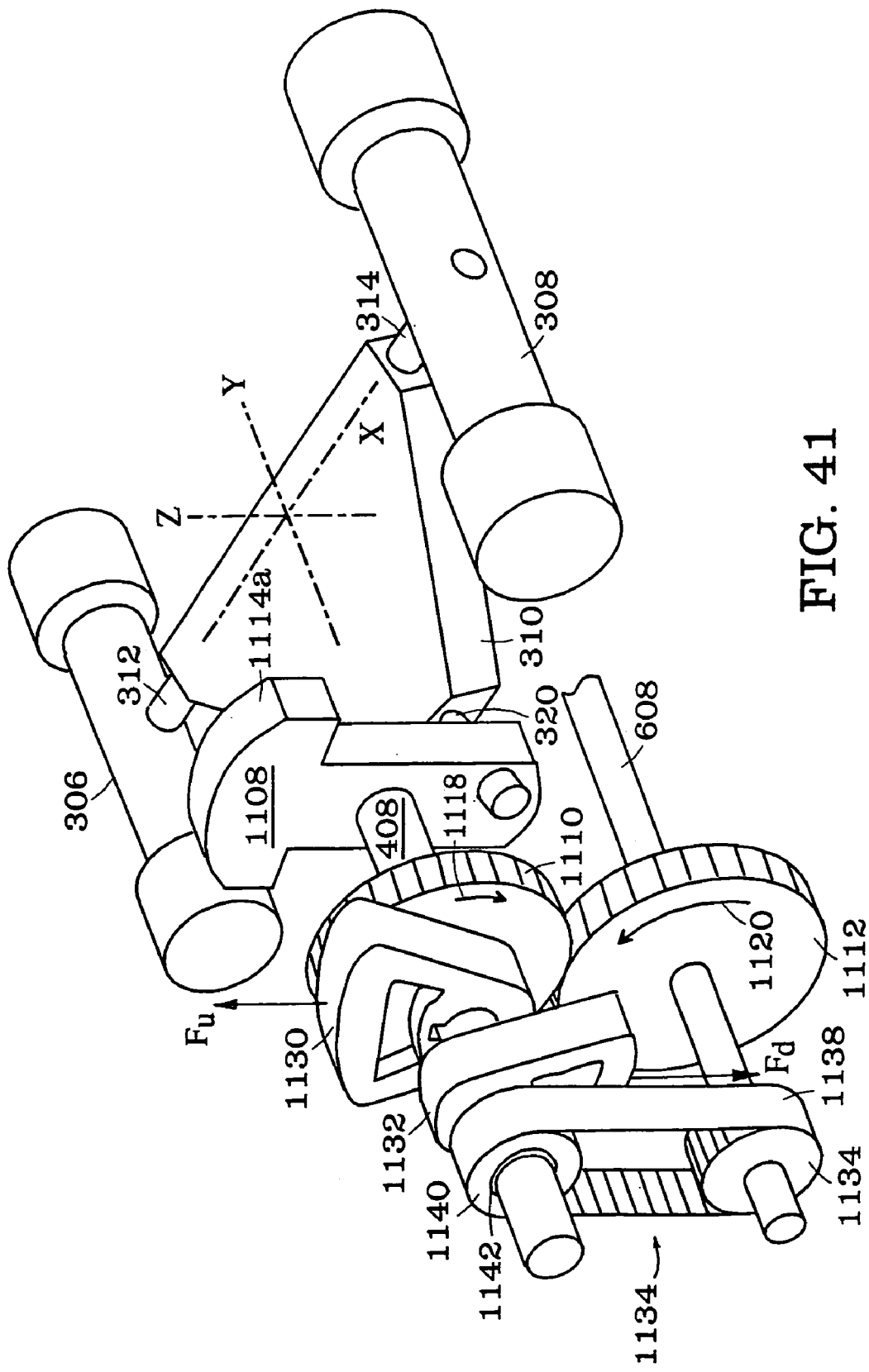
FIG. 41 is a perspective view of an alternative embodiment of a piston engine assembly including counterbalancing.

One moment not accounted for in the counterbalancing technique of FIGS. 39 and 40 a moment about axis Y, $M_{yx}$, produced by rotation of counterweight 1116. Another embodiment of a counterbalancing technique which accounts for all moments is shown in FIG. 41. Here, a counterweight 1114a mounted to rotating member 1108 is sized to only balance transition arm 310. Counterweights 1130, 1132 are provided to counterbalance the inertial forces of double-ended pistons 306, 308.

Counterweight 1130 is mounted to gear 1110 to rotate clockwise with gear 1110. Counterweight 1132 is driven through a pulley system 1134 to rotate counterclockwise. Pulley system 1134 includes a pulley 1136 mounted to rotate with shaft 608, and a chain or timing belt 1138. Counterweight 1132 is mounted to shaft 408 by a pulley 1140 and bearing 1142. Counterclockwise rotation of pulley 1136 causes counterclockwise rotation of chain or belt 1138 and counterclockwise rotation of counterweight 1132.

Figure 42:
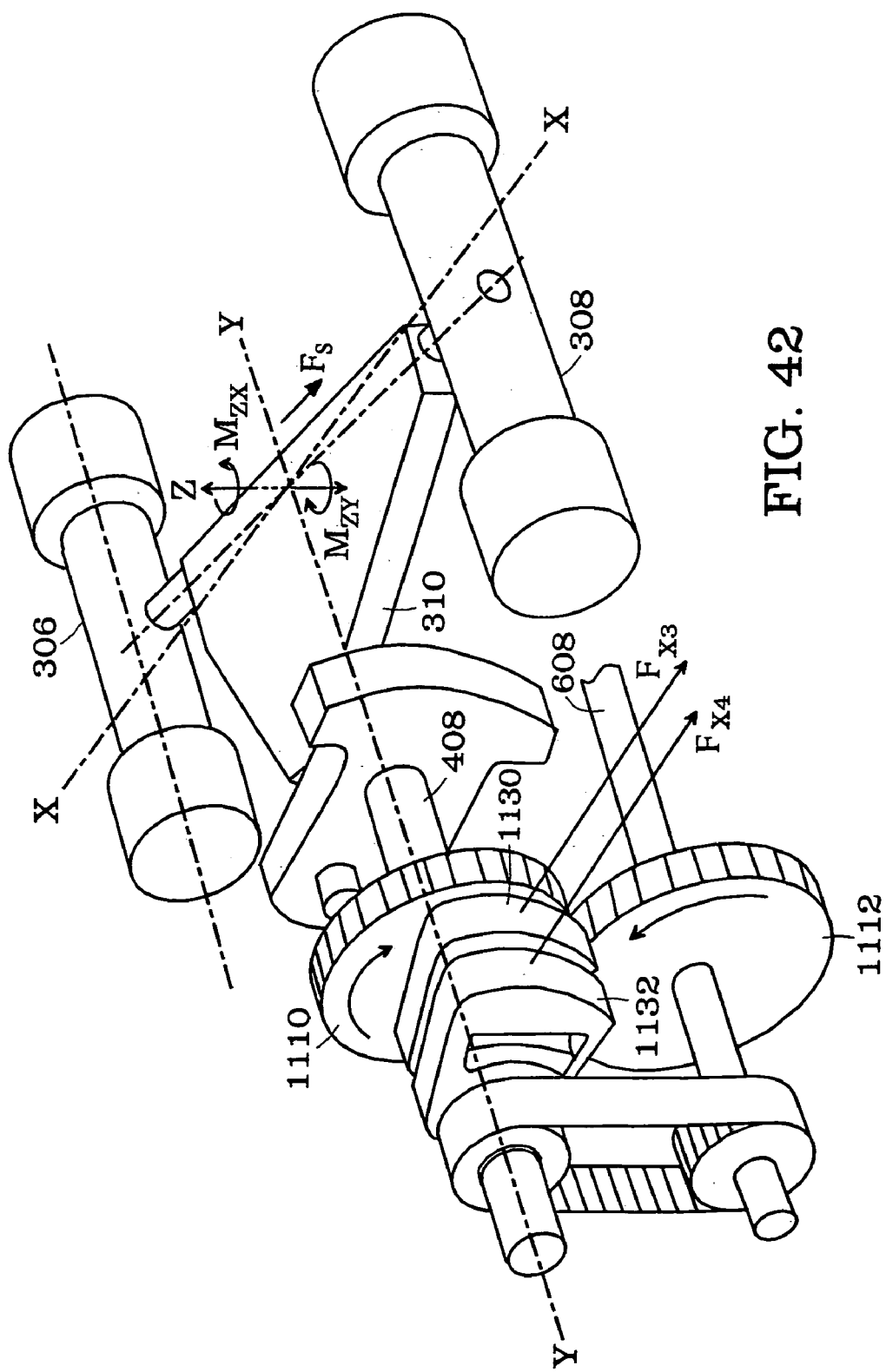
FIG. 42 is a perspective view of the piston engine assembly of FIG. 41 in a second position.

Referring to FIG. 42, as discussed above, movement of pistons 306, 308 along the Y axis, in the plane of the XY axes, creates a moment about the Z axis, $M_{zy}$. When counterweights 1130, 1132 are positioned as shown in FIG. 42, the centrifugal forces due to their rotation creates forces, $F_{x3}$ and $F_{x4}$, respectively, in the same direction along the X axis. These forces act together to create a moment about the Z axis, $M_{zx}$. The weight of counterweights 1130, 1132 is selected such that $M_{zx}$ substantially cancels $M_{zy}$.

When pistons 306, 308 are centered on the X axis (FIG. 41) there are no forces acting on pistons 306, 308, and thus no moment about the Z axis. In this position, counterweights 1130, 1132 are in opposite positions as shown in FIG. 41 and the moments created about the X axis by the centrifugal forces on the counterweights cancel. The same is true after 180 degrees of rotation of shafts 408 and 608, when the pistons are again centered on the X axis and the counterweight 1130 is below shaft 408 and counterweight 1132 is above shaft 408.

Between the quarter positions, the moments about the X axis due to rotation of counterweights 1130 and 1132 cancel, and the moments about the Z axis due to rotation of counterweights 1130 and 1132 add. Since counterweights 1130 and 1132 both rotate about the Y axis, there is no moment $M_{yx}$ created about axis Y.

Counterweights 1130, 1132 are positioned close together along the Y axis to provide near equal moments about the Z axis. The weights of counterweights 1130, 1132 can be slightly different to account for their varying location along the Y axis so that each counterweight generates the same moment about the center of gravity of the engine.

Counterweights 1130, 1132, in addition to providing the desired moments about the Z axis, create undesirable lateral forces directed perpendicular to the Y-axis (in the direction of the X aixs), which act on the U-joint or other mount supporting transition arm 310. When counterweights 1130, 1132 are positioned as shown in FIG. 41, this does not occur because the upward force, $F_u$, and the downward force, $F_d$, cancel. But, when counterweights 1130, 1132 are positioned other than as shown in FIG. 41 or 180° from that position, this force is applied to the mount. For example, as shown in FIG. 42, forces $F_{x3}$ and $F_{x4}$ create a side force, $F_s$, along the X axis. One technique of incorporating counterbalances which provide the desired moments about the Z axis without creating the undesirable forces on the mount is shown in FIG. 43.

Figure 43:
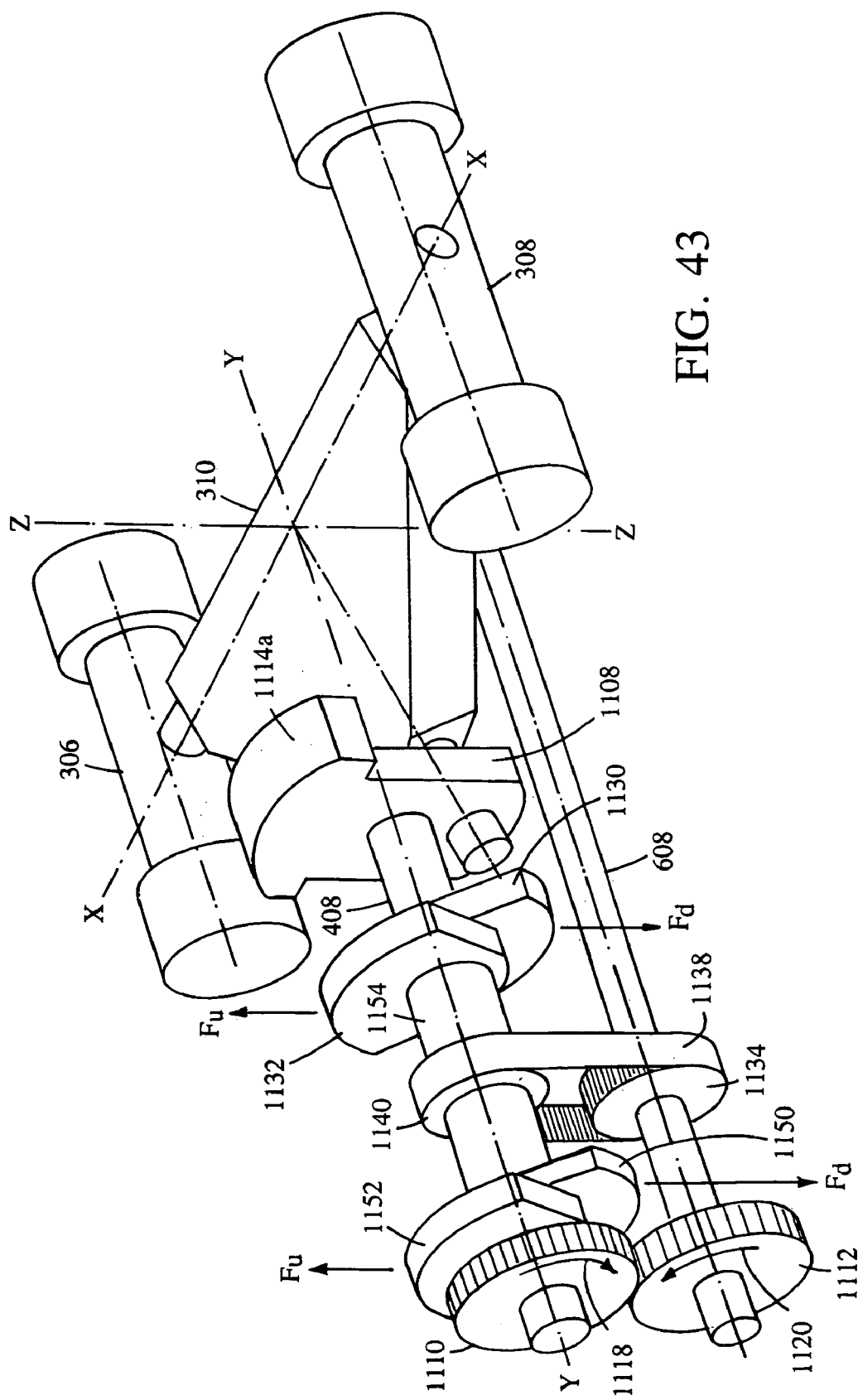
FIG. 43 is a perspective view of an additional alternative embodiment of a piston engine assembly including counterbalancing.

Referring to FIG. 43, a second pair of counterweights 1150, 1152 are provided. Counterweights 1130 and 1152 are mounted to shaft 408 to rotate clockwise with shaft 408. Counterweights 1132 and 1150 are mounted to a cylinder 1154 surrounding shaft 408 which is driven through pulley system 1134 to rotate counterclockwise. Counterweights 1130, 1152 extend from opposite sides of shaft 408 (counterweight 1130 being directed downward in FIG. 43, and counterweight 1152 being directed upward), and counterweights 1132, 1150 extend from opposite sides of cylinder 1154 (counterweight 1132 being directed upward, and counterweight 1150 being directed downward). Counterweights 1130, 1150 are aligned on the same side of shaft 408, and counterweights 1132, 1152 are aligned on the opposite side of shaft 408.

Figure 44:
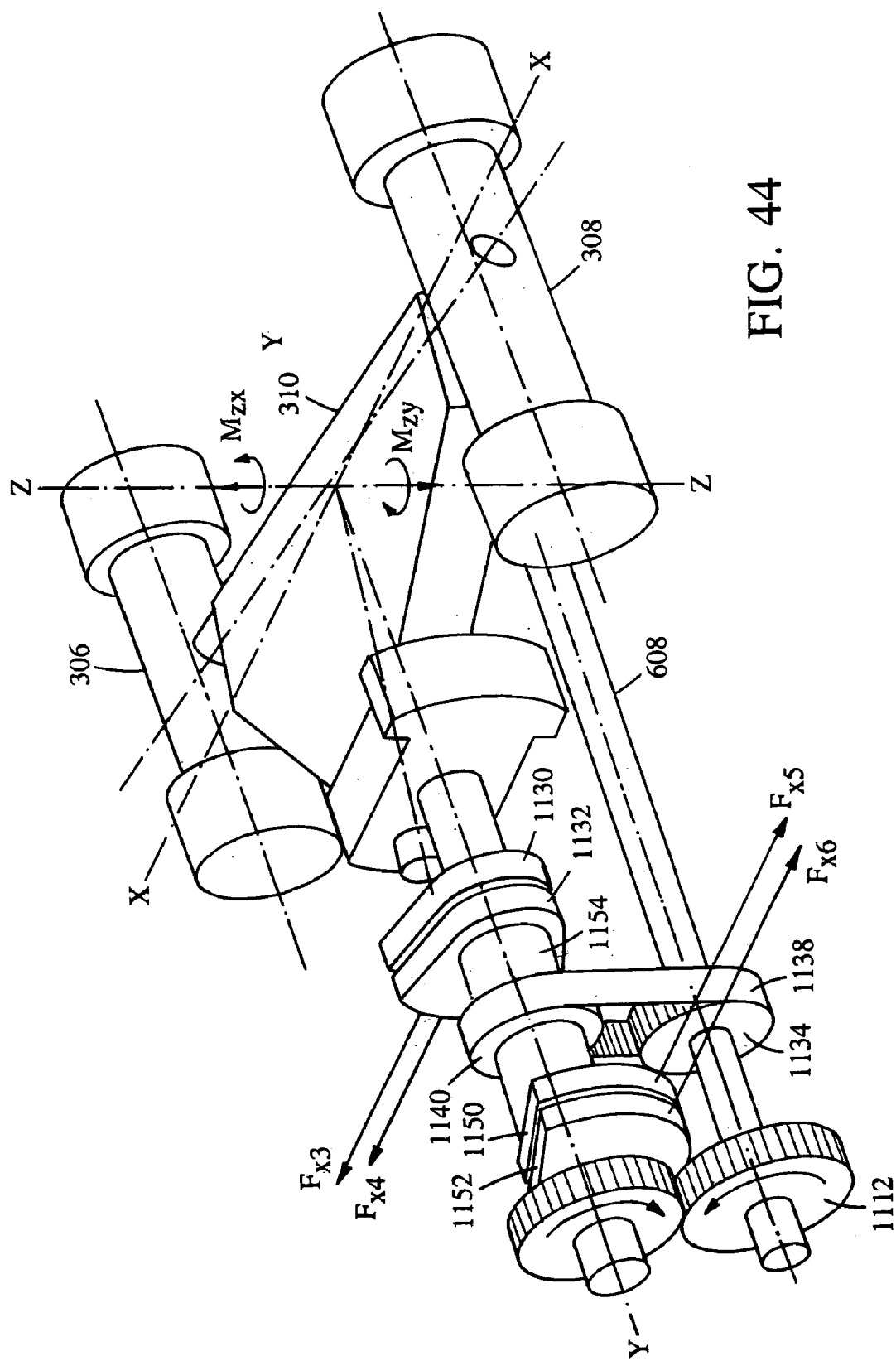
FIG. 44 is a perspective view of the piston engine assembly of FIG. 43 in a second position.

Referring to FIG. 44, with counterweights 1130, 1132, 1150, 1152 positioned as shown, the centrifugal forces due to the rotation of counterweights 1130, 1132 creates forces, $F_{x3}$ and $F_{x4}$, respectively, in the same direction in the X axis, and the centrifugal forces due to the rotation of counterweights 1150, 1152 creates forces, $F_{x5}$ and $F_{x6}$, respectively, in the opposite direction in the X axis. Since $F_{x3}$ and $F_{x4}$ are equal and opposite to $F_{x5}$ and $F_{x6}$, these forces cancel such that no undesirable lateral forces are applied to the transition arm mount.

In addition, as discussed above, movement of pistons 306, 308 in the direction of the Y axis, in the plane of the XY axes, creates a moment about the Z axis, $M_{zy}$. Since counterweights 1130, 1132, 1150, 1152 are substantially the same weight, and counterweights 1150, 1152 are located further from the Z axis than counterweights 1130, 1132, the moment created by counterweights 1150, 1152 is larger than the moment created by counterweights 1130, 1132 such that these forces act together to create a moment about the Z axis, $M_{zx}$, which acts in the opposite direction to $M_{zy}$. The weight of counterweights 1130, 1132, 1150, 1152 is selected such that $M_{zx}$ substantially cancels $M_{zy}$.

When pistons 306, 308 are centered on the X axis (FIG. 43), there is no moment about the Z axis. In this position, counterweights 1130, 1132 are oppositely directed and counterweights 1150, 1152 are oppositely directed such that the moments created about the X axis by the centrifugal forces on the counterweights cancel. Likewise, the forces created perpendicular to the Y axis, $F_u$ and $F_d$, cancel. The same is true after 180 degrees of rotation of shafts 408 and 608, when the pistons are again centered on the X axis.

Counterweight 1130 can be incorporated into flywheel 1108, thus eliminating one of the counterweights.

Figure 45:
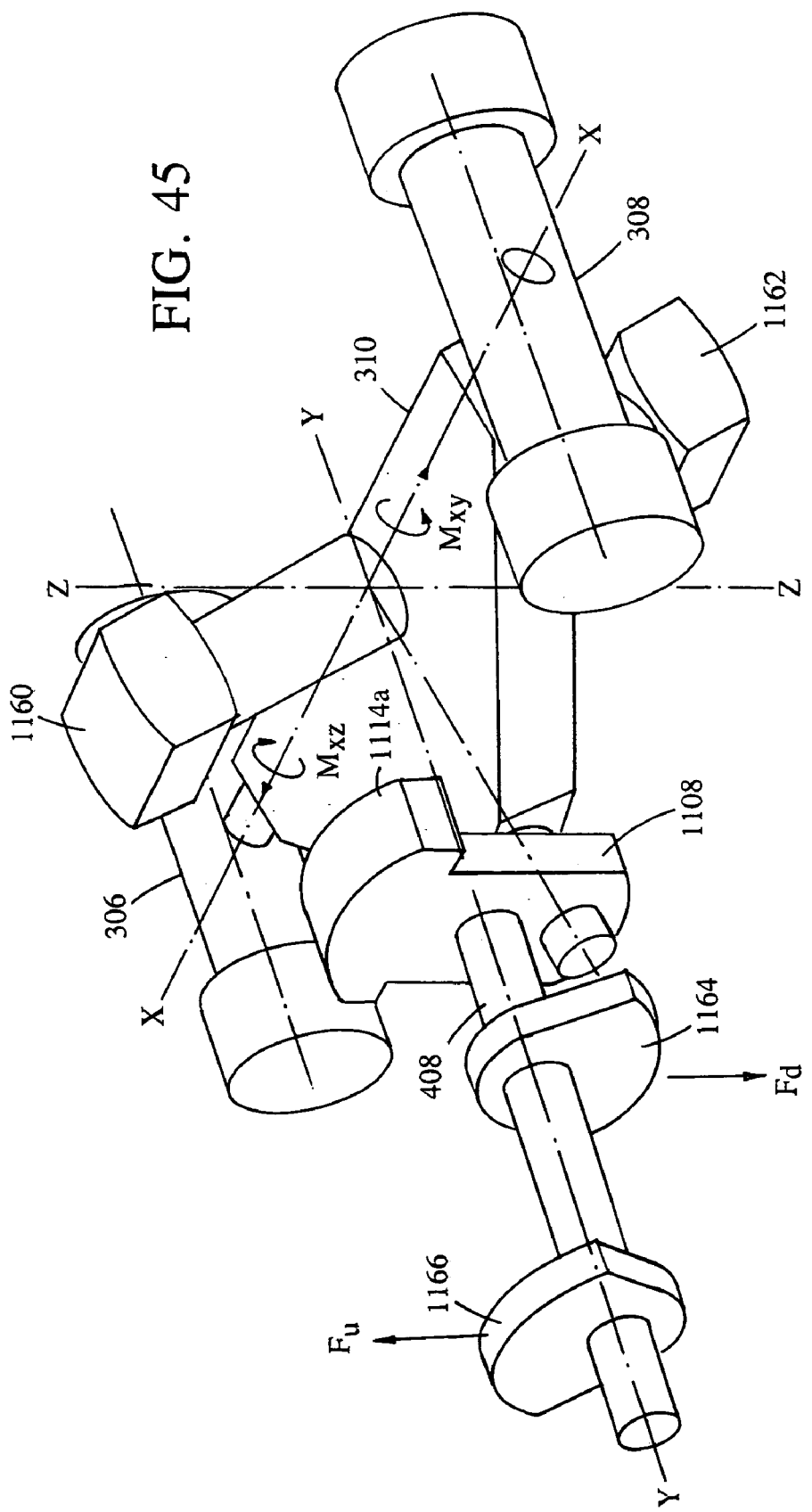
FIG. 45 is a perspective view of an additional alternative embodiment of a piston engine assembly including counterbalancing.

Referring to FIG. 45, another configuration for balancing a piston engine having two double ended pistons 306, 308 180° apart around the Y axis includes two members 1160, 1162, which each simulate a double ended piston, and two counterweights 1164, 1166. Members 1160, 1162 are 180° apart and equally spaced between pistons 306, 308. Counterweights 1164, 1166 extend from opposite sides of shaft 408, with counterweight 1166 being spaced further from the Z axis than counterweight 1164. Here again, counterweight 1114a mounted to rotating member 1108 is sized to only balance transition arm 310.

Movement of members 1160, 1162 along the Y axis, in the plane of the YZ axis, creates a moment about the X axis, $M_{xy}$. When counterweights 1164, 1166 are positioned as shown in FIG. 45, the centrifugal forces due to the rotation of counterweights 1164, 1166 creates forces, $F_u$ and $F_d$, respectively, in opposite directions along the Z axis. Since counterweight 1166 is located further from the Z axis than counterweight 1164, the moment created by counterweight 1166 is larger than the moment created by counterweight 1164 such that these forces act together to create a moment about the X axis, $M_{xz}$, which acts in the opposite direction to $M_{xy}$. The weight of counterweights 1164, 1166 is selected such that $M_{xz}$ substantially cancels $M_{xy}$.

In addition, since the forces, $F_u$ and $F_d$, are oppositely directed, these forces cancel such that no undesirable lateral forces are applied to the transition arm mount.

Figure 46:
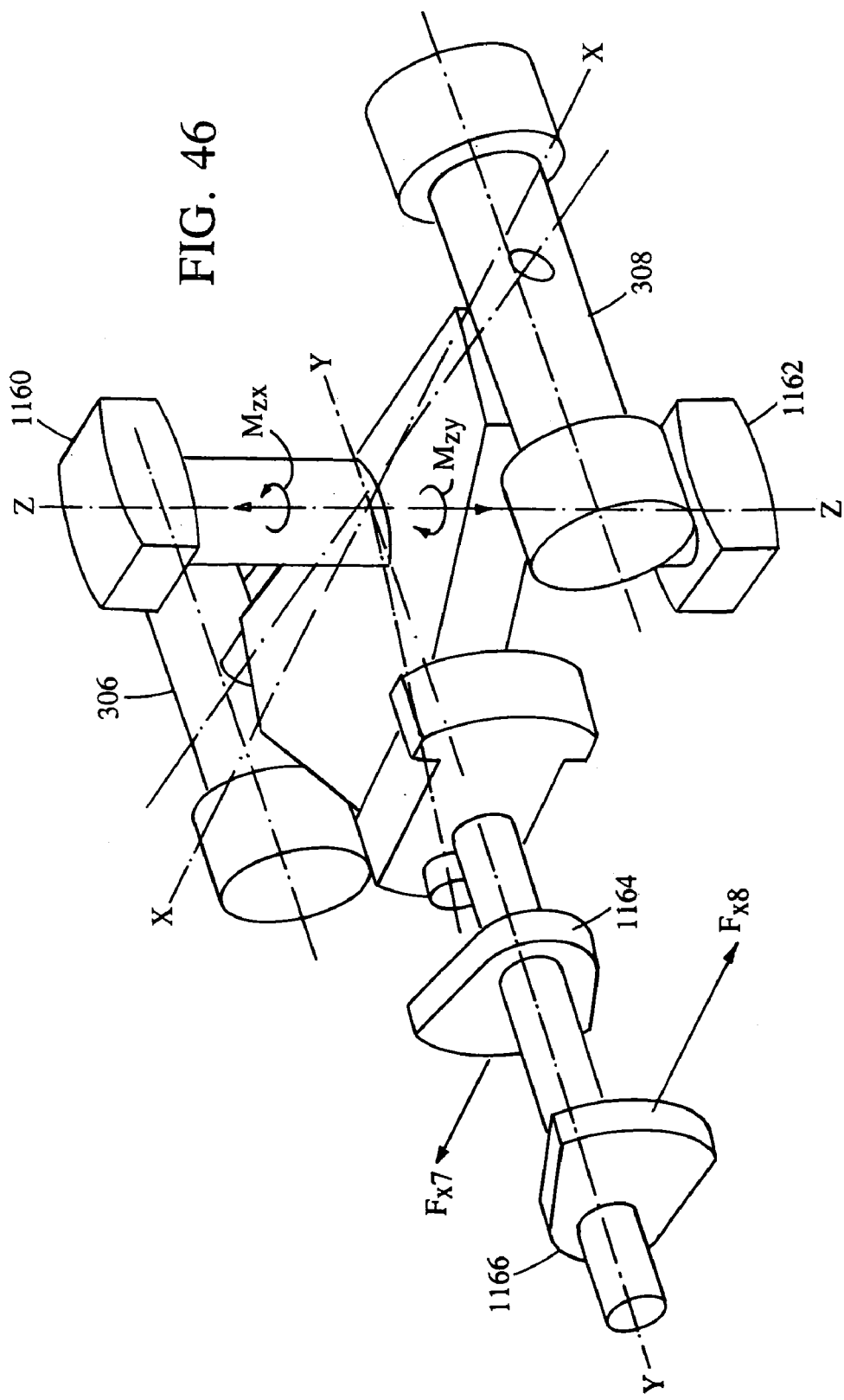
FIG. 46 is a perspective view of the piston engine assembly of FIG. 43 in a second position.

Referring to FIG. 46, movement of pistons 306, 308 along the Y axis, in the plane of the XY axes, creates a moment about the Z axis, $M_{zy}$. When counterweights 1164, 1166 are positioned as shown in FIG. 45, the centrifugal forces due to the rotation of counterweights 1164, 1166 creates forces, $F_{x7}$ and $F_{x8}$, respectively, in opposite directions along the X axis. These forces act together to create a moment about the Z axis, $M_{zx}$, which acts in the opposite direction to $M_{zy}$. The weight of counterweights 1164, 1166 is selected such that $M_{zx}$ substantially cancels $M_{zy}$.

In addition, since the forces perpendicular to Y axis, $F_{x7}$ and $F_{x8}$, are oppositely directed, these forces cancel such that no undesirable lateral forces are applied to the transition arm mount.

Counterweight 1164 can be incorporated into flywheel 1108 thus eliminating one of the counterweights.

The piston engine can include any number of pistons and simulated piston counterweights to provide the desired balancing, e.g., a three piston engine can be formed by replacing one of the simulated piston counterweights in FIG. 43 with a piston, and a two piston engine can be formed with two pistons and one simulated piston counterweight equally spaced about the transition arm.

If the compression ratio of the pistons is changed, the position of the counterweights along shaft 408 is adjusted to compensate for the resulting change in moments.

Figure 47:
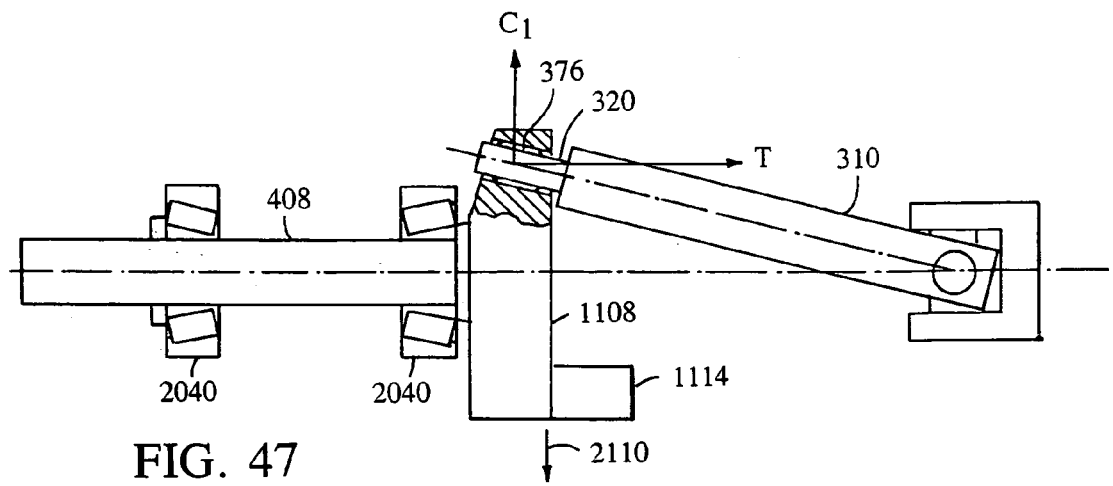
FIG. 47 is a side view showing the coupling of a transition arm to a flywheel.

Another undesirable force that can be advantageously reduced or eliminated is a thrust load applied by transition arm 310 to flywheel 1108 that is generated by the circular travel of transition arm 310. Referring to FIG. 47, the circular travel of transition arm 310 generates a centrifugal force, $C_1$, which is transmitted through nose pin 320 and sleeve bearing 376 to flywheel 1108. Although counterweight 1114 produces a centrifugal force in the direction of arrow 2010 which balances force $C_1$, at the 15° angle of nose pin 320, a lateral thrust, T, of 26% of the centrifugal force, $C_1$, is also produced. The thrust can be controlled by placing thrust bearings or tapered roller bearings 2040 on shaft 408.

Figure 48:
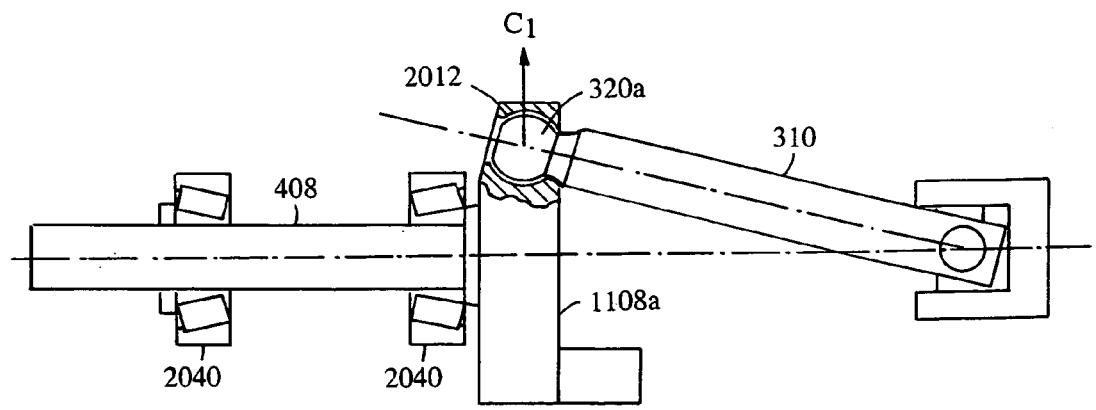
FIG. 48 is a side view of an alternative coupling of the transition arm to the flywheel.

To reduce the load on bearings 2040, and thus increase the life of the bearings, as shown in FIG. 48, nose pin 320a is spherically shaped with flywheel 1108a defining a spherical opening 2012 for receiving the spherical nose pin 320a. Because of the spherical shapes, no lateral thrust is produced by the centrifugal force, $C_1$.

Figure 49:
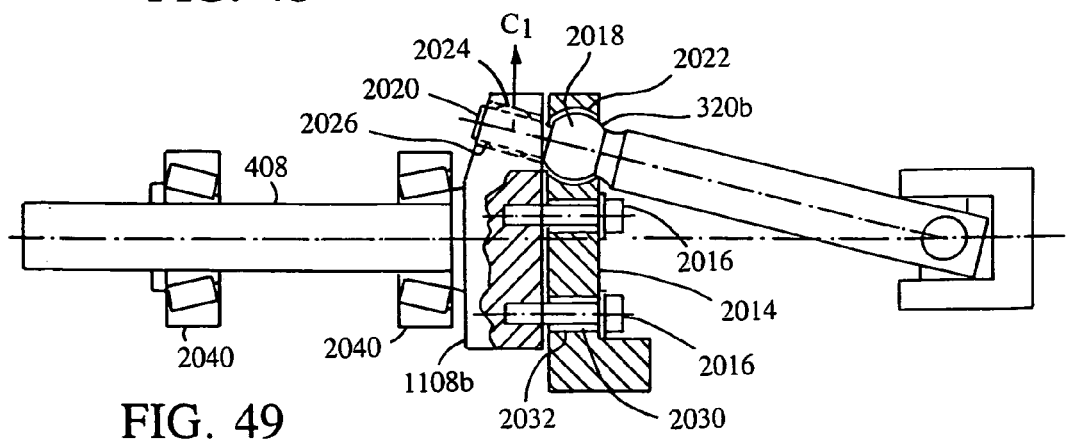
FIG. 49 is a side view of an additional alternative coupling of the transition arm to the flywheel.

FIG. 49 shows another method of preventing the application of a thrust load to the transition arm. Here, a counterbalance element 2014, rather than being an integral component of the flywheel 1108b, is attached to the flywheel by bolts 2016. The nose pin 320b includes a spherical portion 2018 and a cylindrical portion 2020. Counterbalance element 2014 defines a spherical opening 2022 for receiving spherical portion 2018 of nose pin 320b. Cylindrical portion 2020 of nose pin 320b is received within a sleeve bearing 2024 in a cylindrical opening 2026 defined by flywheel 1108b. Because of the spherical shapes, no lateral thrust is produced by the centrifugal force, $C_1$.

Counterbalance element 2014 is not rigidly held to flywheel 1108b so that there is no restraint to the full force of the counterweight being applied to the spherical joint to cancel the centrifugal force created by the circular travel of transition arm 310. For example, a clearance space 2030 is provided in the screw holes 2032 defined in counterbalance element 2014 for receiving bolts 2016.

One advantage of this embodiment over that of FIG. 48 is that the life expectancy of a cylindrical joint with a sleeve bearing coupling the transition arm to the flywheel is longer than that of the spherical joint of FIG. 48 coupling the transition arm to the flywheel.

Figure 50:
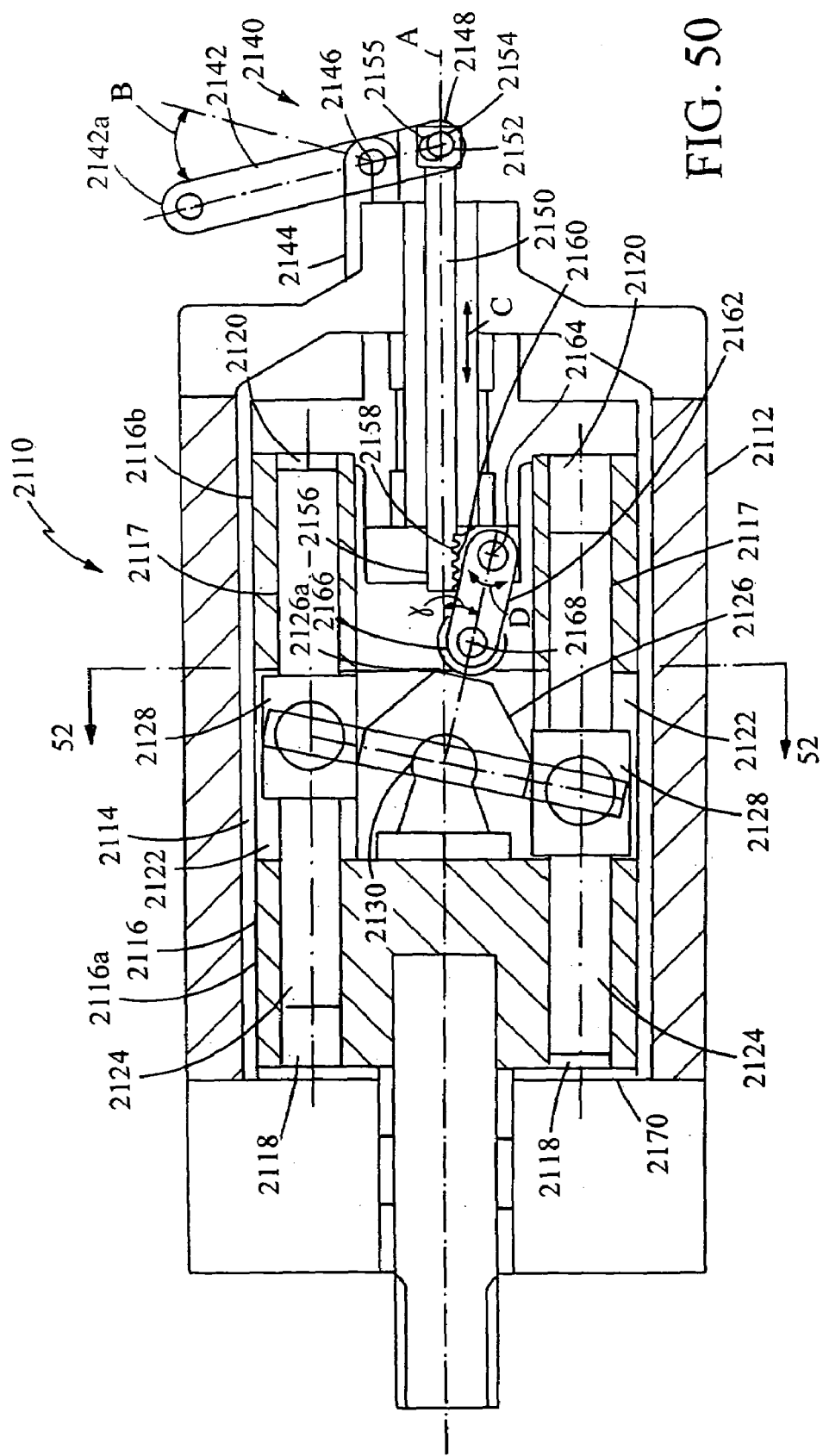
FIG. 50 is a cross-sectional side view of a hydraulic pump.

Referring to FIG. 50, a hydraulic pump 2110 includes a stationary housing 2112 defining a chamber 2114, and a rotating drum or cylinder 2116 located within chamber 2114. Cylinder 2116 includes first and second halves 2116a, 2116b defining a plurality of piston cavities 2117. Each cavity 2117 is formed by a pair of aligned channels 2118, 2120 joined by an enlarged region 2122 defined between cylinder halves 2116a, 2116b. Located within each cavity 2117 is a double ended piston 2124, here six pistons being shown, though fewer or more pistons can be employed depending upon the application. Each double ended piston is mounted to a transition arm 2126 by a joint 2128, as described above. Transition arm 2126 is supported on a universal joint 2130 mounted to cylinder 2116 such that pistons 2124 and transition arm 2126 rotate with cylinder 2116.

The angle, γ, of transition arm 2126 relative to longitudinal axis, A, of pump 2110 is adjustable to reduce or increase the output from pump 2110. Pump 2110 includes an adjustment mechanism 2140 for adjusting and setting angle, γ. Adjustment mechanism 2140 includes an arm 2142 mounted to a stationary support 2144 to pivot about a point 2146. An end 2148 of arm 2142 is coupled to a first end 2152 of a control rod 2150 by a pin 2154. Arm 2142 defines an elongated hole 2155 which receives pin 2154 and allows for radial movement of arm 2142 relative to control rod 2150 when arm 2142 is rotated about pivot point 2146. A second end 2156 of rod 2150 has laterally facing gear teeth 2158. Gear teeth 2158 mate with gear teeth 2160 on a link 2162 mounted to pivot about a point 2164. An end 2166 of link 2162 is coupled to transition arm 2126 at a pivot joint 2168. Transition arm nose pin 2126a is supported by a cylindrical pivot pin 370 (not shown) and sleeve bearing 376 (not shown), as described above with reference to FIGS. 25–25b, such that transition arm 2126 is free to rotate relative to adjustment mechanism 2140.

Angle, γ, is adjusted as follows. Arm 2142 is rotated about pivot point 2146 (arrow, B). This results in linear movement of rod 2150 (arrow, C). Because of the mating of gear teeth 2158 and 2160, the linear movement of rod 2150 causes link 2162 to rotate about pivot point 2164 (arrow, D), thus changing angle, γ. After the desired angle has been obtained, the angle is set by fixing arm 2142 using an actuator (not shown) connected to end 2142a of arm 2142.

Due to the fixed angle of transition arm 2126 (after adjustment to the desired angle), and the coupling of transition arm 2126 to pistons 2124, as the transition arm rotates, pistons 2124 reciprocate within cavities 2117. One rotation of cylinder 2116 causes each piston 2124 to complete one pump and one intake stroke.

Figure 51:
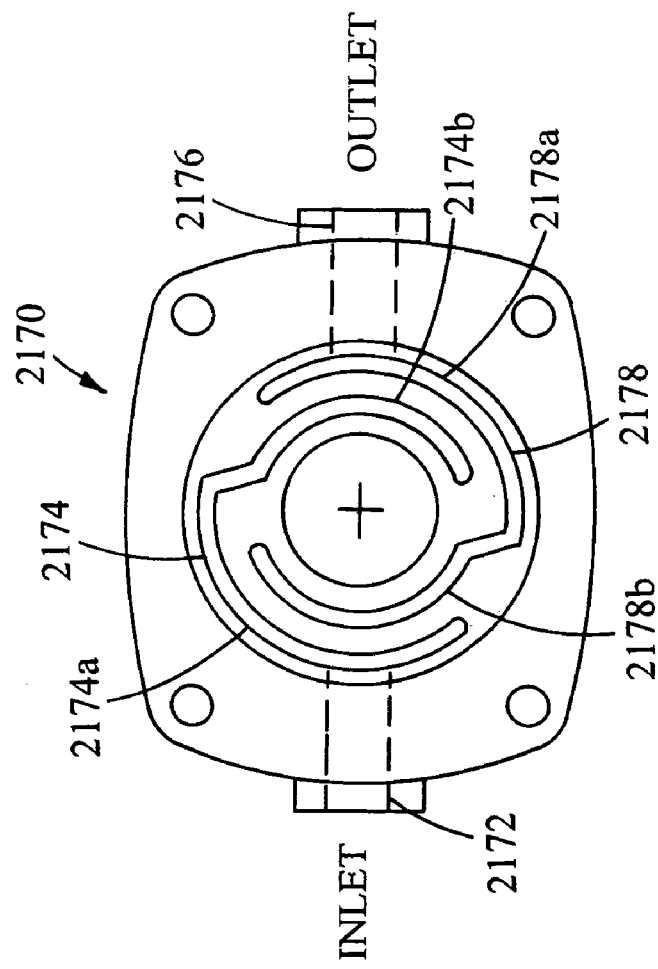
FIG. 51 is an end view of a face valve of the hydraulic pump of FIG. 50.

Referring also to FIG. 51, pump 2110 includes a face valve 2170 which controls the flow of fluid, e.g., pressurized hydraulic oil, in pump 2110. On the intake strokes, fluid is delivered to channels 2118 and 2120 through an inlet 2172 in face valve 2170. Inlet 2172 is in fluid communication with an inlet port 2174. Inlet port 2174 includes a first section 2174a that delivers fluid to channels 2120, and a second section 2174b that delivers fluid to channels 2118. First section 2174a is located radially outward of second section 2174b. On the pump strokes, fluid is expelled from channels 2118 and 2120 through an outlet 2176 in face valve 2170. Outlet 2176 is in fluid communication with an outlet port 2178. Outlet port 2178 includes a first section 2178a via which fluid expelled from channels 2120 is delivered to outlet 2176, and a second section 2178b via which fluid expelled from channels 2118 is delivered to outlet 2176. First section 2178a is located radially outward of second section 2178b.

Figure 52:
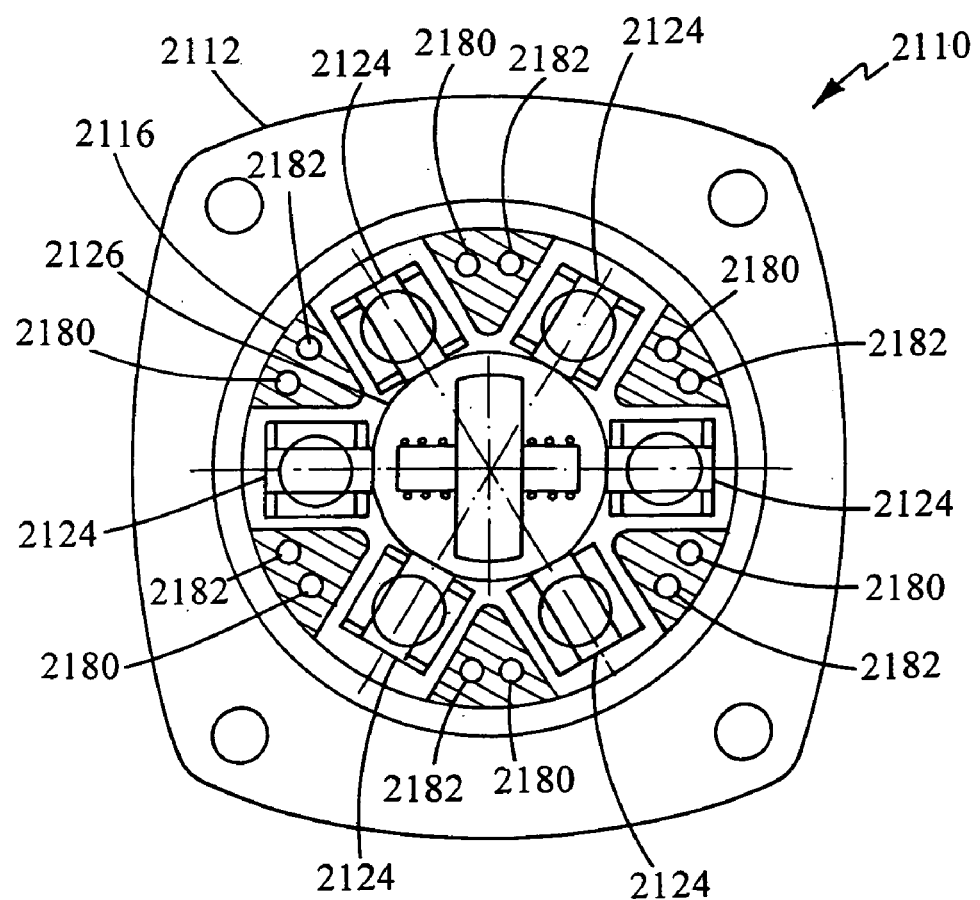
FIG. 52 is a cross-sectional view of the hydraulic pump of FIG. 30, taken along lines 52—52.

Referring also to FIG. 52, cylinder 2116 defines six flow channels 2180 through which fluid travels to and from channels 2120. Flow channels 2180 are radially aligned with port sections 2174a and 2178b; and channels 2118 are radially aligned with port sections 2174b and 2178b. When a first end 2124a of piston 2124 is on the intake stroke and a second end 2124b of piston 2124 is on the pump stroke, cylinder 2116 is rotationally aligned relative to stationary face valve 2170 such that the respective channel 2118 at first end 2124a of piston 2124 is aligned with inlet port section 2174b, and the respective flow channel 2180 leading to a respective channel 2120 at second end 2124b of piston 2124 is aligned with outlet port section 2178a.

Figure 53:
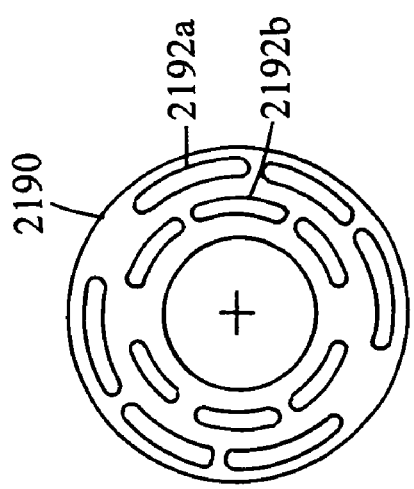
FIG. 53 is an end view of a face plate of the hydraulic pump of FIG. 50.

Cylinder 2116 further defines six holes 2182 for receiving connecting bolts (not shown) that hold the two halves 2116a, 2116b of cylinder 2116 together. Cylinder 2116 is biased toward face valve 2170 to maintain a valve seal by spring loading. Referring to FIG. 53, a face plate 2190 defining outer slots 2192a and inner slots 2192b is positioned between stationary face valve 2170 and rotating cylinder 2116 to act as a bearing surface. Outer slots 2192a are radially aligned with port sections 2174a and 2178a, and inner slots 2192b are radially aligned with port sections 2174b and 2178b.

Figure 54:
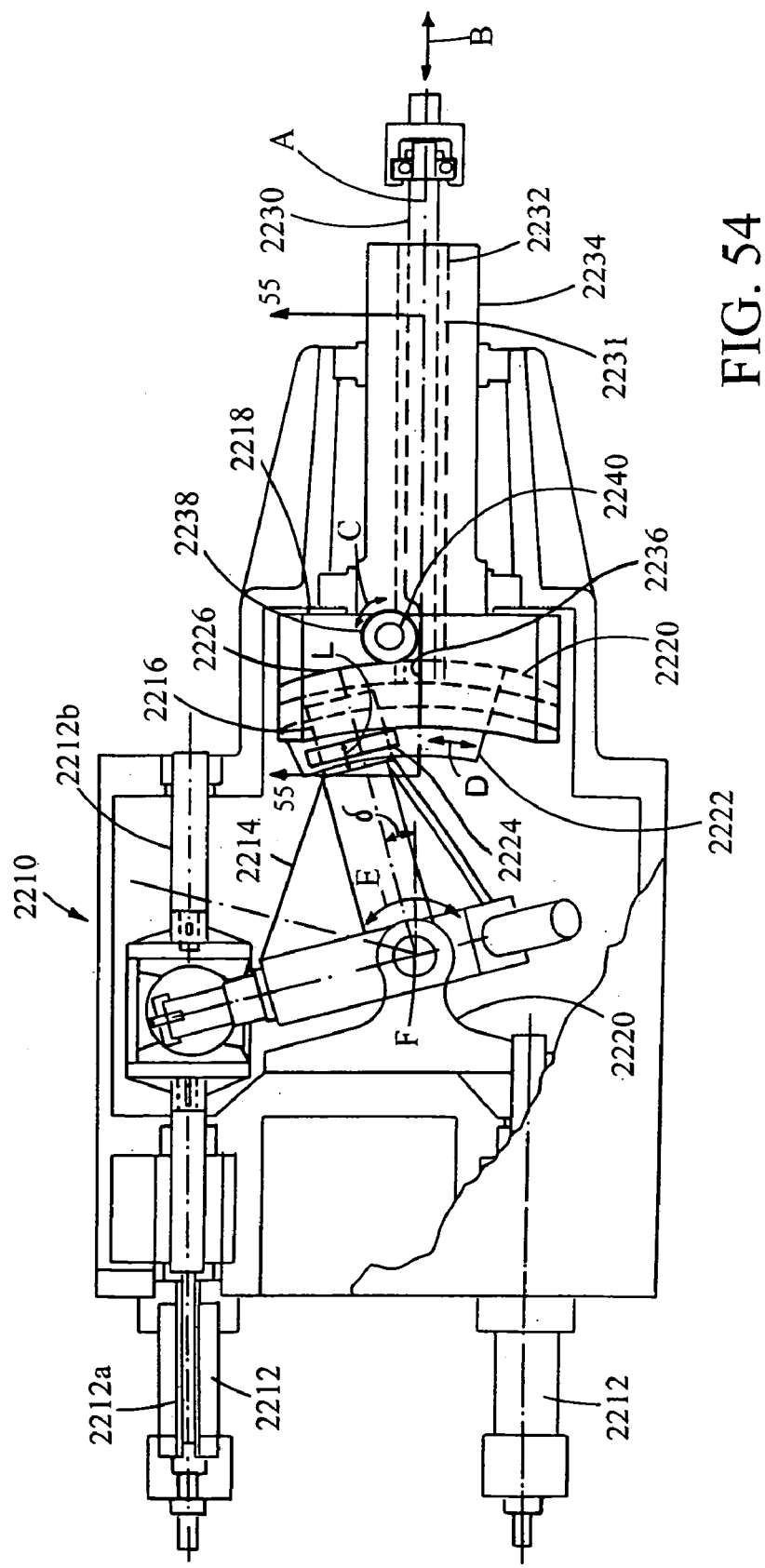
FIG. 54 is a partially cut-away side view of a variable compression piston assembly.

Referring to FIG. 54, a pump or compressor assembly 2210 for varying the stroke of pistons 2212, e.g., a pump with single ended pistons having a piston 2212a at one end and a guide rod 2212b at the opposite end, has the ability to vary the stroke of pistons 2212 down to zero stroke and the capability of handling torque loads as high as a fixed stroke mechanism. Assembly 2210 is shown with three pistons, though two or more pistons can be employed. Assembly 2210 includes a transition arm 2214 coupled to pistons 2212 by any of the methods described above. Transition arm 2214 includes a nose pin 2216 coupled to a rotatable flywheel 2218. The rotation of flywheel 2218 and the linear movement of pistons 2212 are coupled by transition arm 2214 as described above.

The stroke of pistons 2212, and thus the output volume of assembly 2210, is adjusted by changing the angle, δ, of nose pin 2216 relative to assembly axis, A. Angle, δ, is changed by rotating transition arm 2214, arrow, E, about axis, F, of support 2220, e.g., a universal joint. Flywheel 2218 defines an arced channel 2220 housing a bearing block 2222. Bearing block 2222 is slidable within channel 2220 to change the angle, δ, while the cantilever length, L, remains constant and preferably as short as possible for carrying high loads. Within bearing block 2222 is mounted a bearing 2224, e.g., a sleeve or rolling bearing, which receives nose pin 2216. Bearing block 2222 has a gear toothed surface 2226, for reasons described below.

Figure 55:
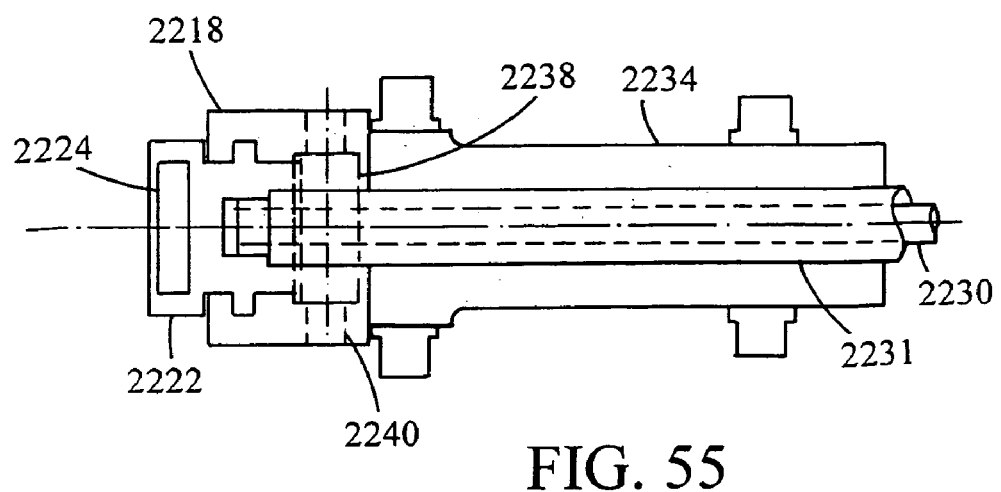
FIG. 55 is a cross-sectional side view of the piston assembly of FIG. 54, taken along lines 55—55.

Referring also to FIG. 55, to slide bearing block 2222 within channel 2220, a control rod 2230, which passes through and is guided by a guide bushing 2231 within cylindrical opening 2232 in main drive shaft 2234 and rotates with drive shaft 2234, includes a toothed surface 2236 which engages a pinion gear 2238. Pinion gear 2238 is coupled to gear toothed surface 2226 of bearing block 2222, and is mounted in bushings 2240. Axial movement of control rod 2230, in the direction of arrow, B, causes pinion gear 2238 to rotate, arrow, C. Rotation of pinion gear 2238 causes bearing block 2222 to slide in channel 2220, arrow D, circumferentially about a circle centered on U-joint axis, F, thus changing angle, δ. The stroke of pistons 2212 is thus adjusted while flywheel 2218 remains axially stationary (along the direction of arrow, B).

Other embodiments are within the scope of the following claims.

For example, the double-ended pistons of the forgoing embodiments can be replaced with single-ended pistons having a piston at one end of the cylinder and a guide rod at the opposite end of the cylinder, such as the single-ended pistons shown in FIG. 32 where element 604, rather than being a pump piston acts as a guide rod.

The various counterbalance techniques, variable-compression embodiments, and piston to transition arm couplings can be integrated in a single engine, pump, or compressor.

What is claimed is:

1. An apparatus for varying the output volume of a piston assembly, comprising:
   a piston rod configured and arranged for linear motion,
   a transition arm coupled to the piston rod, the transition arm including a nose pin,
   an axially stationary support to which the transition arm is mounted,
   a bearing coupled to the nose pin,
   a housing that houses the bearing,
   a member defining a channel, the housing and bearing being received in the channel,
   a mechanical mechanism that exerts a mechanical force on the housing to move the housing and bearing along the channel, wherein the housing and bearing moving along the channel results in a position of the nose pin being adjusted.

2. The apparatus of claim 1 wherein the support is spaced from the member.

3. The apparatus of claim 1 further comprising a double-ended member including the piston rod and a second rod.

4. The apparatus of claim 3 wherein the double-ended member further comprises a piston head attached to the piston rod.

5. The apparatus of claim 3 wherein the second rod comprises a guide rod.

6. The apparatus of claim 3 wherein the double-ended member further comprises a pistol head attached to the second rod.

7. The assembly of claim 1 further comprising at least a second rod coupled to the transition arm.

8. The assembly of claim 7 wherein the member is rotatable and an axis of rotation of the rotating member and axes of the piston rods lie on a common plane.

9. The assembly of claim 7 wherein the axes of the piston rod and the second rod are parallel.

10. The assembly of claim 7 wherein the piston rod and the second rod are non-parallel to each other.

11. The apparatus of claim 7 wherein a center of movement of the transition arm relative to the support is centered between the piston rod and the second rod.

12. The apparatus of claim 1 wherein the transition arm is mounted to the support for movement relative to the support.

13. The apparatus of claim 1 wherein position of the nose pin is adjusted while the member and the support remain axially stationary.

14. The apparatus of claim 1 wherein the member is rotatable and a center of movement about which the transition arm moves to adjust the position of the nose pin is on an axis of rotation of the member.

15. The apparatus of claim 1 wherein the housing includes a geared surface and the mechanical mechanism includes a gear cooperating with the geared surface such that rotation of the gear moves the housing along the channel.

16. A method of varying the output volume of a piston assembly, comprising:
    providing a piston assembly including a piston rod configured and arranged for linear motion and a transition arm coupled to the piston rod, the transition arm including a nose pin, an axially stationary support to which the transition arm is mounted, a bearing coupled to the nose pin, a housing that houses the bearing, and a member defining a channel, the bearing element being received in the channel, and
    mechanically exerting a force on the housing to move the housing and bearing along the channel, wherein the bearing element moving along the channel results in a position of the nose pin being adjusted.

17. An assembly, comprising:
    a transition arm coupled to a stationary support, the transition arm including at least one piston arm,
    at least one double-ended member, the double-ended member coupled to the piston arm, and
    a member coupled to the transition arm, a position of the transition arm relative to an axis of rotation of the member being adjustable to vary the output volume of the double-ended member to zero, the member defining an arc-shaped guide for guiding movement of the transition arm when the position of the transition arm relative to the axis of rotation of the member is adjusted.

18. A method, comprising:
    providing, a piston assembly including at least two double-ended members, a transition arm having at least two piston arms, each double-ended member coupled to one of the at least two piston arms, and a stationary support to which the transition arm is mounted, and
    moving the transition arm along an arc-shaped guide to vary the output volume of the piston assembly during operation of the piston assembly.

19. An apparatus for varying the output volume of a piston assembly, comprising:
    a piston rod configured and arranged for linear motion,
    a transition arm coupled to the piston rod, the transition arm including a nose pin,
    a stationary support to which the transition arm is mounted,
    a bearing element coupled to the nose pin,
    a member defining a channel, the bearing element being received in the channel,
    a gear coupled to the bearing element such that rotation of the gear moves the bearing element alone the channel, wherein the bearing element moving along the channel results in a position of the nose pin being adjusted.

20. A method of varying the output volume of a piston assembly, comprising:
    providing a piston assembly including a piston rod configured and arranged for linear motion and a transition arm coupled to the piston rod, the transition arm including a nose pin, a stationary support to which the transition arm is mounted, a bearing element coupled to the nose pin, a member defining a channel, the bearing element being received in the channel, and a gear coupled to the bearing element, and rotating the gear to move the bearing element along the channel, wherein the bearing element moving along the channel results in a position of the nose pin being adjusted.

* * * * *